US012578562B2

(12) United States Patent　　　　(10) Patent No.:　US 12,578,562 B2
Ohtake　　　　　　　　　　　　　　(45) Date of Patent:　Mar. 17, 2026

(54) OPTICAL SYSTEM, OPTICAL APPARATUS AND METHOD FOR MANUFACTURING THE OPTICAL SYSTEM

(71) Applicant: Nikon Corporation, Minato-ku (JP)

(72) Inventor: Fumiaki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 937 days.

(21) Appl. No.: 17/636,873

(22) PCT Filed: Aug. 24, 2020

(86) PCT No.: PCT/JP2020/031786
§ 371 (c)(1),
(2) Date: Jul. 27, 2022

(87) PCT Pub. No.: WO2021/039695
PCT Pub. Date: Mar. 4, 2021

(65) Prior Publication Data
US 2023/0101126 A1　　Mar. 30, 2023

(30) Foreign Application Priority Data
Aug. 29, 2019　(JP) ................................ 2019-157405

(51) Int. Cl.
*G02B 15/14*　　　(2006.01)
*G02B 15/15*　　　(2006.01)
(52) U.S. Cl.
CPC ...... *G02B 15/15* (2013.01); *G02B 15/145511*
(2019.08); *G02B 15/1465* (2019.08)
(58) Field of Classification Search
CPC .... G02B 15/144107; G02B 15/144103; G02B
15/144503; G02B 15/144507
See application file for complete search history.

(56) References Cited

U.S. PATENT DOCUMENTS

| | | | |
|---|---|---|---|
| 2015/0277091 A1 | 10/2015 | Sugita | |
| 2017/0068079 A1* | 3/2017 | Kawamura | ........ G02B 15/1425 |
| 2018/0210179 A1 | 7/2018 | Kawamura et al. | |

FOREIGN PATENT DOCUMENTS

| | | |
|---|---|---|
| JP | 2015-197593 A | 11/2015 |
| JP | 2017-122745 A | 7/2017 |
| JP | 2019-066701 A | 4/2019 |

OTHER PUBLICATIONS

International Preliminary Report on Patentability from International Patent Application No. PCT/JP2020/031786, Mar. 10, 2022.

(Continued)

*Primary Examiner* — Joseph P Martinez
(74) *Attorney, Agent, or Firm* — Potomac Law Group, PLLC

(57) ABSTRACT

An optical system comprising a plurality of lens groups arranged on an optical axis and comprising a leading lens group, a first focal lens group, and a second focal lens group. The leading lens group is arranged further on the object side than the first focal lens group and the second focal lens group is arranged further on the image side than the first focal lens group. The first focal lens group has positive refractive power and moves along the optical axis to the image side when focusing from an infinite object to a short-distance object. The second focal lens group: has a negative refractive power; travels along the optical axis to the object side when focusing from an infinite object to a short-distance object; and has, between the first focal lens group and the second focal lens group, an intermediate lens group that includes at least one lens.

23 Claims, 24 Drawing Sheets

(56)                    References Cited

OTHER PUBLICATIONS

Office Action issued Oct. 4, 2022, in Japanese Patent Application
No. 2021-542874.
International Search Report from International Patent Application
No. PCT/JP2020/031786, Nov. 2, 2020.
Office Action issued Mar. 20, 2023, in Chinese Patent Application
No. 202080059072.7.

* cited by examiner

FIG.1

FNO=2.91          Y=20.79          Y=20.79

0.500                0.500                10.000%
SPHERICAL      ASTIGMATISM    DISTORTION
ABERRATION g

-0.050    CHROMATIC ABERRATION
OF MAGNIFICATION

Y=20.79    dg
Y=14.80    dg
Y=10.59    dg
Y=10.80    dg
Y=0.0    dg
-0.100
COMA ABERRATION

FNO=2.91          Y=21.70          Y=21.70

0.500                0.500                10.000%
SPHERICAL      ASTIGMATISM    DISTORTION
ABERRATION g

-0.050    CHROMATIC ABERRATION
OF MAGNIFICATION

Y=21.70    dg
Y=15.10    dg
Y=10.80    dg
Y=5.40    dg
Y=0.0    dg
-0.100
COMA ABERRATION

FNO=2.91     Y=18.90     Y=18.90

0.500     0.500     10.000%

SPHERICAL ABERRATION     ASTIGMATISM     DISTORTION

Y=18.90

Y=13.85

Y=10.27

Y=5.32

Y=0.0

-0.100

COMA ABERRATION

-0.050     CHROMATIC ABERRATION OF MAGNIFICATION

FNO=2.91     Y=21.70     Y=21.70

0.500     0.500     10.000%

SPHERICAL ABERRATION     ASTIGMATISM     DISTORTION

Y=21.70

Y=15.10

Y=10.80

Y=5.40

Y=0.0

-0.100

COMA ABERRATION

-0.050     CHROMATIC ABERRATION OF MAGNIFICATION

Figure 23:
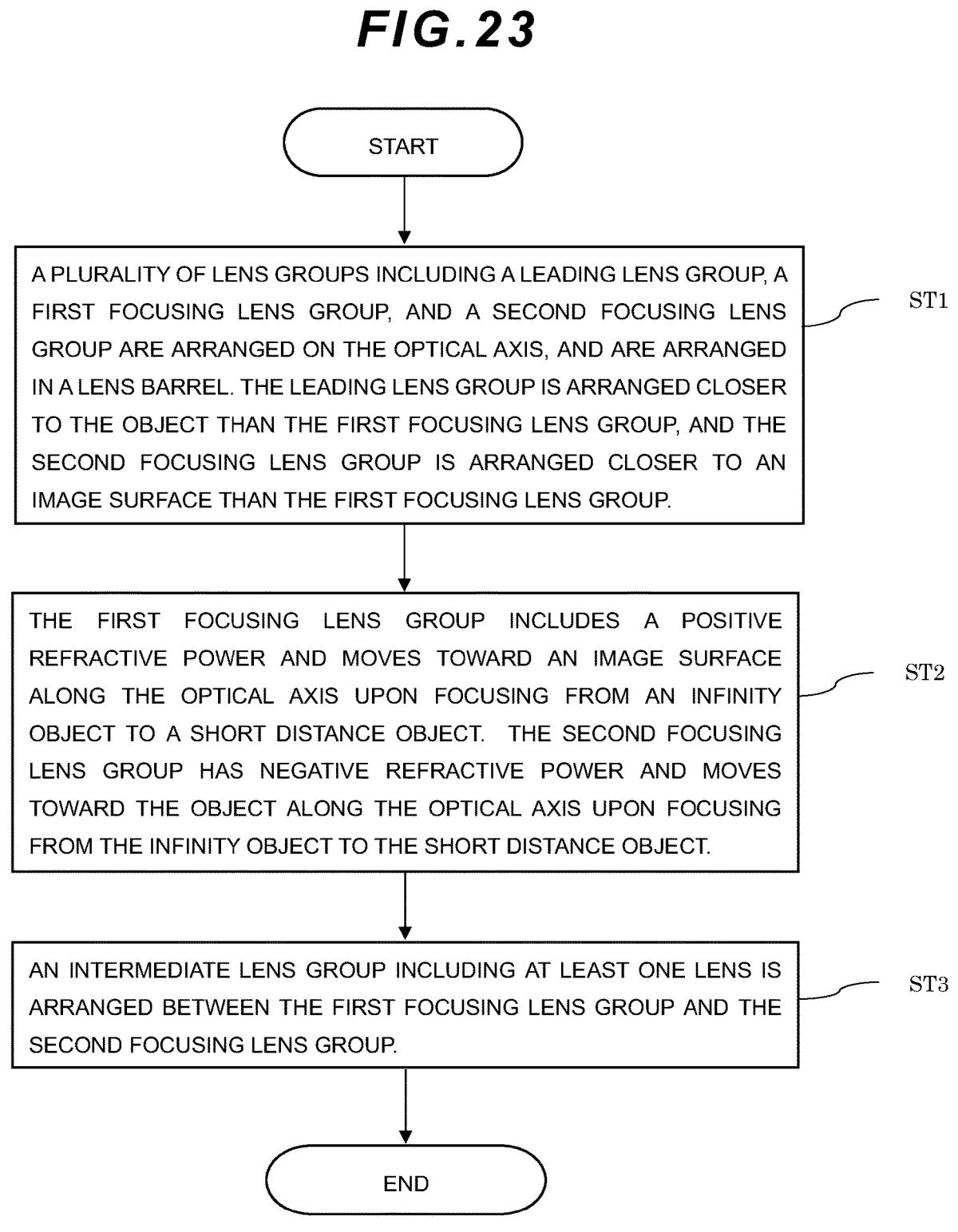

START

A PLURALITY OF LENS GROUPS INCLUDING A LEADING LENS GROUP, A FIRST FOCUSING LENS GROUP, AND A SECOND FOCUSING LENS GROUP ARE ARRANGED ON THE OPTICAL AXIS, AND ARE ARRANGED IN A LENS BARREL. THE LEADING LENS GROUP IS ARRANGED CLOSER TO THE OBJECT THAN THE FIRST FOCUSING LENS GROUP, AND THE SECOND FOCUSING LENS GROUP IS ARRANGED CLOSER TO AN IMAGE SURFACE THAN THE FIRST FOCUSING LENS GROUP.     ST1

THE FIRST FOCUSING LENS GROUP INCLUDES A POSITIVE REFRACTIVE POWER AND MOVES TOWARD AN IMAGE SURFACE ALONG THE OPTICAL AXIS UPON FOCUSING FROM AN INFINITY OBJECT TO A SHORT DISTANCE OBJECT. THE SECOND FOCUSING LENS GROUP HAS NEGATIVE REFRACTIVE POWER AND MOVES TOWARD THE OBJECT ALONG THE OPTICAL AXIS UPON FOCUSING FROM THE INFINITY OBJECT TO THE SHORT DISTANCE OBJECT.     ST2

AN INTERMEDIATE LENS GROUP INCLUDING AT LEAST ONE LENS IS ARRANGED BETWEEN THE FIRST FOCUSING LENS GROUP AND THE SECOND FOCUSING LENS GROUP.     ST3

END

FIG.24

START

A PLURALITY OF LENS GROUPS INCLUDING A LEADING LENS GROUP, A FIRST FOCUSING LENS GROUP, AND A SECOND FOCUSING LENS GROUP ARE ARRANGED IN LINE ON THE OPTICAL AXIS, AND ARE ARRANGED IN A LENS BARREL. THE LEADING LENS GROUP IS ARRANGED CLOSER TO AN OBJECT THAN THE FIRST FOCUSING LENS GROUP, AND THE SECOND FOCUSING LENS GROUP IS ARRANGED CLOSER TO AN IMAGE SURFACE THAN THE FIRST FOCUSING LENS GROUP                                    ST1

THE LEADING LENS GROUP IS FIXED WITH RESPECT TO AN IMAGE SURFACE UPON FOCUSING.   THE FIRST FOCUSING LENS GROUP INCLUDES A POSITIVE REFRACTIVE POWER AND MOVES TOWARD AN IMAGE SURFACE ALONG THE OPTICAL AXIS UPON FOCUSING FROM AN INFINITY OBJECT TO A SHORT DISTANCE OBJECT.   THE SECOND FOCUSING LENS GROUP HAS NEGATIVE REFRACTIVE POWER AND MOVES TOWARD AN OBJECT ALONG THE OPTICAL AXIS UPON FOCUSING FROM THE INFINITY OBJECT TO THE SHORT DISTANCE OBJECT                                    ST2

EACH LENS GROUP IS ARRANGED IN THE LENS BARREL SO AS TO SATISFY THE FOLLOWING CONDITIONAL EXPRESSION.

$$0.20 < dFF/TL < 0.65$$                                    ST3

END

OPTICAL SYSTEM, OPTICAL APPARATUS AND METHOD FOR MANUFACTURING THE OPTICAL SYSTEM

TECHNICAL FIELD

The present invention relates to an optical system, an optical apparatus, and a method for manufacturing the optical system.

TECHNICAL BACKGROUND

Conventionally, wide-angle lenses suitable for photographic cameras, electronic still cameras, video cameras and the like have been proposed (see, for example, Patent literature 1). With a wide-angle lens, correction of field curves and the like may be insufficient, especially upon focusing on a short distance object, and there is a demand for a wide-angle lens capable of better correcting various aberrations.

PRIOR ARTS LIST

Patent Document

Patent literature 1: Japanese Laid-Open Patent Publication No. 2015-197593(A)

SUMMARY OF THE INVENTION

The optical system according to a first aspect consists of a plurality of lens groups which comprise a leading lens group, a first focusing lens group, and a second focusing lens group; and the lens groups are arranged in line on an optical axis. The leading lens group is arranged closer to an object than the first focusing lens group, and the second focusing lens group is arranged closer to an image surface than the first focusing lens group. The first focusing lens group has positive refractive power and moves toward an image surface along the optical axis upon focusing from an infinity object to a short distance object, and the second focusing lens group has negative refractive power and moves toward an object along the optical axis upon focusing from an infinity object to a short distance object. Between the first focusing lens group and the second focusing lens group, there is an intermediate lens group including at least one lens.

The optical system according to a second aspect consists of a plurality of lens groups which comprise a leading lens group, a first focusing lens group, and a second focusing lens group; and the lens groups are arranged in line on an optical axis. The leading lens group is arranged closer to an object than the first focusing lens group, and the second focusing lens group is arranged closer to an image surface than the first focusing lens group. The leading lens group is fixed with respect to an image surface upon focusing, the first focusing lens group has positive refractive power and moves toward an image surface along the optical axis upon focusing from an infinity object to a short distance object, and the second focusing lens group has negative refractive power and moves toward an object along the optical axis upon focusing from an infinity object to a short distance object. The optical system satisfies the following conditional expression, $$0.20 < dFF/TL < 0.65$$

where dFF: a distance on the optical axis, upon focusing on an infinity object, from the surface, facing an image surface, of the lens arranged closest to an image surface in the first focusing lens group to the surface, facing an object, of the lens arranged closest to an object in the second focusing lens group, and TL: an entire length of the optical system upon focusing on an infinity object.

An optical apparatus comprises any one of the above optical system.

In a method for manufacturing an optical system according to the first aspect, each lens group is arranged in a lens barrel so that the optical system has the following configuration. The optical system consists of a plurality of lens groups in which: the lens groups comprise a leading lens group, a first focusing lens group, and a second focusing lens group; and the lens groups are arranged in line on an optical axis. The leading lens group is arranged closer to an object than the first focusing lens group, and the second focusing lens group is arranged closer to an image surface than the first focusing lens group. The first focusing lens group has positive refractive power and moves toward an image surface along the optical axis upon focusing from an infinity object to a short distance object, and the second focusing lens group has negative refractive power and moves toward an object along the optical axis upon focusing from an infinity object to a short distance object. Between the first focusing lens group and the second focusing lens group, there is an intermediate lens group including at least one lens.

In a method for manufacturing an optical system according to the second aspect, each lens group is arranged in a lens barrel so that the optical system has the following configuration. The optical system consists of a plurality of lens groups in which: the lens groups comprise a leading lens group, a first focusing lens group, and a second focusing lens group; and the lens groups are arranged in line on an optical axis. The leading lens group is arranged closer to an object than the first focusing lens group, and the second focusing lens group is arranged closer to an image surface than the first focusing lens group. The leading lens group is fixed with respect to an image surface upon focusing, the first focusing lens group has positive refractive power and moves toward an image surface along the optical axis upon focusing from an infinity object to a short distance object, and the second focusing lens group has negative refractive power and moves toward an object along the optical axis upon focusing from an infinity object to a short distance object. Each lens group is arranged in a lens barrel so that the following conditional expression is satisfied, $$0.20 < dFF/TL < 0.65$$

where dFF: a distance on the optical axis, upon focusing on an infinity object, from the surface, facing an image surface, of the lens arranged closest to an image surface in the first focusing lens group to the surface, facing an object, of the lens arranged closest to an object in the second focusing lens group, and TL: an entire length of the optical system upon focusing on an infinity object.

BRIEF DESCRIPTION OF THE DRAWINGS

FIG. 1 is a diagram showing a lens configuration of an optical system according to Example 1;

FIGS. 2A and 2B are graphs showing various aberrations of the optical system according to Example 1 upon focusing on an infinity object, in which FIG. 2A shows various aberrations in a wide angle end state and FIG. 2B shows various aberrations in a telephoto end state;

FIGS. 3A and 3B are graphs showing various aberrations of the optical system according to Example 1 upon focusing on a close distance object, in which FIG. 3A shows various aberrations in a wide angle end state and FIG. 3B shows various aberrations in a telephoto end state;

FIGS. 5A and 5B are graphs showing various aberrations of the optical system according to Example 2 upon focusing on an infinity object, in which FIG. 5A shows various aberrations in a wide angle end state and FIG. 5B shows various aberrations in a telephoto end state;

FIGS. 6A and 6B are graphs showing various aberrations of the optical system according to Example 2 upon focusing on a close distance object, in which FIG. 6A shows various aberrations in a wide angle end state and FIG. 6B shows various aberrations in a telephoto end state;

FIG. 7 is a diagram showing a lens configuration of an optical system according to Example 3;

FIGS. 8A and 8B are graphs showing various aberrations of the optical system according to Example 3 upon focusing on an infinity object, in which FIG. 8A shows various aberrations in a wide angle end state and FIG. 8B shows various aberrations in a telephoto end state;

FIGS. 9A and 9B are graphs showing various aberrations of the optical system according to Example 3 upon focusing on a close distance object, in which FIG. 9A shows various aberrations in a wide angle end state and FIG. 9B shows various aberrations in a telephoto end state;

FIG. 10 is a diagram showing a lens configuration of an optical system according to Example 4;

FIGS. 11A and 11B are graphs showing various aberrations of the optical system according to Example 4 upon focusing on an infinity object, in which FIG. 11A shows various aberrations in a wide angle end state and FIG. 11B shows various aberrations in a telephoto end state;

FIGS. 12A and 12B are graphs showing various aberrations of the optical system according to Example 4 upon focusing on a close distance object, in which FIG. 12A shows various aberrations in a wide angle end state and FIG. 12B shows various aberrations in a telephoto end state;

FIG. 13 is a diagram showing a lens configuration of an optical system according to Example 5;

FIGS. 14A and 14B are graphs showing various aberrations of the optical system according to Example 5 upon focusing on an infinity object, in which FIG. 14A shows various aberrations in a wide angle end state and FIG. 14B shows various aberrations in a telephoto end state;

FIGS. 15A and 15B are graphs showing various aberrations of the optical system according to Example 5 upon focusing on a close distance object, in which FIG. 15A shows various aberrations in a wide angle end state and FIG. 15B shows various aberrations in a telephoto end state;

FIGS. 17A and 17B are graphs showing various aberrations of the optical system according to Example 6, in which FIG. 17A shows various aberrations upon focusing on an infinity object, and FIG. 17B shows various aberrations upon focusing on a close distance object;

FIGS. 19A and 19B are graphs showing various aberrations of the optical system according to Example 7, in which FIG. 19A shows various aberrations upon focusing on an infinity object, and FIG. 19B shows various aberrations upon focusing on a close distance object;

FIGS. 21A and 21B are graphs showing various aberrations of the optical system according to Example 8, in which FIG. 21A shows various aberrations upon focusing on an infinity object, and FIG. 21B shows various aberrations upon focusing on a close distance object;

FIG. 23 is a flowchart showing a method for manufacturing an optical system; and FIG. 24 is another flowchart showing a method for manufacturing an optical system.

DESCRIPTION OF THE EMBODIMENTS

Figure 22:
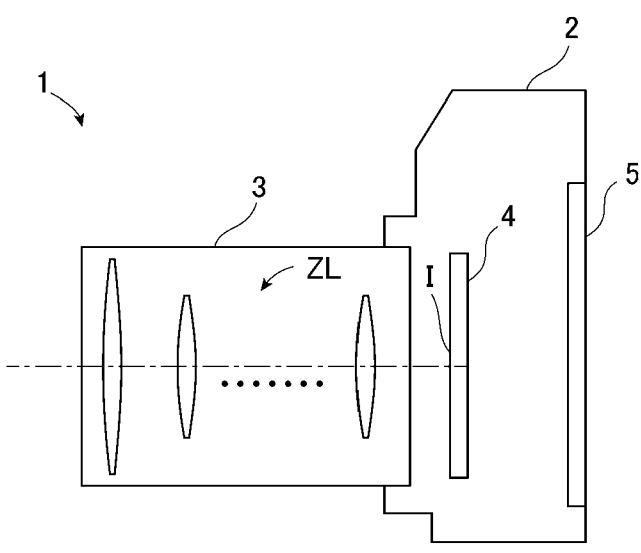
FIG. 22 is a diagram showing a configuration of a digital camera that is one embodiment of an optical apparatus.

FIG. 22 shows a schematic configuration of a digital camera according to one embodiment of an optical apparatus. A digital camera 1 comprises a main body 2 and a photographing lens 3 that can be attached to and detached from the main body 2. The main body 2 includes an image sensor 4, a main body control part (not shown) that controls the operation of the digital camera, and a liquid crystal operation screen 5. The photographing lens 3 includes an optical system ZL consisting of a plurality of lens groups and a lens position control mechanism (not shown) for controlling the position of each lens group. The lens position control mechanism has a sensor that detects the position of the lens group, a motor that moves the lens group back and forth along the optical axis, a control circuit that drives the motor, and the like.

Light from a subject is focused by the optical system ZL of the photographing lens 3 and reaches the image surface I of the image sensor 4. The light from the subject that has reached the image surface I is photoelectrically converted by the image sensor 4 and recorded as digital image data in a memory (not shown). The digital image data recorded in the memory is displayed on the liquid crystal screen 5 according to the user's operation. The following describes the optical system ZL in detail.

The optical system in one embodiment consists of a plurality of lens groups in which: the lens groups comprise a leading lens group, a first focusing lens group, and a second focusing lens group; and the lens groups are arranged in line on the optical axis. The leading lens group is arranged closer to the object than the first focusing lens group, and the second focusing lens group is arranged closer to the image surface than the first focusing lens group. The first focusing lens group includes a positive refractive power and moves toward an image along the optical axis upon focusing from an infinity object to a short distance object. The second focusing lens group includes a negative refractive power and moves toward the object along the optical axis upon focusing from an infinity object to a short distance object. Between the first focusing lens group and the second focusing lens group, there is an intermediate lens group including at least one lens.

The optical system of the above embodiment is provided with an intermediate lens group, so that the first focusing lens group and the second focusing lens group are arranged apart from each other. This can clearly define the division of roles between the two focusing lenses to satisfactorily correct an aberration upon focusing and to achieve high optical performance, especially upon focusing on short distance object.

The optical system in another embodiment consists of a plurality of lens groups in which: the lens groups comprise a leading lens group, a first focusing lens group, and a second focusing lens group; and the lens groups are arranged in line on the optical axis. The leading lens group is arranged closer to the object than the first focusing lens group, and the second focusing lens group is arranged closer to the image surface than the first focusing lens group. The leading lens group is fixed with respect to an image surface upon focusing, the first focusing lens group includes a positive refractive power and moves toward an image along the optical axis upon focusing from an infinity object to a short distance object, and the second focusing lens group includes a negative refractive power and moves toward the object along the optical axis upon focusing from an infinity object to a short distance object. The optical system satisfies the following conditional expression, $$0.20 < dFF/TL < 0.65 \tag{1}$$

dFF: a distance on the optical axis, upon focusing on an infinity object, from the surface, facing an image surface, of the lens arranged closest to an image surface in the first focusing lens group to the surface, facing an object, of the lens arranged closest to the object in the second focusing lens group, and TL: an entire length of the optical system upon focusing on an infinity object.

The conditional expression (1) defines the distance between the first focusing lens group and the second focusing lens group in the form of a ratio to the entire length of the optical system. When the optical system is a zoom optical system, the distance dFF and the entire length TL are values upon focusing on an infinity object at the focal length (zoom position) in which the entire length of the optical system is maximized. Satisfying this conditional expression can form the distance between the first focusing lens group and the second focusing lens group to be a distance suitable for performing good aberration correction upon focusing, and can achieve high optical performance upon focusing on short distance object.

If the corresponding value of conditional expression (1) is greater than the upper limit value of 0.65, the distance between the two focusing lens groups becomes too great, making it difficult to correct an aberration satisfactorily. In order to ensure the effect of this embodiment, the upper limit value of the conditional expression (1) is preferably a smaller value, for example, 0.62, 0.60, 0.58, 0.55, 0.52 or 0.50.

If the corresponding value of the conditional expression (1) is less than the lower limit value of 0.20, the distance between the two focusing lens groups becomes too small, making it difficult to correct an aberration satisfactorily. In order to ensure the effect of this embodiment, the lower limit value of the conditional expression (1) is preferably a greater value, for example, 0.22, 0.24, 0.26, 0.28, 0.30, or 0.32.

Preferably, each of the above optical systems further satisfy the following conditional expression (2), $$0.00 < BF/TL < 0.24 \tag{2}$$

where

BF: back focus of the optical system upon focusing on the infinity object, and

TL: an entire length of the optical system upon focusing on an infinity object.

The conditional expression (2) defines the ratio between the back focus of the optical system and the entire length of the optical system, and means that this optical system is a mirrorless optical system. When the optical system is a zoom optical system, the distance BF and the entire length TL are the values upon focusing on an infinity object at the focal length in which the entire length of the zoom optical system is maximized.

If the corresponding value of conditional expression (2) is greater than the upper limit value of 0.24, the back focus becomes too long, making it difficult to correct various aberrations satisfactorily. In order to ensure the effect of this embodiment, the upper limit value of the conditional expression (2) is preferably a smaller value, for example 0.24, 0.22, 0.20, 0.18, 0.17, or 0.16.

If the corresponding value of conditional expression (2) is less than the lower limit value of 0.00, the lens physically come into contact with the image surface. In order to ensure the effect of this embodiment, the lower limit value of the conditional expression (2) is preferably a greater value, for example, 0.00, 0.02, 0.04, 0.05, 0.06, 0.07, or 0.08.

Preferably, each of the above optical systems further satisfies the following conditional expression (3), $$60.00° < 2\omega < 130.00° \tag{3}$$

where $2\omega$: full angle of view of the optical system upon focusing on the infinity object.

The conditional expression (3) defines the full angle of view of the optical system upon focusing on the infinity object, and indicates that this optical system is a wide-angle lens. When the optical system is a zoom optical system, the distance $2\omega$ is a value upon focusing on an infinity object at a focal length at which the entire length of the optical system is maximized. The upper limit value of 130.00° of conditional expression (3) can be a smaller value, for example 125.00°, 120.00°, 115.00° or 110.00° by adjusting the range of corresponding values of each conditional expression. The lower limit value of 60.00° in the conditional expression (3) can be a greater value, for example 65.00°, 70.00°, 75.00°, or 80.00° by adjusting the range of corresponding values of each conditional expression.

Preferably, each of the above optical systems further satisfies the following conditional expression (4), $$0.20 < f1/fL1 < 1.50 \tag{4}$$

where fL1: a focal length of the first lens, from an object, among the lenses configuring the leading lens group, and f1: a focal length of the lens group closer to the object than the first focusing lens group.

The conditional expression (4) defines the focal length range of the first lens from the object among the lenses that configure the leading lens group (hereinafter referred to as the first lens), in the form of the ratio to the focal length of the leading lens group. When the optical system is a zoom optical system, the focal length fL1 and f1 is a value upon focusing on an infinity object at a focal length at which the entire length of the optical system is maximized. Satisfying this conditional expression can achieve both miniaturization of the optical system and high optical performance.

If the corresponding value of conditional expression (4) is greater than the upper limit value 1.50, the power of the first lens becomes stronger, making it difficult to satisfactorily correct various aberrations such as a coma aberration. In order to ensure the effect of this embodiment, the upper limit value of the conditional expression (4) is preferably a smaller value, for example, 1.45, 1.40, 1.35, 1.30, 1.25, 1.20, 1.15, or 1.10.

If the corresponding value of the conditional expression (4) is less than the lower limit value of 0.20, the power of the first lens becomes weak, making it difficult to miniaturize the optical system. In order to ensure the effect of this embodiment, the lower limit value of the conditional expression (4) is preferably a greater value, for example 0.24, 0.28, 0.32, 0.35, 0.50, 0.60, 0.70, or 0.80.

Preferably, each of the above optical systems further satisfies the following conditional expression (5), $$0.40 < (-f1)/fB < 1.20 \qquad (5)$$

where
- f1: a focal length of the leading lens group
- fB: a combined focal length of a lens group including the first focusing lens group and a succeeding lens group.

The conditional expression (5) defines the ratio between the focal length of the leading lens group and the combined focal length of the lens group including the first focusing lens group and the succeeding lens group. When the optical system is zoom optical system, the focal length f1 and fB is a value upon focusing on an infinity object at a focal length at which the entire length of the optical system is maximized. Satisfying this conditional expression can achieve both miniaturization of the optical system and high optical performance.

If the corresponding value of conditional expression (5) is greater than the upper limit value 1.20, the power of the leading lens group becomes weak, making it difficult to satisfactorily correct various aberrations such as distortion. In order to ensure the effect of this embodiment, the upper limit value of the conditional expression (5) is preferably a smaller value, for example, 1.15, 1.10, 1.05, 1.00, 0.95 or 0.90.

If the corresponding value of conditional expression (5) is less than the lower limit value 0.40, the optical system approaches the retrofocus type and has a longer entire length. In order to ensure the effect of this embodiment, the lower limit value of the conditional expression (5) is preferably a greater value, for example, 0.45, 0.50, 0.55 or 0.60.

Preferably, each of the above optical systems further satisfies the following conditional expression (6), $$0.10 < f1/fR < 0.80 \qquad (6)$$

where
- f1: a focal length of the leading lens group, and
- fR: a focal length of the lens group including the second focusing lens group and the succeeding lens group, upon focusing on an infinity object.

The conditional expression (6) defines the ratio between the focal length of the leading lens group and the focal length of the lens group including the second focusing lens group and the succeeding lens group, and indicates that the optical system is a mirrorless optical system in which a lens group with a negative refractive power is arranged near the image surface. When the optical system is a zoom optical system, the focal length f1 and fR is a value upon focusing on an infinity object at a focal length at which the entire length of the optical system is maximized. Satisfying this conditional expression can satisfactorily correct various aberrations such as field curves.

If the corresponding value of the conditional expression (6) is greater than the upper limit value of 0.80, the power of the lens group including the second focusing lens group and the succeeding lens group becomes strong, making it difficult to satisfactorily correct various aberrations such as field curves. In order to ensure the effect of this embodiment, the upper limit value of conditional expression (6) is preferably a smaller value, for example 0.77, 0.75, 0.73, 0.70 or 0.68.

If the corresponding value of conditional expression (6) is less than the lower limit value of 0.10, the power of the lens group including the second focusing lens group and the succeeding lens group becomes weak, losing the effect obtained by focusing using the two focusing lens groups. In order to ensure the effect of this embodiment, the lower limit value of the conditional expression (6) is preferably a greater value, for example, 0.12, 0.15, 0.17, 0.20 or 0.22.

Preferably, each of the above optical systems further satisfies the following conditional expression (7), $$0.000 < f1 \times \Sigma\{1/(fLk \times vdLk)\} < 0.020 \qquad (7)$$

where
- f1: a focal length of the leading lens group,
- fLk: a focal length of the k-th lens, from an object, among the lenses configuring the leading lens group, and
- vdLk: the Abbe number of the k-th lens, from an object, among the lenses configuring the leading lens group.

The conditional expression (7) defines the achromatization function by the leading lens group. When the optical system is a zoom optical system, focal length f1 and fLk is a value upon focusing on an infinity object at a focal length at which the entire length of the optical system is maximized. Selecting a lens configuring the leading lens group so as to satisfy this conditional expression can satisfactorily correct chromatic aberration.

If the corresponding value of conditional expression (7) is greater than the upper limit value of 0.020, it becomes difficult to satisfactorily correct a chromatic aberration of magnification. In order to ensure the effect of this embodiment, the upper limit value of the conditional expression (7) is preferably a smaller value, for example, 0.018, 0.016, 0.015 or 0.014.

If the corresponding value of conditional expression (7) is less than the lower limit value of 0.000, it becomes difficult to satisfactorily correct a chromatic aberration of magnification. In order to ensure the effect of this embodiment, the lower limit value of the conditional expression (7) is preferably a greater value, for example, 0.002, 0.004, 0.005 or 0.006.

Preferably, each of the above optical systems further satisfies the following conditional expression (8), $$-1.00 < (L1R2 - L1R1)/(L1R1 + L1R2) < 0.00 \qquad (8)$$

where
- L1R1: the radius of curvature of the surface, facing an object, of the lens arranged closest to the object in the optical system, and
- L1R2: the radius of curvature of the surface, facing an image surface, of the lens arranged closest to the object.

The conditional expression (8) defines the shape factor of the first lens, and indicates that the first lens is a negative meniscus lens having a convex surface facing an object. Using a lens that satisfies this conditional expression as the first lens can satisfactorily correct various aberrations.

If the corresponding value of conditional expression (8) is greater than the upper limit value of 0.00, it becomes difficult to satisfactorily correct various aberrations such as coma aberrations. In order to ensure the effect of this embodiment, the upper limit value of the conditional expression (8) is preferably a smaller value, for example, −0.10, −0.15, −0.20, −0.25, −0.30, −0.35, −0.40 or −0.42.

If the corresponding value of conditional expression (8) is less than the lower limit value −1.00, it becomes difficult to satisfactorily correct various aberrations such as distortion. In order to ensure the effect of this embodiment, the lower limit value of the conditional expression (8) is preferably a greater value, for example, −0.98, −0.94, −0.90, −0.88, −0.86 or −0.84.

Preferably, each of the above optical systems further satisfies the following conditional expression (9), $$-0.50 < (LeR2 - LeR1)/(LeR2 + LeR1) < 1.00 \tag{9}$$

where
  LeR1: the radius of curvature of the surface, facing an object, of the lens arranged closest to an image surface in the optical system, and
  LeR2: the radius of curvature of the surface, facing an image surface, of the lens arranged closest to an image surface.

The conditional expression (9) defines the shape factor of the lens arranged closest to an image surface in the optical system, and indicates that the lens closest to an image surface is a positive meniscus lens or a negative meniscus lens having a convex surface facing an image surface.

If the corresponding value of conditional expression (9) is greater than the upper limit value 1.00, the lens closest to the above image surface becomes a lens with strong negative refractive power, making it difficult to satisfactorily correct various aberrations such as field curves. In order to ensure the effect of this embodiment, the upper limit value of the conditional expression (9) is preferably a smaller value, for example, 0.90, 0.80, 0.70, 0.60, 0.50 or 0.40.

If the corresponding value of conditional expression (9) is less than the lower limit value −0.50, the lens closest to the above image surface becomes a lens having strong positive refractive power to extend back focus, making it difficult to miniaturize the optical system. In order to ensure the effect of this embodiment, the lower limit value of the conditional expression (9) is preferably a greater value, for example, −0.45, −0.40, −0.35, −0.30, −0.25, −0.20, −0.15, or −0.10.

Preferably, each of the above optical systems further satisfies the following conditional expression (10), $$0.10 < fF1/(-fF2) < 1.50 \tag{10}$$

where
  fF1: a focal length of the first focusing lens group, and
  fF2: a focal length of the second focusing lens group.

The conditional expression (10) defines the ratio between the focal length of the first focusing lens group and the focal length of the second focusing lens group, and represents the proper balance of focal lengths of the two focusing lens groups. When the optical system is a zoom optical system, focal lengths fF1 and fF2 are values upon focusing on an infinity object at the focal length at which the entire length of the optical system is maximized. Satisfying this conditional expression can satisfactorily correct aberrations from a state of focusing on an infinity object to a state of focusing on a short distance object.

If the corresponding value of the conditional expression (10) is greater than the upper limit value 1.50, the power of the second focusing lens group becomes strong, making it difficult to satisfactorily correct various aberrations such as coma aberrations. In order to ensure the effect of this embodiment, the upper limit value of the conditional expression (10) is preferably a smaller value, for example, 1.45, 1.40, 1.35, 1.30, 1.25, 1.20, 1.15, 1.10, or 1.05.

If the corresponding value of conditional expression (10) is less than the lower limit value of 0.10, the power of the second focusing lens group becomes weak, making it difficult to satisfactorily correct various aberrations such as field curves upon focusing on a short distance object. In order to ensure the effect of this embodiment, the lower limit value of the conditional expression (10) is preferably a greater value, for example, 0.15, 0.20, 0.25 or 0.30.

Preferably, each of the above optical systems further satisfies the following conditional expression (11), $$-0.30 < 1/\beta F1 < 0.95 \tag{11}$$

where
  βF1: a lateral magnification of the first focusing lens group upon focusing on an infinity object.

The conditional expression (11) defines the lateral magnification of the first focusing lens group upon focusing on an infinity object. When the optical system is a zoom optical system, the lateral magnification βF1 is a value upon focusing on an infinity object at the focal length at which the entire length of the optical system is maximized. Satisfying this conditional expression (11) can reduce fluctuations in various aberrations such as spherical aberrations upon focusing from an infinity object to a short distance object, and achieve high optical performance over the entire range.

If the corresponding value of the conditional expression (11) is greater than the upper limit value of 0.95, it becomes difficult to reduce fluctuations in various aberrations upon focusing. In order to ensure the effect of this embodiment, the upper limit value of the conditional expression (11) is preferably a smaller value, for example, 0.90, 0.85, 0.80, 0.75, 0.70, 0.65, 0.60, 0.55, or 0.50.

If the corresponding value of the conditional expression (11) is less than the lower limit value −0.30, it becomes difficult to reduce fluctuations in various aberrations during focusing. In order to ensure the effect of this embodiment, the lower limit value of the conditional expression (11) is preferably a greater value, for example, −0.25, −0.20, −0.15, −0.10, or −0.05.

Preferably, each of the above optical systems further satisfies the following conditional expression (12), $$0.100 < 1/\beta F2 < 1.000 \tag{12}$$

where
  βF2: a lateral magnification of the second focusing lens group upon focusing on an infinity object.

The conditional expression (12) defines the lateral magnification of the second focusing lens group upon focusing on an infinity object. When the optical system is a zoom optical system, the lateral magnification βF2 is a value upon focusing on an infinity object at the focal length at which the entire length of the optical system is maximized. Satisfying this conditional expression can reduce fluctuations in various aberrations such as spherical aberrations upon focusing from an infinity object to a short distance object, and achieve high optical performance over the entire range.

If the corresponding value of the conditional expression (12) is greater than the upper limit value of 1.000, it becomes difficult to reduce fluctuations in various aberrations upon focusing. In order to ensure the effect of this embodiment, the upper limit value of the conditional expression (12) is preferably a smaller value, for example, 0.998, 0.995, 0.993, 0.990, 0.985, 0.980, 0.970, or 0.950.

If the corresponding value of the conditional expression (12) is less than the lower limit value of 0.100, it becomes difficult to reduce fluctuations in various aberrations upon focusing. In order to ensure the effect of this embodiment, the lower limit value of the conditional expression (12) is preferably a greater value, for example, 0.150, 0.200, 0.250, 0.300, 0.400, 0.500, 0.550, 0.600, 0.650, or 0.700.

Preferably, each of the above optical systems further satisfies the following conditional expression (13), $$\{\beta F1+(1/\beta F1)\}^{-2}<0.250 \tag{13}$$

where

βF1: a lateral magnification of the first focusing lens group upon focusing on an infinity object.

The conditional expression (13) defines the condition satisfied by the lateral magnification of the first focusing lens group upon focusing on an infinity object. When the optical system is a zoom optical system, the lateral magnification βF1 is a value upon focusing on an infinity object at the focal length at which the entire length of the optical system is maximized. Satisfying this conditional expression (13) can reduce fluctuations in various aberrations such as spherical aberrations upon focusing from an infinity object to a short distance object, and achieve high optical performance over the entire range.

If the corresponding value of the conditional expression (13) is greater than the upper limit value of 0.250, it becomes difficult to reduce fluctuations in various aberrations upon focusing. In order to ensure the effect of this embodiment, the upper limit value of the conditional expression (13) is preferably a smaller value, for example, 0.245, 0.240, 0.200, 0.175, 0.150, 0.125 or 0.100.

Preferably, each of the above optical systems further satisfies the following conditional expression (14), $$\{\beta F2+(1/\beta F2)\}^{-2}<0.250 \tag{14}$$

where

βF2: a lateral magnification of the second focusing lens group upon focusing on an infinity object.

The conditional expression (14) defines the condition satisfied by the lateral magnification of the second focusing lens group upon focusing on an infinity object. When the optical system is a zoom optical system, the lateral magnification βF2 is a value upon focusing on an infinity object at the focal length at which the entire length of the optical system is maximized. Satisfying this conditional expression (14) can reduce fluctuations in various aberrations such as spherical aberrations upon focusing from an infinity object to a short distance object, and achieve high optical performance over the entire range.

If the corresponding value of the conditional expression (14) is greater than the upper limit value of 0.250, it becomes difficult to reduce fluctuations in various aberrations upon focusing. In order to ensure the effect of this embodiment, the upper limit value of the conditional expression (14) is preferably a smaller value, for example, 0.24998, 0.24996 or 0.24994.

Preferably, each of the above optical systems further satisfies the following conditional expression (15), $$-0.20<\beta F1/\beta F2<0.80 \tag{15}$$

where

βF1: a lateral magnification of the first focusing lens group upon focusing on an infinity object, and βF2: a lateral magnification of the second focusing lens group upon focusing on an infinity object.

The conditional expression (15) defines the ratio between the lateral magnifications of the first focusing lens group and the second focusing lens group upon focusing on an infinity object. When the optical system is a zoom optical system, the lateral magnifications βF1 and βF2 are values upon focusing on an infinity object at the focal length at which the entire length of the optical system is maximized. Satisfying this conditional expression can satisfactorily correct aberrations from a state of focusing on an infinity object to a state of focusing on a short distance object.

If the corresponding value of the conditional expression (15) is greater than the upper limit value of 0.80, the lateral magnification of the first focusing lens group is too great, making it difficult to satisfactorily correct various aberrations such as spherical aberrations. In order to ensure the effect of this embodiment, the upper limit value of the conditional expression (15) is preferably a smaller value, for example, 0.75, 0.70, 0.65, 0.60, 0.55, 0.50 or 0.45.

If the corresponding value of the conditional expression (15) is less than the lower limit value −0.20, the lateral magnification of the first focusing lens group is too small, making it difficult to satisfactorily correct various aberrations such as coma aberrations. In order to ensure the effect of this embodiment, the lower limit value of the conditional expression (15) is preferably a greater value, for example, −0.16, −0.12, −0.08 or −0.04.

Preferably, each of the above optical systems further satisfies the following conditional expression (16), $$-1.00<MF1/MF2<-0.01 \tag{16}$$

where

MF1: a movement amount of the first focusing lens group upon focusing from an infinity object to a close distance object, and MF2: a movement amount of the second focusing lens group upon focusing from an infinity object to a close distance object. (A movement amount toward an image surface is represented as a positive value.)

The conditional expression (16) defines the ratio between the movement amounts of the two focusing lens groups upon focusing from an infinity object to a close distance object. When the optical system is a zoom optical system, the movement amounts MF1 and MF2 are values upon focusing on an infinity object at the focal length at which the entire length of the optical system is maximized. Satisfying this conditional expression can satisfactorily correct various aberrations such as field curves upon focusing from an infinity object to a close distance object, and can effectively reduce aberration fluctuation.

If the corresponding value of the conditional expression (16) is greater than the upper limit value of −0.01, the movement amount of the second focusing lens group becomes too great, increasing the size of the entire optical system. In order to ensure the effect of this embodiment, the upper limit value of the conditional expression (16) is preferably a smaller value, for example, −0.03, −0.05, −0.07, or −0.08.

If the corresponding value of the conditional expression (16) is less than the lower limit value −1.00, the movement amount of the second focusing lens group becomes too small, making it difficult to achieve sufficient focusing accuracy. In order to ensure the effect of this embodiment, the lower limit value of the conditional expression (16) is preferably a greater value, for example, −0.9, −0.8, −0.7, −0.6, −0.5 and −0.45.

Preferably, each of the above optical systems further satisfies the following conditional expression (17), $$0.10<(-f1)/fF1<0.60 \tag{17}$$

where f1: a focal length of the leading lens group, and fF1: a focal length of the first focusing lens group

The conditional expression (17) defines the ratio between the focal length of the leading lens group and the focal length of the first focusing lens group, and indicates the proper range of power of the leading lens group. When the optical system is a zoom optical system, the focal lengths f1 and fF1 are values upon focusing on an infinity object at the focal length at which the entire length of the optical system is maximized. Satisfying this conditional expression can achieve good short-distance performance.

If the corresponding value of the conditional expression (17) is greater than the upper limit value of 0.60, the power of the first focusing lens group is too strong, making it difficult to satisfactorily correct various aberrations such as coma aberrations. In order to ensure the effect of this embodiment, the upper limit value of the conditional expression (17) is preferably a smaller value, for example, 0.60, 0.55, 0.50, 0.45 or 0.42.

If the corresponding value of conditional expression (17) is less than the lower limit value of 0.10, the power of the first focusing lens group is too weak and the movement amount of the focusing lens group needs to increase, making it difficult to miniaturize the entire optical system. In order to ensure the effect of this embodiment, the lower limit value of the conditional expression (17) is preferably a greater value, for example, 0.10, 0.12, 0.15, 0.17, 0.20, or 0.21.

Preferably, each of the above optical systems further satisfies the following conditional expression (18), $$0.02 < f1/fF2 < 0.60 \tag{18}$$

where
f1: a focal length of the leading lens group, and
fF2: a focal length of the second focusing lens group.

The conditional expression (18) defines the ratio between the focal length of the leading lens group and the focal length of the second focusing lens group, and indicates a proper range of power of the leading lens group for good aberration correction. When the optical system is a zoom optical system, the focal lengths fF1 and fF2 are values upon focusing on an infinity object at the focal length at which the entire length of the optical system is maximized. Satisfying this conditional expression can achieve good short-distance performance.

If the corresponding value of the conditional expression (18) is greater than the upper limit value of 0.60, the power of the second focusing lens group is too strong, making it difficult to satisfactorily correct various aberrations such as coma aberrations. In order to ensure the effect of this embodiment, the upper limit value of the conditional expression (18) is preferably a smaller value, for example, 0.55, 0.50, 0.45, 0.40, or 0.35.

If the corresponding value of conditional expression (18) is less than the lower limit value 0.02, the power of the second focusing lens group is too weak, making it difficult to satisfactorily correct various aberrations such as field curves upon focusing on a short distance object. In order to ensure the effect of this embodiment, the lower limit value of the conditional expression (18) is preferably a greater value, for example, 0.04, 0.06, or 0.08.

Preferably, each of the above optical systems further satisfies the following conditional expression (19), $$0.20 < fA/fF1 < 0.80 \tag{19}$$

fA: a combined focal length of the intermediate lens group between the first focusing lens group and the second focusing lens group, and
fF1: a focal length of the first focusing lens group.

The conditional expression (19) defines the ratio of: the combined focal length of the intermediate lens group between the first focusing lens group and the second focusing lens group; to the focal length of the first focusing lens group. When the optical system is a zoom optical system, the focal lengths fA and fF1 are values upon focusing on an infinity object at the focal length at which the entire length of the optical system is maximized. Satisfying this conditional expression can cause the intermediate lens group to have proper power, and can achieve high optical performance.

If the corresponding value of the conditional expression (19) is greater than the upper limit value of 0.80, the power of the intermediate lens group is too weak, making it difficult to satisfactorily correct various aberrations such as spherical aberrations. In order to ensure the effect of this embodiment, the upper limit value of the conditional expression (19) is preferably a smaller value, for example, 0.75, 0.70, 0.65, or 0.60.

If the corresponding value of the conditional expression (19) is less than the lower limit value of 0.20, the power of the intermediate lens group is too strong, making it difficult to achieve sufficient optical performance upon focusing on a short distance object. In order to ensure the effect of this embodiment, the lower limit value of the conditional expression (19) is preferably a greater value, for example, 0.25, 0.30, 0.35, or 0.40.

Preferably, each of the above optical systems further satisfies the following conditional expression (20), $$0.00 < (1 - \beta F2^2) \times \beta R2 \times MF2 < 2.00 \tag{20}$$

where
$\beta F2$: a lateral magnification of the second focusing lens group upon focusing on an infinity object,
$\beta R$: a total magnification of a lens group including the second focusing lens group and the succeeding lens group, and
MF2: a movement amount of the second focusing lens group upon focusing from an infinity object to a close distance object.

The conditional expression (20) defines the moving direction of the second focusing lens group, and indicates that the second focusing lens group moves in the direction opposite to the direction for focusing to correct the aberration. When the optical system is a zoom optical system, the lateral magnification $\beta F2$, the total magnification $\beta R$, and the movement amount MF2 are values upon focusing on an infinity object at a focal length at which the entire length of the optical system is maximized. Satisfying this conditional expression can satisfactorily correct various aberrations and reduce aberration fluctuation upon focusing without increasing the size of the optical system.

If the corresponding value of the conditional expression (20) is greater than the upper limit value 2.00, the movement amount for focusing increases too much, making it difficult to miniaturize the optical system. In order to ensure the effect of this embodiment, the upper limit value of the conditional expression (20) is preferably a smaller value, for example, 1.90, 1.80, 1.70, 1.60, or 1.50.

If the corresponding value of the conditional expression (20) is less than the lower limit value of 0.00, it becomes difficult to reduce the fluctuation of the field curves upon focusing on a short distance object. In order to ensure the effect of this embodiment, the lower limit value of the conditional expression (20) is preferably a greater value, for example, 0.01, 0.02, 0.03, or 0.04.

Preferably, each of the above optical systems further satisfies the following conditional expression (21), $$0.10 < dF1/TL < 0.50 \qquad (21)$$

where dF1: a distance on the optical axis, upon focusing on an infinity object, from the surface, facing an object, of the lens arranged closest to the object in the optical system to the surface, facing an object, of the lens arranged closest to the object in the first focusing lens group, and TL: an entire length of the optical system upon focusing on an infinity object.

The conditional expression (21) defines the ratio between: the distance on the optical axis from the surface, facing an object, of the lens arranged closest to the object in the optical system to the surface, facing an object, of the lens arranged closest to the object in the first focusing lens group; and the entire length of the optical system. The conditional expression (21) indicates a proper range of positions of the first focusing lens group in the optical system. When the optical system is a zoom optical system, the distance dF and the entire length TL are values upon focusing on an infinity object at the focal length at which the entire length of the optical system is maximized. The range defined by conditional expression (21) means that the first focusing lens group is arranged in front of the optical system (closer to the object) and the two focusing lens groups are separated from each other. Satisfying this conditional expression can satisfactorily correct various aberrations such as field curves.

If the corresponding value of the conditional expression (21) is greater than the upper limit value of 0.50, the position of the first focusing lens group is too far backward (away from the object), increasing the size of the optical system. In order to ensure the effect of this embodiment, the upper limit value of the conditional expression (21) is preferably a smaller value, for example, 0.48, 0.46, 0.44, or 0.43.

If the corresponding value of conditional expression (21) is less than the lower limit value of 0.10, the first focusing lens group is too far forward (close to the object), making it difficult to satisfactorily correct various aberrations such as coma aberrations. In order to ensure the effect of this embodiment, the lower limit value of the conditional expression (21) is preferably a greater value, for example, 0.12, 0.15, 0.17, 0.20, or 0.22.

Preferably, the above optical systems further satisfies the following conditional expression (22), $$0.50 < dF2/TL < 0.90 \qquad (22)$$

where dF2: a distance on the optical axis, upon focusing on an infinity object, from the surface, facing an object, of the lens arranged closest to an object in the optical system to the surface, facing an object, of the lens arranged closest to the object in the second focusing lens group, and TL: an entire length of the optical system upon focusing on an infinity object.

The conditional expression (22) defines the ratio between: the distance on the optical axis from the surface, facing an object, of the lens arranged closest to an object in the optical system to the surface, facing an object, of the lens arranged closest to an object in the second focusing lens group; and the entire length of the optical system upon focusing on an infinity object. Therefore, the conditional expression (22) indicates a proper range of positions of the second focusing lens group in the optical system. When the optical system is a zoom optical system, the distance dF2 and the entire length TL are values upon focusing on an infinity object at the focal length at which the entire length of the optical system is maximized. The range defined by conditional expression (22) means that the second focusing lens group is arranged on the back side of the optical system (closer to the image surface) to separate the two focusing lens groups from each other. Satisfying this conditional expression can satisfactorily correct various aberrations such as field curves.

Since the image surface is arranged on the back side of the second focusing lens group, there is a physical limit to the arrangement position when the second focusing lens group is arranged closer to an image surface. The upper limit value of 0.90 in the conditional expression (22) indicates this physical limit. In order to ensure the effect of this embodiment, the upper limit value of the conditional expression (22) is preferably a smaller value, for example 0.88, 0.86, 0.84 or 0.83.

If the corresponding value of the conditional expression (22) is less than the lower limit value of 0.50, the second focusing lens group is too far forward, making it difficult to sufficiently correct various aberrations. In order to ensure the effect of this embodiment, the lower limit value of the conditional expression (22) is preferably a greater value, for example, 0.55, 0.60, 0.65, 0.70, 0.72, or 0.74.

Subsequently, the following outlines a method for manufacturing the above optical system with reference to FIGS. 23 and 24.

In the method for manufacturing illustrated in FIG. 23, a plurality of lens groups including a leading lens group, a first focusing lens group, and a second focusing lens group are arranged on the optical axis, and are arranged in a lens barrel. At this time, the leading lens group is arranged closer to the object than the first focusing lens group, and the second focusing lens group is arranged closer to an image surface than the first focusing lens group (ST1). The first focusing lens group includes a positive refractive power and moves toward an image surface along the optical axis upon focusing from an infinity object to a short distance object. The second focusing lens group has negative refractive power and moves toward the object along the optical axis upon focusing from the infinity object to the short distance object (ST2). An intermediate lens group including at least one lens is arranged between the first focusing lens group and the second focusing lens group (ST3).

In the method for manufacturing illustrated in FIG. 24, a plurality of lens groups including a leading lens group, a first focusing lens group, and a second focusing lens group are arranged in line on the optical axis, and are arranged in a lens barrel. At this time, the leading lens group is arranged closer to an object than the first focusing lens group, and the second focusing lens group is arranged closer to an image surface than the first focusing lens group (ST1). The leading lens group is fixed with respect to an image surface upon focusing. The first focusing lens group includes a positive refractive power and moves toward an image surface along the optical axis upon focusing from an infinity object to a short distance object. The second focusing lens group has negative refractive power and moves toward an object along the optical axis upon focusing from the infinity object to the short distance object (ST2). Further, each lens group is arranged in the lens barrel so as to satisfy the following conditional expression, $$0.20 < dFF/TL < 0.65$$

where dFF: a distance on the optical axis, upon focusing on an infinity object, from the surface, facing an image surface, of the lens arranged closest to an image surface in the first focusing lens group to the surface, facing an object, of the lens arranged closest to the object in the second focusing lens group, and TL: an entire length of the optical system upon focusing on an infinity object.

The optical system manufactured by the above procedure and the optical apparatus equipped with the optical system has: an intermediate lens group between the first focusing lens group and the second focusing lens group; or a distance kept properly between the first focusing lens group and the second focusing lens group. This clearly defines the division of roles between the first focusing lens group and the second focusing lens group. As a result, when the first focusing lens group moves toward an image surface and the second focusing lens moves toward an object to focus from an infinity object to a short distance object, various aberrations are satisfactorily corrected and high optical performance can be achieved also in a state of focusing on short distance object.

EXAMPLES

The following further describes the above optical system by showing eight numerical examples from Example 1 to Example 8. The first describes how to read figures and tables referred to in description of each example. FIG. 1, FIG. 4, FIG. 7, FIG. 10, FIG. 13, FIG. 16, FIG. 18, and FIG. 20 each show an arrangement of lens groups of an optical system in each example in a cross sectional view. In the upper part of each figure, arrows together with the letters "focusing" and "∞" indicate moving directions of the focusing lens groups upon focusing from an infinity object to a short distance object. In addition, in the case of the zoom optical system, arrows in the lower part of each figure indicate movement trajectories of the lens groups G and an aperture stop S along the optical axis in zooming from a wide angle end state (W) to a telephoto end state (T).

In these figures, each lens group is represented by a combination of a character G and a numeral, and each lens is represented by a combination of a character L and a numeral. In this description, in order to prevent complication due to an increase in the number of characters and numerals, numbering is performed for each example. Therefore, a plurality of examples may use identical combinations of characters and numerals, but this does not mean that the configurations indicated by the combinations of characters and numerals are the same.

FIGS. 2A, 2B, 5A, 5B, 8A, 8B, 11A, 11B, 14A and 14B are graphs showing various aberrations of optical systems upon focusing on an infinity object in Examples 1 to 5. Each figure with character A shows various aberrations in the wide angle end state, and each figure with character B shows various aberrations in the telephoto end state. In addition, FIGS. 3A, 3B, 6A, 6B, 9A, 9B, 12A, 12B, 15A and 15B are graphs showing various aberrations of the optical system upon focusing on a close distance object in Examples 1 to 5. Each figure with character A shows various aberrations in the wide angle end state, and each figure with character B shows various aberrations in the telephoto end state. FIGS. 17A, 17B, 19A, 19B, 21A and 21B are graphs showing various aberrations of the optical system in Examples 6 to 8. Each figure with character A shows various aberrations upon focusing on an infinity object, and each figure with character B shows various aberrations upon focusing on a short distance object.

In these figures, FNO indicates F number, NA indicates numerical aperture, and Y indicates image height. The spherical aberration graphs show the value of the F number or numerical aperture corresponding to the maximum aperture, the astigmatism graphs and the distortion graphs show the maximum value of the image height, and the lateral aberration graphs show the value of each image height. Further, d indicates d-line ($\lambda$=587.6 nm), and g indicates g line ($\lambda$=435.8 nm). In the astigmatism graphs, the solid lines show the sagittal image surfaces and the broken lines show the meridional image surfaces. The distortion graphs show the distortions based on the d-lines, and the chromatic aberration of magnification graphs show the chromatic aberrations of magnification based on the g-lines.

Subsequently, the following describes tables used to describe the respective examples. In the [general data] table, f indicates the focal length of the entire lens system, FNO indicates the F number, 2$\omega$ indicates the angle of view (Unit is ° (degree) and $\omega$ is half angle of view), and Y indicates the maximum image height. TL indicates the distance obtained by adding BF to the distance from the frontmost surface of the lens to the backmost surface of the lens on the optical axis upon focusing on an infinity object. BF indicates the air equivalent distance (back focus) from the backmost surface of the lens to the image surface I on the optical axis upon focusing on an infinity object.

In the [lens data] table, the surface number indicates the order of the optical surface from an object in the direction of travel of the light beam; R indicates the radius of curvature of each optical surface (where a surface having the center of curvature on the side of an image surface has a positive radius of curvature); D indicates the surface distance, which is the distance on the optical axis from each optical surface to the next optical surface (or image surface); nd indicates the refractive index for the d-line of the material of the optical member; and vd indicates the Abbe number based on the d-line of the material of the optical member. The surface distance (Di) means that the distance from a surface i to the next surface is variable. S indicates an aperture stop, and "∞" of the radius of curvature indicates a flat surface or an aperture. The description of refractive index nd=1.00000 for air is omitted. When the lens surface is an aspherical surface, the surface number is marked with * and the column of radius of curvature R indicates the paraxial radius of curvature.

In the table of [aspherical surface data], the shape of the aspherical surface shown in [lens data] is shown by the following formula (A). X(y) indicates the distance (sag amount) in the optical axis direction from the tangent plane at the vertex of the aspherical surface to the position on the aspherical surface at the height y; R indicates the radius of curvature (paraxial radius of curvature) of the reference sphere surface; $\kappa$ indicates the conic constant; and Ai indicates the i-th order aspherical coefficient. "E-n" indicates "$\times 10^{-n}$". For example, $1.234\text{E-}05 = 1.234 \times 10^{-5}$. Note that the second-order aspherical coefficient A2 is 0, and the description thereof is omitted.

$$X(y)=(y2/R)/\{1+(1-\kappa \times y2/R2)^{1/2}\}+A4\times y4+A6\times y6+A8\times y8+A10\times y10+A12\times y12 \tag{A}$$

The table of [lens group data] shows the first surface (the surface closest to the object), the focal length, the magnification upon focusing on an infinity object in the wide angle end state, and the magnification upon focusing on an infinity object in the telephoto end state, of each lens group. The table of [the first lens group data] shows the focal length of each lens configuring the first lens group shown in lens group data.

The table of [variable distance data] shows the surface distance to the next surface in the surface number i where the surface distance is (Di) in the table showing [lens data]. The surface distance indicates the surface distance upon focusing on an infinity object and the surface distance upon focusing on a close-distance.

Note that, since "mm" is generally used as units of the focal length f, the radius of curvature R, the surface distance D, and other lengths, the unit of the lengths is also "mm" in each table of this description. However, the length unit is not necessarily limited to "mm" because the same optical performance can be obtained if the optical system is proportionally expanded or contracted.

The above descriptions on the figures and tables are common to all the examples, and the following omits the duplicate descriptions.

Example 1

Figure 1:
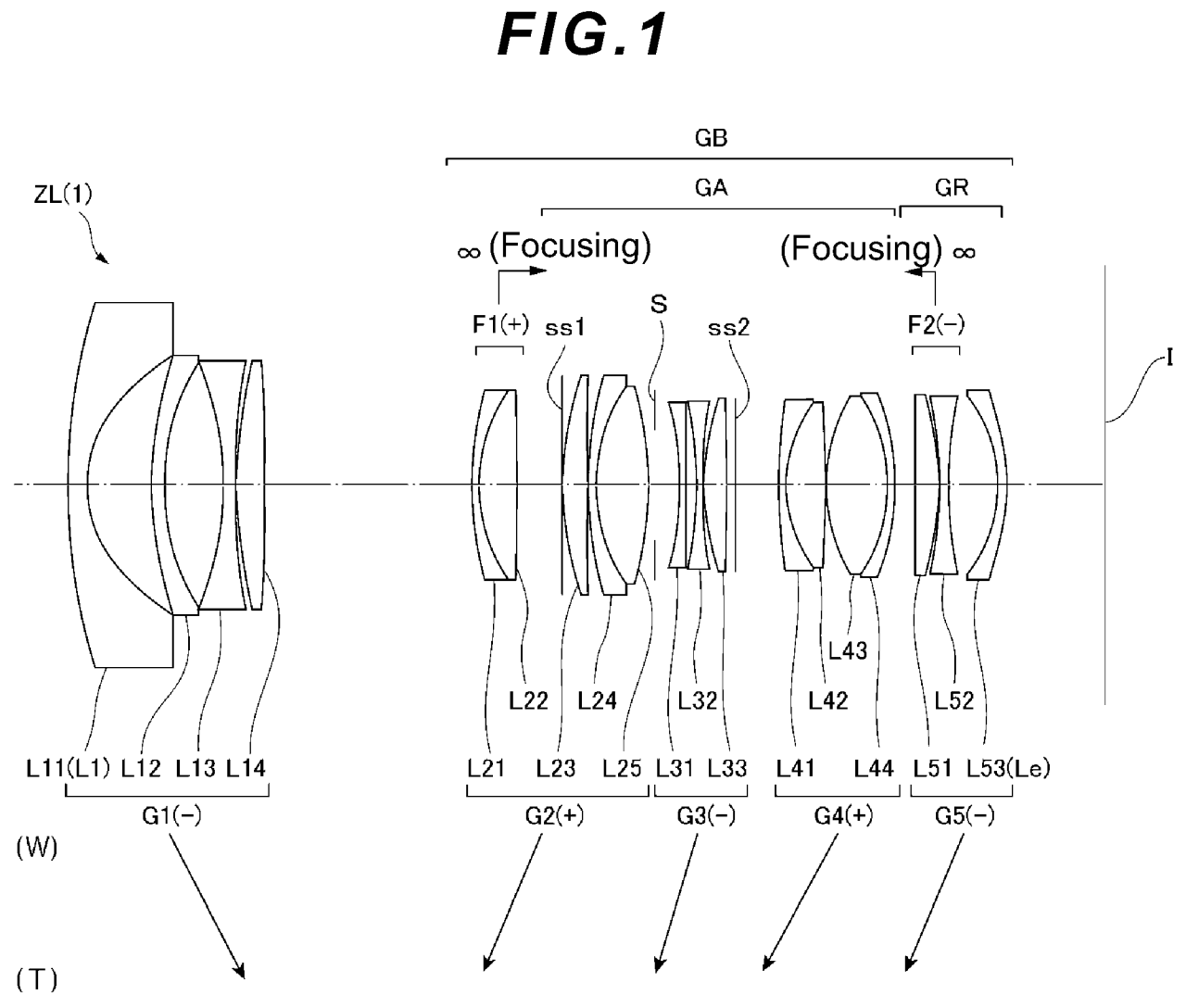

The following describes Example 1 with reference to FIGS. 1, 2, 3 and Table 1. FIG. 1 is a diagram showing a lens configuration of an optical system ZL(1) according to Example 1. The optical system ZL (1) comprises: the first lens group G1 having negative refractive power; a second lens group G2 having positive refractive power; a third lens group G3 having negative refractive power; a fourth lens group G4 having positive refractive power; and a fifth lens group G5 having negative refractive power, which are placed in order from an object. The image surface I is located on the back side of the fifth lens group G5. A first sub-aperture stop ss1 is arranged in the second lens group G2, and an aperture stop S and a second sub-aperture stop ss2 are arranged in the third lens group G3. A first focusing lens group F1 is configured of a part of lens group in the second lens group G2, and a second focusing lens group F2 is configured of a part of lens group in the fifth lens group G5.

The respective lens groups move on trajectories indicated by arrows in the lower part of FIG. 1 when the optical system zooms from a wide angle end state (W) to a telephoto end state (T). The first lens group G1 moves toward an image surface, and the lens group (succeeding lens group GB) from the second lens group G2 to the fifth lens group G5 moves toward an object. Thus changing the distance between the first lens group G1 and the succeeding lens group changes the photographing magnification (performs zooming). In zooming, the second lens group G2 including the first focusing lens group F1 and the fifth lens group G5 including the second focusing lens group F2 move in the same direction by the same distance, which makes the movement trajectories identical. Upon focusing from an infinity object to a short distance object, as shown by the arrows in the upper part of FIG. 1, the first focusing lens group F1 moves toward an image surface and the second focusing lens group F2 moves toward an object.

The first lens group G1 comprises: a negative meniscus lens L11 having a convex surface facing an object; a negative meniscus lens L12 having a convex surface facing an object; a biconcave negative lens L13; and a biconvex positive lens L14. Note that both surfaces of the negative meniscus lens L11 are aspherical surfaces, and the surface, facing an image, of the negative meniscus lens L12 is an aspherical surface.

The second lens group G2 comprises: a cemented positive lens of a negative meniscus lens L21 having a convex surface facing an object and a biconvex positive lens L22; the first sub-aperture stop ss1; a positive meniscus lens L23 having a convex surface facing the object; and a cemented positive lens of a negative meniscus lens L24 having a convex surface facing an object and a biconvex positive lens L25. Of these, the cemented positive lens of the negative meniscus lens L21 and the biconvex positive lens L22 functions as the first focusing lens group F1.

The third lens group G3 comprises: an aperture stop S; a negative meniscus lens L31 having a concave surface facing an object; a biconcave negative lens L32; a biconvex positive lens L33; and the second sub-aperture stop ss2.

The fourth lens group G4 comprises: a cemented positive lens of a negative meniscus lens L41 having a convex surface facing an object and a biconvex positive lens L42; and cemented positive lens of a biconvex positive lens L43 and a negative meniscus lens L44 having a concave surface facing an object.

The fifth lens group G5 comprises: a biconvex positive lens L51; a biconcave negative lens L52; and a negative meniscus lens L53 having a concave surface facing an object. Of these, the positive lens L51 and the negative lens L52 function as the second focusing lens group F2. Note that the surface, facing an image, of the negative lens L52 and the surface, facing an image, of the negative meniscus lens L53 are aspherical surfaces.

In this example, the intermediate lens group GA is a lens group from the sub-aperture stop ss1 in the second lens group G2 to the negative meniscus lens L44 of the fourth lens group G4, and the lens group GR including the second focusing lens group and the succeeding lens group is the fifth lens group G5.

Table 1 lists values of data of the optical system according to Example 1.

TABLE 1

| [General Data] Zooming ratio = 2.061 | | |
| --- | --- | --- |
| | W | T |
| f | 16.500 | 34.000 |
| F.NO | 2.910 | 2.910 |
| 2ω(°) | 105.504 | |
| Ymax | 20.787 | 21.700 |
| TL | 157.563 | 147.452 |
| BF | 14.914 | 34.732 |
| MF1 | 3.954 | 4.587 |
| MF2 | −1.009 | −1.746 |
| fAw | 43.772 | |
| fBw | 37.589 | |
| fRw | −67.020 | |

| [Lens Data] | | | | |
| --- | --- | --- | --- | --- |
| Surface Number Object Surface | R ∞ | D | nd | vd |
| 1* | 104.5721 | 2.800 | 1.82098 | 42.50 |
| 2* | 17.0784 | 9.901 | | |
| 3 | 60.0168 | 2.000 | 1.82098 | 42.50 |
| 4* | 39.8844 | 8.959 | | |
| 5 | −47.0446 | 1.700 | 1.45600 | 91.37 |
| 6 | 99.5616 | 0.200 | | |
| 7 | 69.7654 | 4.418 | 2.00069 | 25.46 |
| 8 | −360.6089 | (D8) | | |
| 9 | 50.9989 | 1.100 | 1.96300 | 24.11 |
| 10 | 26.0000 | 5.600 | 1.67270 | 32.18 |

TABLE 1-continued

| | | | | |
|---|---|---|---|---|
| 11 | −343.9963 | (D11) | | |
| 12 | 0.0000 | 0.000 | | |
| 13 | 51.3179 | 3.600 | 1.81666 | 29.30 |
| 14 | 546.1825 | 0.200 | | |
| 15 | 55.6602 | 1.200 | 1.84666 | 23.80 |
| 16 | 25.9737 | 8.100 | 1.48749 | 70.32 |
| 17 | −49.8592 | (D17) | | |
| 18 (S) | 0.0000 | 3.685 | | |
| 19 | −47.2832 | 1.100 | 1.95375 | 32.33 |
| 20 | −294.7144 | 1.387 | | |
| 21 | −67.3393 | 1.100 | 1.95375 | 32.33 |
| 22 | 97.3774 | 0.200 | | |
| 23 | 40.3224 | 3.300 | 1.92286 | 20.88 |
| 24 | −773.0582 | 1.500 | | |
| 25 | 0.0000 | (D25) | | |
| 26 | 73.8132 | 1.100 | 1.95375 | 32.33 |
| 27 | 20.7413 | 6.000 | 1.49782 | 82.57 |
| 28 | −161.3154 | 0.200 | | |
| 29 | 26.6960 | 9.300 | 1.49782 | 82.57 |
| 30 | −23.8740 | 1.200 | 1.95375 | 32.33 |
| 31 | −34.0639 | (D31) | | |
| 32 | 636.0259 | 3.550 | 1.80809 | 22.74 |
| 33 | −42.6926 | 0.200 | | |
| 34 | −54.4744 | 1.400 | 1.85108 | 40.12 |
| 35* | 98.1829 | (D35) | | |
| 36 | −22.0542 | 1.400 | 1.82098 | 42.50 |
| 37* | −32.0038 | (D37) | | |
| Image Surface | ∞ | | | |

[Aspherical Surface Data]

1st Surface
k = 1.0000
A4 = −1.00559E−06, A6 = 5.63388E−09,
A8 = −7.40263E−12, A10 = 3.87300E−15
2nd Surface
k = 0.0000
A4 = 3.60660E−06, A6 = 9.14891E−09,
A8 = 1.27298E−11, A10 = 1.51889E−13
4th Surface
k = 1.0000
A4 = 4.88200E−06, A6 = 4.07550E−09,
A8 = −1.87588E−11, A10 = −1.59526E−14
35th Surface
k = 1.0000
A4 = 1.16601E−05, A6 = 1.03251E−08,
A8 = −1.15486E−10, A10 = 1.04650E−12
37th Surface
k = 1.0000
A4 = 6.02570E−06, A6 = 7.33824E−09,
A8 = 2.29245E−10, A10 = −9.55354E−13

[Lens Group Data]

| Group | First surface | Focal length | Magnification (∞ · W) | Magnification (∞ · T) |
|---|---|---|---|---|
| 1 | 1 | −23.346 | 0.000 | 0.000 |
| 2 | 9 | 32.353 | | |
| 2-1 (F1) | 9 | 102.890 | 4.383 | 1.926 |
| 2-2 | 13 | 40.878 | −0.127 | −0.599 |
| 3 | 18 | −61.428 | 2.485 | 6.721 |
| 4 | 26 | 45.517 | 0.399 | 0.119 |
| 5 | 32 | −67.020 | | |
| 5-1 (F2) | 32 | −253.066 | 1.070 | 1.117 |
| 5-2 | 36 | −92.261 | 1.190 | 1.405 |

[the first lens group data]

| lens | Focal length |
|---|---|
| L11 | −25.227 |
| L12 | −151.617 |
| L13 | −69.809 |
| L14 | 58.717 |

TABLE 1-continued

[Variable Distance Data]

| | Infinity | | close-distance | |
|---|---|---|---|---|
| | W | T | W | T |
| F | 16.50000 | 34.00000 | −0.11860 | −0.23288 |
| D0 | 0.0000 | 0.0000 | 115.8709 | 125.4201 |
| D8 | 31.42890 | 1.50000 | 35.52504 | 6.54836 |
| D11 | 7.01271 | 7.01271 | 2.89868 | 2.00000 |
| D17 | 1.00090 | 4.70395 | 1.00090 | 4.70395 |
| D25 | 6.55312 | 0.00000 | 6.55312 | 0.00000 |
| D31 | 2.84830 | 5.69835 | 2.00000 | 4.37744 |
| D35 | 7.40501 | 7.40501 | 8.27637 | 8.71593 |
| D37 | 14.91437 | 34.73214 | 15.05178 | 35.16746 |

Figure 2A:
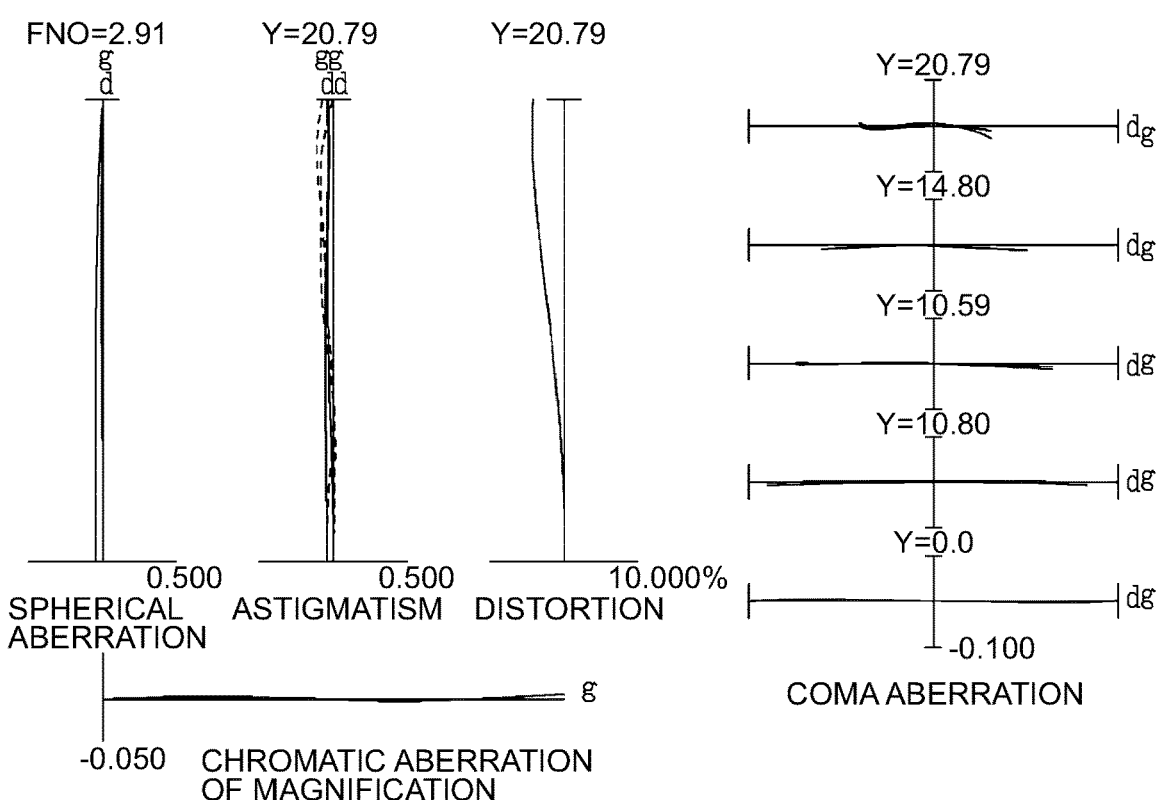
Figure 2B:
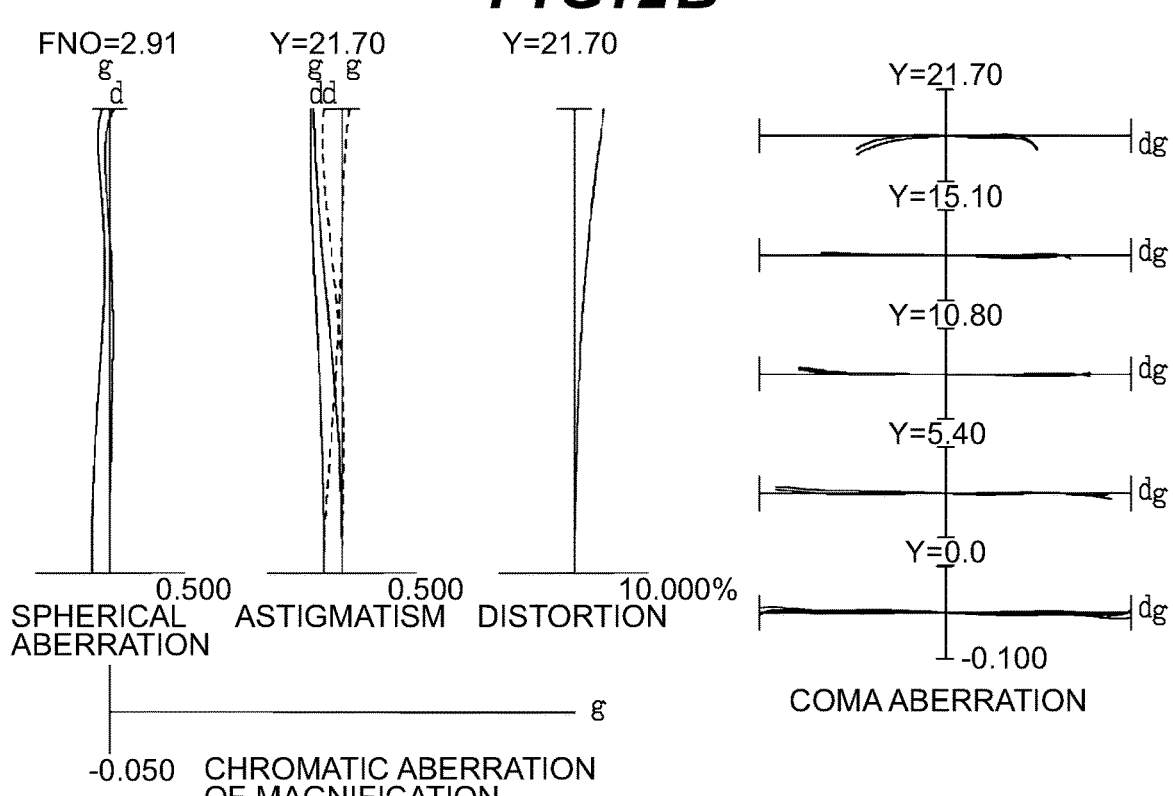
Figure 3A:
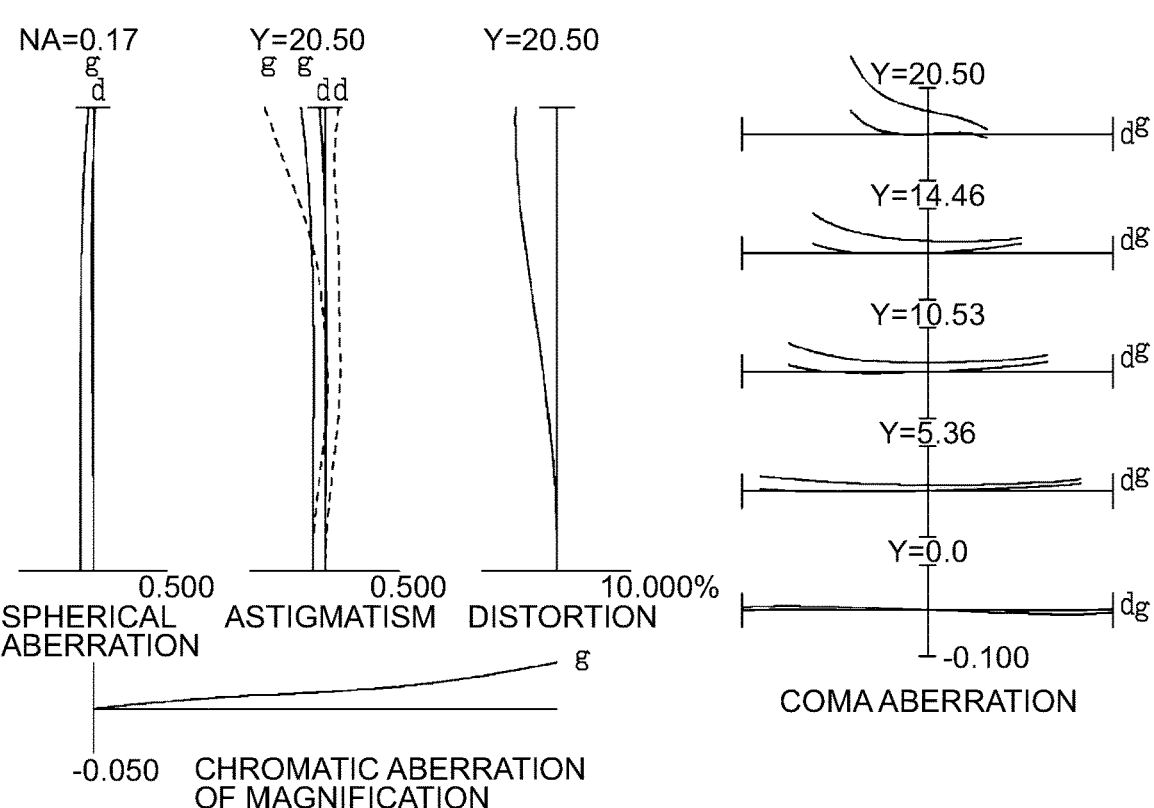
Figure 3B:
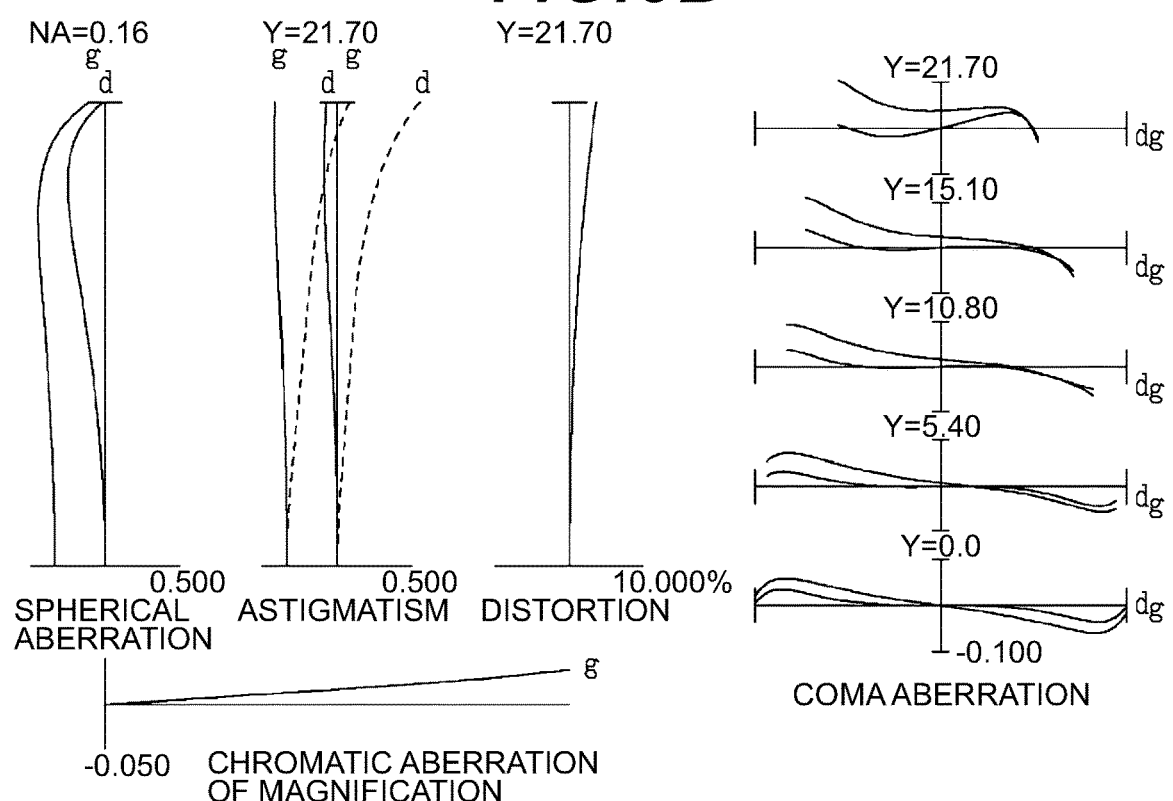

FIGS. 2A and 2B show various aberration values of the optical system according to Example 1 in a state of focusing on an infinity object, and FIGS. 3A and 3B show various aberration values of the optical system according to Example 1 in a state of focusing on a close distance object. In these figures, each figure with character A shows the various aberration values in a wide angle end state, and each figure with character B shows the various aberration values in a telephoto end state. The respective aberration graphs show that the optical system according to Example 1 can satisfactorily correct various aberrations over the entire range from a wide angle end state to a telephoto end state, and has excellent imaging performance also in a state of focusing on a close distance object.

Example 2

Figure 4:
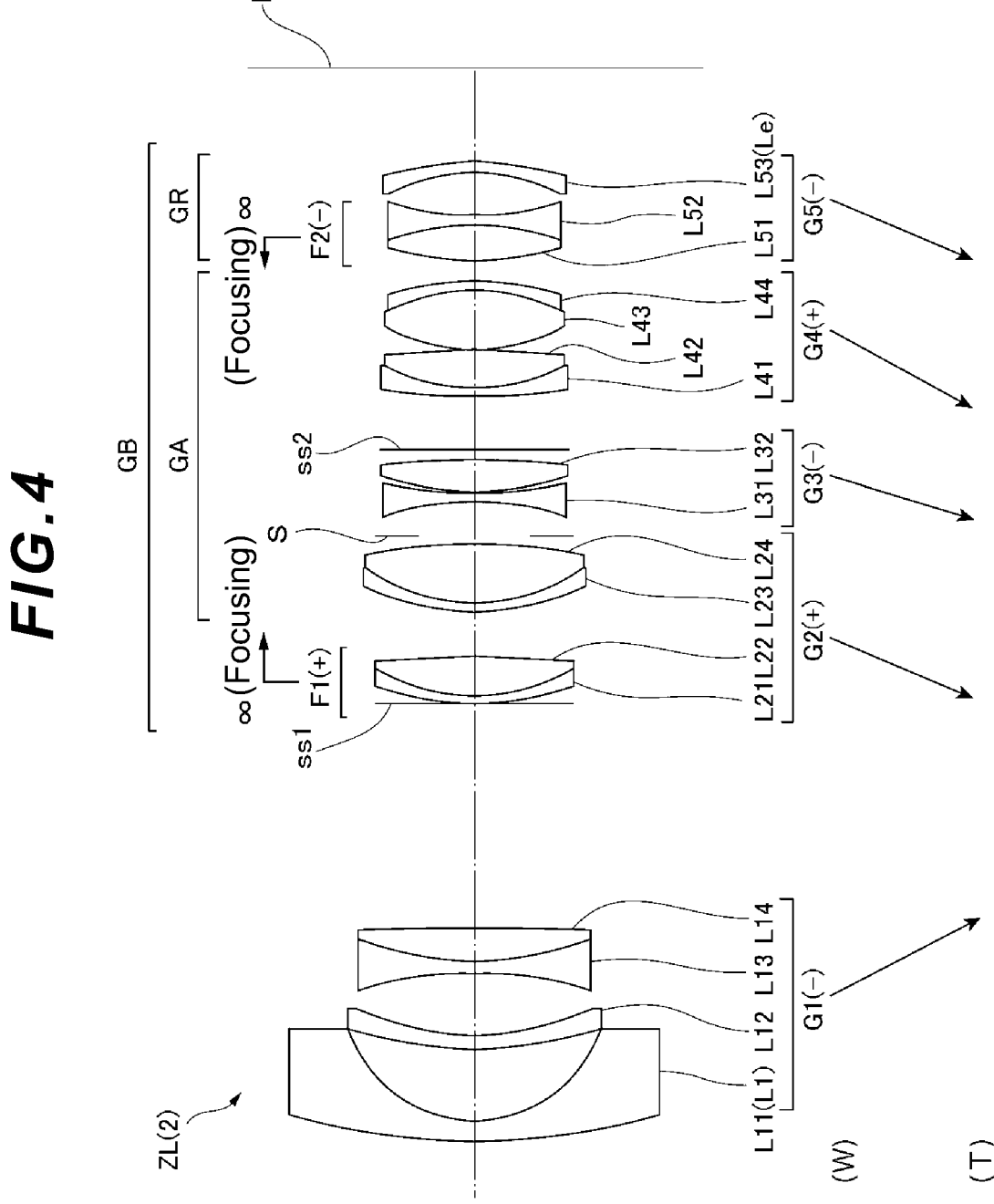
FIG. 4 is a diagram showing a lens configuration of an optical system according to Example 2.

The following describes Example 2 with reference to FIGS. 4, 5, 6 and Table 2. FIG. 4 is a diagram showing a lens configuration of an optical system ZL(2) according to Example 2. The optical system ZL(2) comprises: a first lens group G1 having negative refractive power; a second lens group G2 having positive refractive power; a third lens group G3 having negative refractive power; fourth lens group G4 having positive refractive power; and a fifth lens group G5 having negative refractive power, which are placed in order from an object. The image surface I is located on the back side of the fifth lens group G5. A first sub-aperture stop ss1 is arranged in the second lens group G2, and an aperture stop S and a second sub-aperture stop ss2 are arranged in the third lens group G3. A first focusing lens group F1 is configured of a part of lens group in the second lens group G2, and a second focusing lens group F2 is configured of a part of lens group in the fifth lens group G5.

The respective lens groups move on trajectories indicated by arrows in the lower part of FIG. 4 when the optical system zooms from a wide angle end state (W) to a telephoto end state (T). The first lens group G1 moves toward an image surface, and the lens group (succeeding lens group GB) from the second lens group G2 to the fifth lens group G5 moves toward an object. Thus changing the distance between the first lens group G1 and the succeeding lens group changes the photographing magnification (performs zooming). In zooming, the second lens group G2 including the first focusing lens group F1 and the fifth lens group G5 including the second focusing lens group F2 move in the same direction by the same distance, which makes the movement trajectories identical. Upon focusing from an infinity object to a short distance object, as shown by the arrows in the upper part of FIG. 4, the first focusing lens group F1 moves toward an image surface and the second focusing lens group F2 moves toward an object.

The first lens group G1 comprises: a negative meniscus lens L11 having a convex surface facing an object; a negative meniscus lens L12 having a convex surface facing an object; and a cemented negative lens of a biconcave negative lens L13 and a biconvex positive lens L14. Note that both surfaces of the negative meniscus lens L11 are aspherical surfaces, and the surface, facing an image, of the negative meniscus lens L12 is an aspherical surface.

The second lens group G2 comprises: the first sub-aperture stop ss1; a cemented positive lens of a negative meniscus lens L21 having a convex surface facing an object and a biconvex positive lens L22; and a cemented positive lens of a negative meniscus lens L23 having a convex surface facing an object and a biconvex positive lens L24. Of these, the cemented positive lens of the negative meniscus lens L21 and the biconvex positive lens L22 functions as the first focusing lens group F1.

The third lens group G3 comprises an aperture stop S, a biconcave negative lens L31, a biconvex positive lens L32, and a second sub-aperture stop ss2.

The fourth lens group G4 comprises: a cemented positive lens of a negative meniscus lens L41 having a convex surface facing an object and a biconvex positive lens L42; and cemented positive lens of a biconvex positive lens L43 and a negative meniscus lens L44 having a concave surface facing an object.

The fifth lens group G5 comprises a cemented positive lens of biconvex positive lens L51 and biconcave negative lens L52, and a negative meniscus lens L53 having a concave surface facing an object. Of these, the cemented positive lens of the positive lens L51 and the negative lens L52 functions as the second focusing lens group F2. Note that the surface, facing an image, of the negative lens L52 and the surface, facing an image, of the negative meniscus lens L53 are aspherical surfaces.

In this example, the intermediate lens group GA is a lens group from the negative meniscus lens L23 in the second lens group G2 to the negative meniscus lens L44 in the fourth lens group G4, and the lens group GR including the second focusing lens group and the succeeding lens group is the fifth lens group G5.

Table 2 lists values of data of the optical system according to Example 2.

TABLE 2

[General Data]
Zooming ratio = 2.201

|  | W | T |
|---|---|---|
| f | 15.450 | 34.000 |
| F.NO | 2.910 | 2.910 |
| 2ω(°) | 109.100 | |
| Ymax | 18.899 | 21.700 |
| TL | 157.420 | 148.390 |
| BF | 13.738 | 36.025 |
| MF1 | 3.797 | 4.236 |
| MF2 | -1.171 | -2.237 |
| fAw | 45.092 | |
| fBw | 35.923 | |
| fRw | -71.015 | |

[Lens Data]

| Surface Number | R | D | nd | vd |
|---|---|---|---|---|
| Object Surface | ∞ | | | |
| 1* | 146.1617 | 2.700 | 1.76385 | 48.49 |
| 2* | 17.6041 | 10.626 | | |

TABLE 2-continued

| | R | D | nd | vd |
|---|---|---|---|---|
| 3 | 62.2586 | 2.000 | 1.76450 | 49.10 |
| 4* | 37.3724 | 9.332 | | |
| 5 | -54.8177 | 1.700 | 1.45600 | 91.37 |
| 6 | 46.7428 | 4.900 | 1.90366 | 31.27 |
| 7 | 473.8444 | (D7) | | |
| 8 | 0.0000 | 0.000 | | |
| 9 | 42.7469 | 1.200 | 1.96300 | 24.11 |
| 10 | 28.3019 | 5.700 | 1.58144 | 40.98 |
| 11 | 199.8950 | (D11) | | |
| 12 | 35.6445 | 1.300 | 1.95375 | 32.33 |
| 13 | 27.0031 | 8.800 | 1.49782 | 82.57 |
| 14 | -71.6500 | (D14) | | |
| 15 (S) | 0.0000 | 5.032 | | |
| 16 | -39.6760 | 1.200 | 1.95375 | 32.33 |
| 17 | 70.2363 | 0.213 | | |
| 18 | 41.9717 | 4.600 | 1.84666 | 23.80 |
| 19 | -100.2049 | 1.500 | | |
| 20 | 0.0000 | (D20) | | |
| 21 | 94.6291 | 1.200 | 1.95375 | 32.33 |
| 22 | 27.9631 | 5.500 | 1.49782 | 82.57 |
| 23 | -149.9641 | 0.200 | | |
| 24 | 26.9190 | 8.700 | 1.49782 | 82.57 |
| 25 | -27.3216 | 1.300 | 1.95375 | 32.33 |
| 26 | -47.0122 | (D26) | | |
| 27 | 44.9401 | 5.200 | 1.71736 | 29.57 |
| 28 | -39.8168 | 1.400 | 1.85108 | 40.12 |
| 29* | 45.6142 | (D29) | | |
| 30 | -25.1525 | 1.400 | 1.82098 | 42.50 |
| 31* | -36.5472 | (D31) | | |
| Image Surface | ∞ | | | |

[Aspherical Surface Data]

1st Surface
k = 1.0000
A4 = 5.13104E-06, A6 = -9.75961E-09,
A8 = 1.58957E-11, A10 = -1.49213E-14
2nd Surface
k = 0.0000
A4 = 1.39883E-05, A6 = 2.12435E-08,
A8 = -6.13376E-12, A10 = 1.21266E-13
4th Surface
k = 1.0000
A4 = 2.03519E-06, A6 = -3.87885E-09,
A8 = -4.53903E-11, A10 = 9.19823E-14
29th Surface
k = 1.0000
A4 = 7.43097E-06, A6 = 3.66331E-08,
A8 = -5.67118E-10, A10 = 4.14365E-12
31st Surface
k = 1.0000
A4 = 1.07666E-05, A6 = -4.52020E-09,
A8 = 3.54595E-10, A10 = -1.67618E-12

[Lens Group Data]

| Group | First surface | Focal length | Magnification (∞ · W) | Magnification (∞ · T) |
|---|---|---|---|---|
| 1 | 1 | -23.455 | 0.000 | 0.000 |
| 2 | 8 | 38.336 | | |
| 2-1 (F1) | 8 | 83.308 | 59.236 | 2.546 |
| 2-2 | 12 | 60.305 | -0.125 | -0.744 |
| 3 | 15 | -122.226 | 1.807 | 4.268 |
| 4 | 21 | 51.627 | 0.410 | 0.119 |
| 5 | 27 | -71.0145 | | |
| 5-1 (F2) | 27 | -207.910 | 1.032 | 1.100 |
| 5-2 | 30 | -104.028 | 1.157 | 1.371 |

[the first lens group data]

| lens | Focal length |
|---|---|
| L11 | -26.433 |
| L12 | -126.709 |
| L13 | -55.040 |
| L14 | 47.293 |

TABLE 2-continued

| | [Variable Distance Data] | | | |
| | Infinity | | close-distance | |
| | W | T | W | T |
| --- | --- | --- | --- | --- |
| F | 15.45000 | 34.00000 | −0.11055 | −0.23294 |
| D0 | 0.00000 | 0.00000 | 115.2047 | 124.3997 |
| D7 | 32.83524 | 1.51814 | 36.72779 | 6.09480 |
| D11 | 6.55513 | 6.55513 | 2.65502 | 2.00000 |
| D14 | 1.19962 | 6.31367 | 1.19962 | 6.31367 |
| D20 | 7.79649 | 0.00000 | 7.79649 | 0.00000 |
| D26 | 3.11247 | 5.79493 | 2.04500 | 3.87741 |
| D29 | 6.47887 | 6.47887 | 7.56607 | 8.39171 |
| D31 | 13.73777 | 36.02512 | 13.82147 | 36.34887 |

Figure 5A:
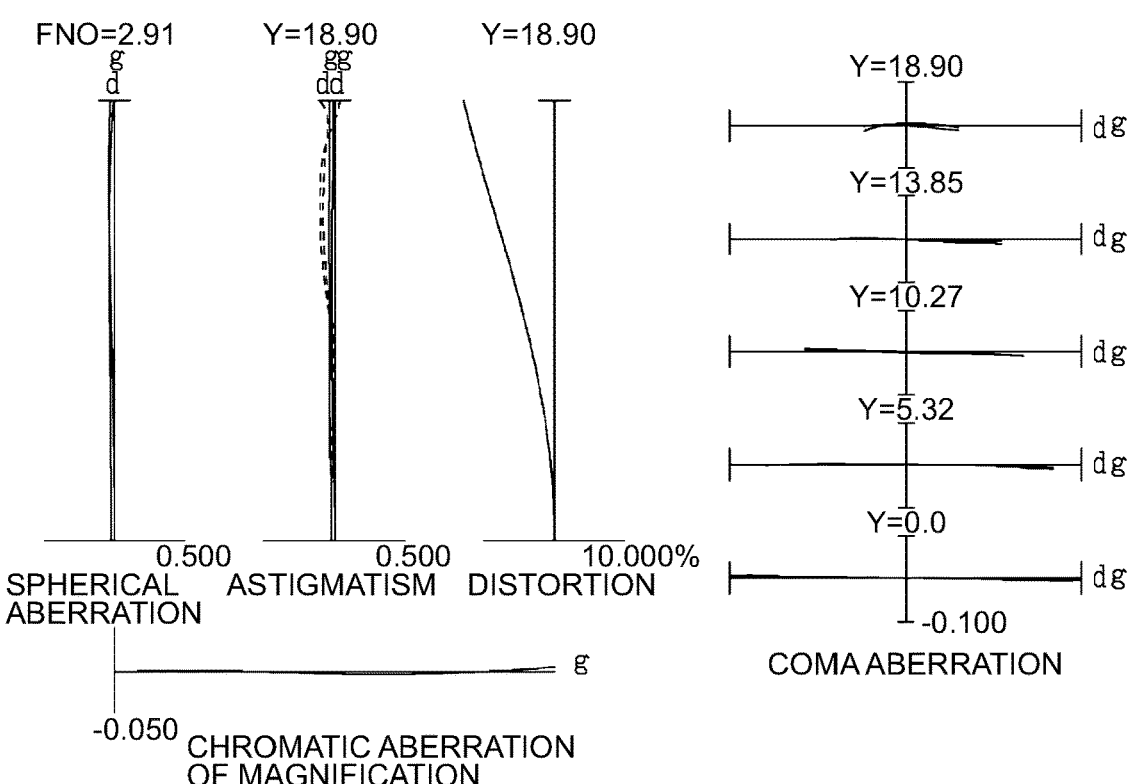
Figure 5B:
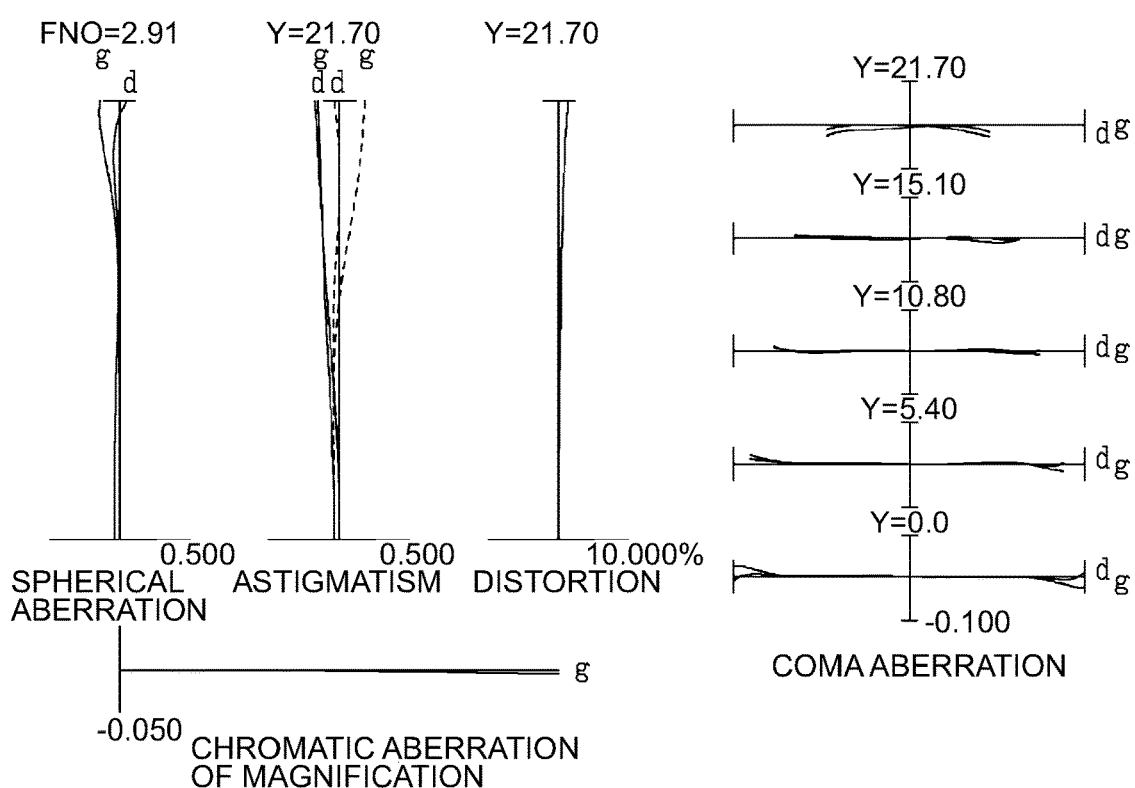
Figure 6A:
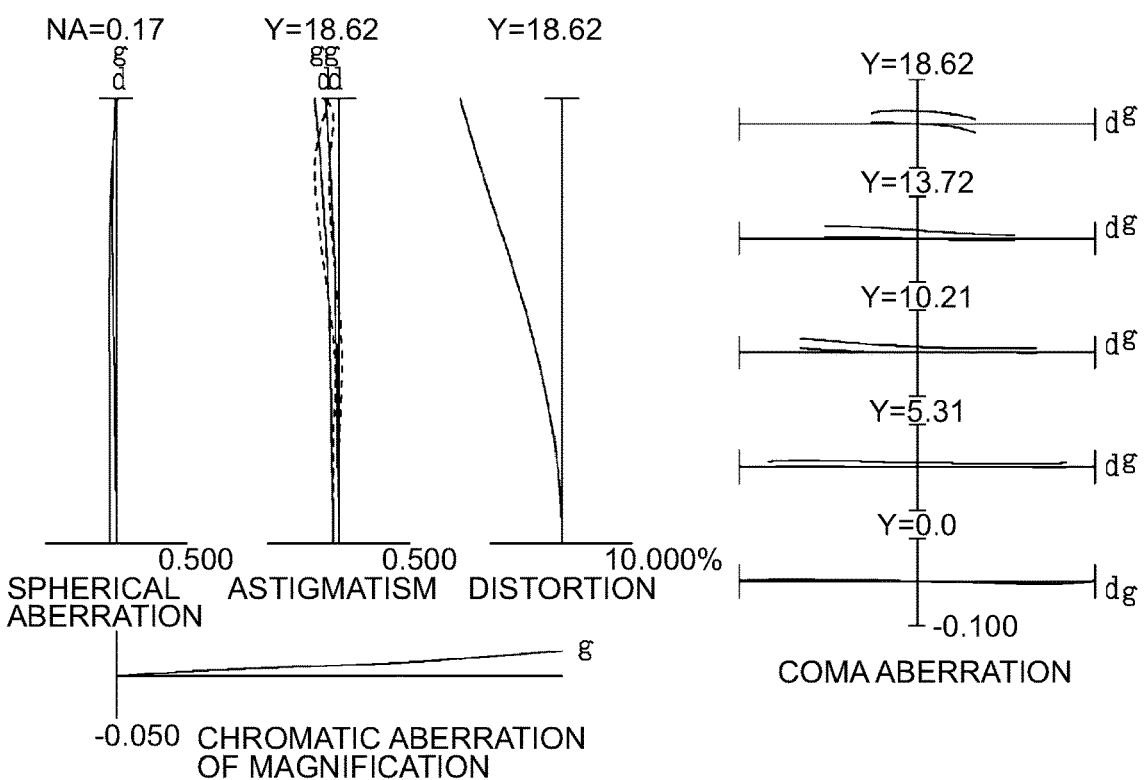
Figure 6B:
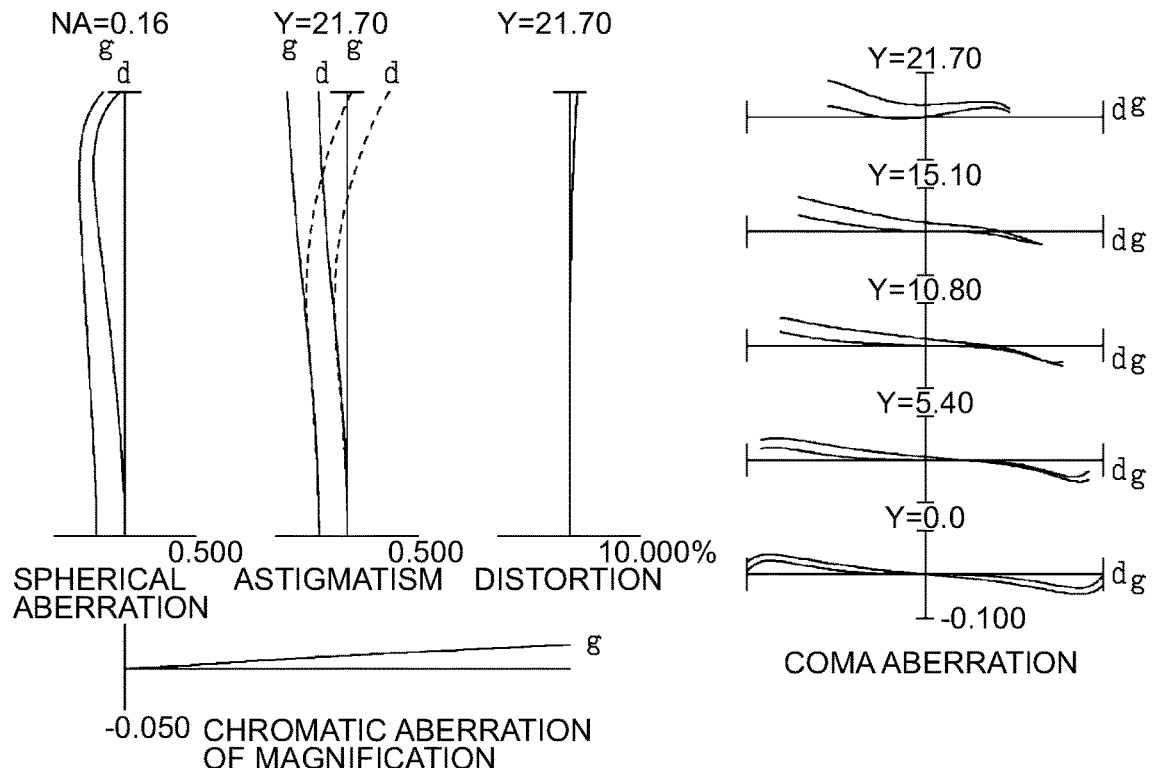

FIGS. 5A and 5B show various aberration values of the optical system according to Example 2 in a state of focusing on an infinity object, and FIGS. 6A and 6B show various aberration values of the optical system according to Example 2 in a state of focusing on a close distance object. In these figures, each figure with character A shows the various aberration values in a wide angle end state, and each figure with character B shows the various aberration values in a telephoto end state. The respective aberration graphs show that the optical system according to Example 2 can satisfactorily correct various aberrations over the entire range from a wide angle end state to a telephoto end state, and has excellent imaging performance also in a state of focusing on a close distance object.

Example 3

Figure 7:
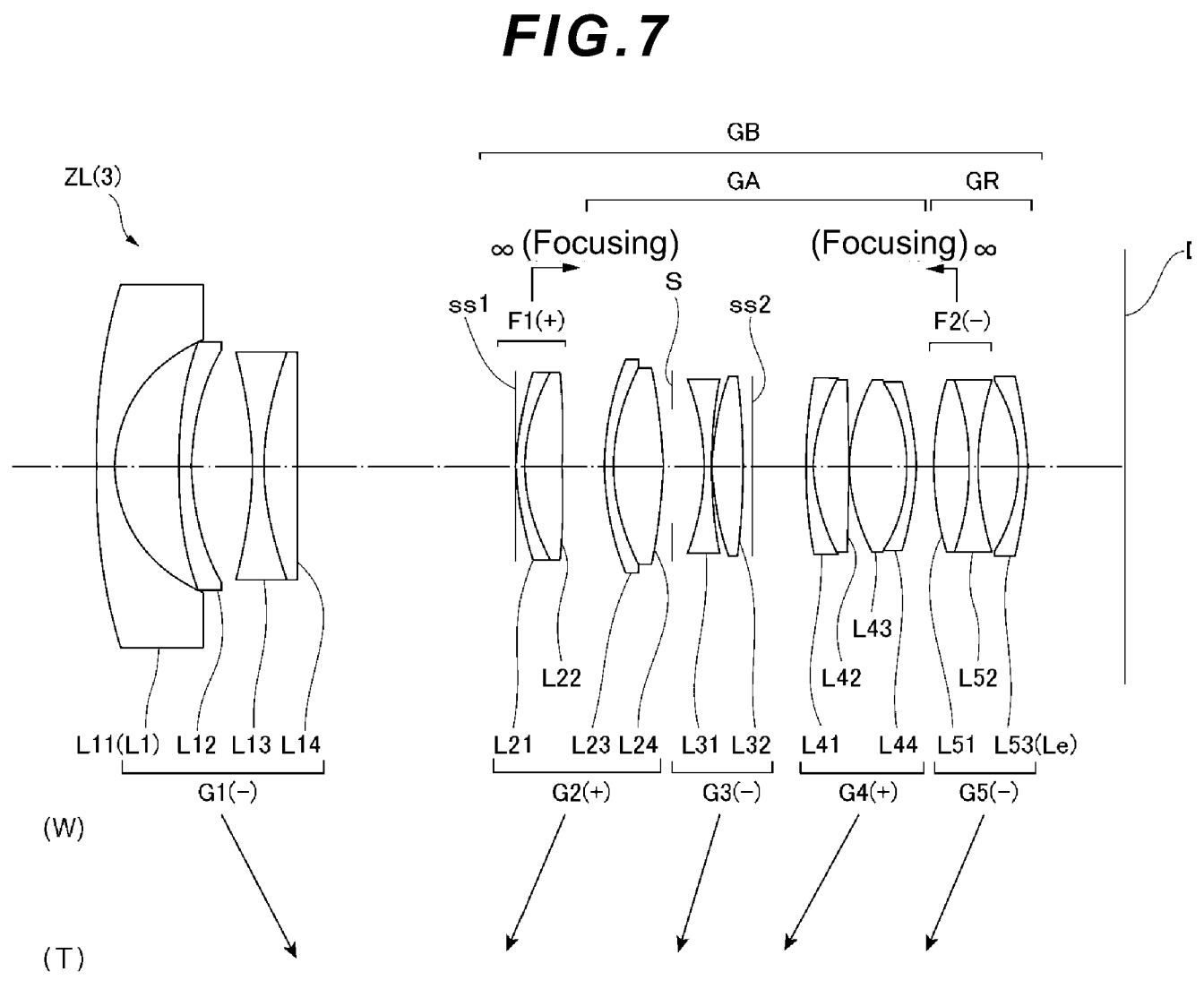

The following describes Example 3 with reference to FIGS. 7, 8, 9, and Table 3. FIG. 7 is a diagram showing a lens configuration of an optical system ZL(3) according to Example 3. The optical system ZL(3) comprises: the first lens group G1 having negative refractive power; a second lens group G2 having positive refractive power; a third lens group G3 having negative refractive power; a fourth lens group G4 having positive refractive power; and a fifth lens group G5 having negative refractive power, which are placed in order from an object. The image surface I is located on the back side of the fifth lens group G5. A first sub-aperture stop ss1 is arranged in the second lens group G2, and an aperture stop S and a second sub-aperture stop ss2 are arranged in the third lens group G3. A first focusing lens group F1 is configured of a part of lens group in the second lens group G2, and a second focusing lens group F2 is configured of a part of lens group in the fifth lens group G5.

The respective lens groups move on trajectories indicated by arrows in the lower part of FIG. 7 when the optical system zooms from a wide angle end state (W) to a telephoto end state (T). The first lens group G1 moves toward an image surface, and the lens group (succeeding lens group GB) from the second lens group G2 to the fifth lens group G5 moves toward an object. Thus changing the distance between the first lens group G1 and the succeeding lens group changes the photographing magnification (performs zooming). In zooming, the second lens group G2 including the first focusing lens group F1 and the fifth lens group G5 including the second focusing lens group F2 move in the same direction by the same distance, which makes the movement trajectories identical. Upon focusing from an infinity object to a short distance object, as shown by the arrows in the upper part of FIG. 7, the first focusing lens group F1 moves toward an image surface and the second focusing lens group F2 moves toward an object.

The first lens group G1 comprises: a negative meniscus lens L11 having a convex surface facing an object; a negative meniscus lens L12 having a convex surface facing an object; and a cemented negative lens of a biconcave negative lens L13 and a biconvex positive lens L14. Note that both surfaces of the negative meniscus lens L11 are aspherical surfaces, and the surface, facing an image, of the negative meniscus lens L12 is an aspherical surface.

The second lens group G2 comprises: the first sub-aperture stop ss1; a cemented positive lens of a negative meniscus lens L21 having a convex surface facing an object and a biconvex positive lens L22; a cemented positive lens of a negative meniscus lens L23 having a convex surface facing an object and a biconvex positive lens L24. Of these, the cemented positive lens of the negative meniscus lens L21 and the positive lens L22 functions as the first focusing lens group F1.

The third lens group G3 comprises an aperture stop S, a biconcave negative lens L31, a biconvex positive lens L32, and a second sub-aperture stop ss2.

The fourth lens group G4 comprises: a cemented positive lens of a negative meniscus lens L41 having a convex surface facing an object and a biconvex positive lens L42; and cemented positive lens of a biconvex positive lens L43 and a negative meniscus lens L44 having a concave surface facing an object.

The fifth lens group G5 comprises a cemented positive lens of biconvex positive lens L51 and biconcave negative lens L52, and a negative meniscus lens L53 having a concave surface facing an object. Of these, the cemented positive lens of the positive lens L51 and the negative lens L52 functions as the second focusing lens group F2. Note that the surface, facing an image, of the negative lens L52 and the surface, facing an image, of the negative meniscus lens L53 are aspherical surfaces.

In this example, the intermediate lens group GA is a lens group from the negative meniscus lens L23 in the second lens group G2 to the negative meniscus lens L44 in the fourth lens group G4, and the lens group GR including the second focusing lens group and the succeeding lens group is the fifth lens group G5.

Table 3 lists values of data of the optical system according to Example 3.

TABLE 3

| [General Data] Zooming ratio = 2.201 | | |
| | W | T |
| --- | --- | --- |
| f | 15.450 | 34.000 |
| F.NO | 2.910 | 2.910 |
| 2ω (°) | 109.100 | |
| Ymax | 19.873 | 21.700 |
| TL | 155.444 | 145.505 |

TABLE 3-continued

| | | | |
|---|---|---|---|
| BF | 14.459 | 36.100 | |
| MF1 | 3.585 | 3.939 | |
| MF2 | −0.856 | −2.194 | |
| fAw | 45.851 | | |
| fBW | 36.197 | | |
| fRw | −78.872 | | |

[Lens Data]

| Surface Number | R | D | nd | νd |
|---|---|---|---|---|
| Object Surface | ∞ | | | |
| 1* | 182.9928 | 2.700 | 1.76385 | 48.49 |
| 2* | 17.6000 | 9.932 | | |
| 3 | 62.1295 | 2.000 | 1.76450 | 49.10 |
| 4* | 38.8027 | 9.134 | | |
| 5 | −60.2019 | 1.700 | 1.45600 | 91.37 |
| 6 | 43.1768 | 5.000 | 1.90366 | 31.27 |
| 7 | −1892.0590 | (D7) | | |
| 8 | 0.0000 | 0.000 | | |
| 9 | 41.6453 | 1.200 | 1.96300 | 24.11 |
| 10 | 27.0721 | 5.800 | 1.58144 | 40.98 |
| 11 | −167.0652 | (D11) | | |
| 12 | 39.8569 | 1.300 | 1.95375 | 32.33 |
| 13 | 30.7826 | 7.500 | 1.49782 | 82.57 |
| 14 | −61.0151 | (D14) | | |
| 15 | 0.0000 | 4.940 | | |
| 16 | −37.9606 | 1.200 | 1.95375 | 32.33 |
| 17 | 76.5015 | 0.204 | | |
| 18 | 40.4555 | 4.400 | 1.84666 | 23.80 |
| 19 | −123.6565 | 1.500 | | |
| 20 | 0.0000 | (D20) | | |
| 21 | 72.9672 | 1.200 | 1.95375 | 32.33 |
| 22 | 25.5392 | 5.200 | 1.49782 | 82.57 |
| 23 | −692.9469 | 0.200 | | |
| 24 | 27.8780 | 8.700 | 1.49782 | 82.57 |
| 25 | −24.6887 | 1.300 | 1.95375 | 32.33 |
| 26 | −40.1293 | (D26) | | |
| 27 | 44.0613 | 5.200 | 1.71736 | 29.57 |
| 28 | −40.6298 | 1.400 | 1.85108 | 40.12 |
| 29* | 46.4951 | (D29) | | |
| 30 | −25.3720 | 1.400 | 1.82098 | 42.50 |
| 31* | −36.0062 | (D31) | | |
| Image Surface | ∞ | | | |

[Aspherical Surface Data]

1st Surface $\kappa = 1.0000$
A4 = 1711E−06, A6 = −7.07049E−09, A8 = 1.22058E−11, A10 = 1.21419E−14

2nd Surface $\kappa = 0.0000$
A4 = 8.88771E−06, A6 = 2.03824E−08, A8 = −2.28757E−11, A10 = 2.07974E−13

4th Surface $\kappa = 1.0000$
A4 = 4.90346E−06, A6 = −5.81374E−11, A8 = −4.02996E−11, A10 = 3.85740E−14

29th Surface $\kappa = 1.0000$
A4 = 7.58378E−06, A6 = 4.61458E−08, A8 = −7.11052E−10, A10 = 4.97063E−12

31st Surface $\kappa = 1.0000$
A4 = 1.22168E−05, A6 = −1.06012E−08, A8 = 4.71713E−10, A10 = −2.24069E−12

[Lens Group Data]

| Group | First surface | Focal length | Magnification (∞ · W) | Magnification (∞ · T) |
|---|---|---|---|---|
| 1 | 1 | −23.414 | 0.000 | |
| 2 | 8 | 37.139 | | |
| 2-1(F1) | 8 | 79.731 | −44.008 | 2.678 |
| 2-2 | 12 | 58.821 | 0.016 | −0.674 |

TABLE 3-continued

| 3 | 15 | −109.902 | 1.879 | 4.775 |
|---|---|---|---|---|
| 4 | 21 | 52.461 | 0.419 | 0.116 |
| 5 | 27 | −78.872 | | |
| 5-1(F2) | 27 | −245.806 | 1.019 | 1.075 |
| 5-2 | 3 | −111.243 | 1.155 | 1.349 |

[the first lens group data]

| lens | Focal length |
|---|---|
| L11 | −25.675 |
| L12 | −140.400 |
| L13 | −54.857 |
| L14 | 46.771 |

[Variable Distance Data]

| | Infinity | | close-distance | |
|---|---|---|---|---|
| | W | T | W | T |
| f | 15.45001 | 34.00001 | −0.10904 | −0.22883 |
| D0 | 0.00000 | 0.00000 | 117.1752 | 127.2533 |
| D7 | 33.08026 | 1.50000 | 36.75391 | 5.79153 |
| D11 | 6.28196 | 6.28196 | 2.58854 | 2.03546 |
| D14 | 1.26244 | 6.38378 | 1.26244 | 6.38378 |
| D20 | 8.34096 | 0.00000 | 8.34096 | 0.00000 |
| D26 | 2.75416 | 5.97378 | 2.00611 | 4.08778 |
| D29 | 6.15482 | 6.15482 | 6.93201 | 8.04153 |
| D31 | 14.45898 | 36.09988 | 14.53818 | 36.40710 |

Figure 8A:
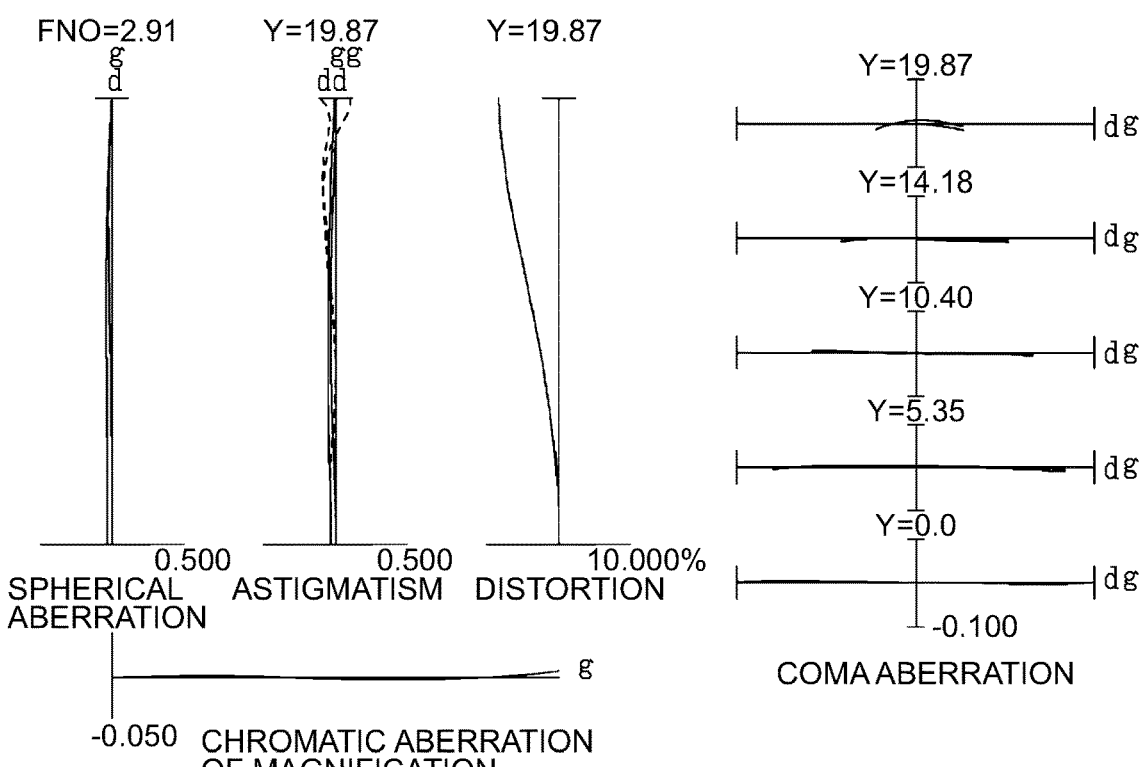
Figure 8B:
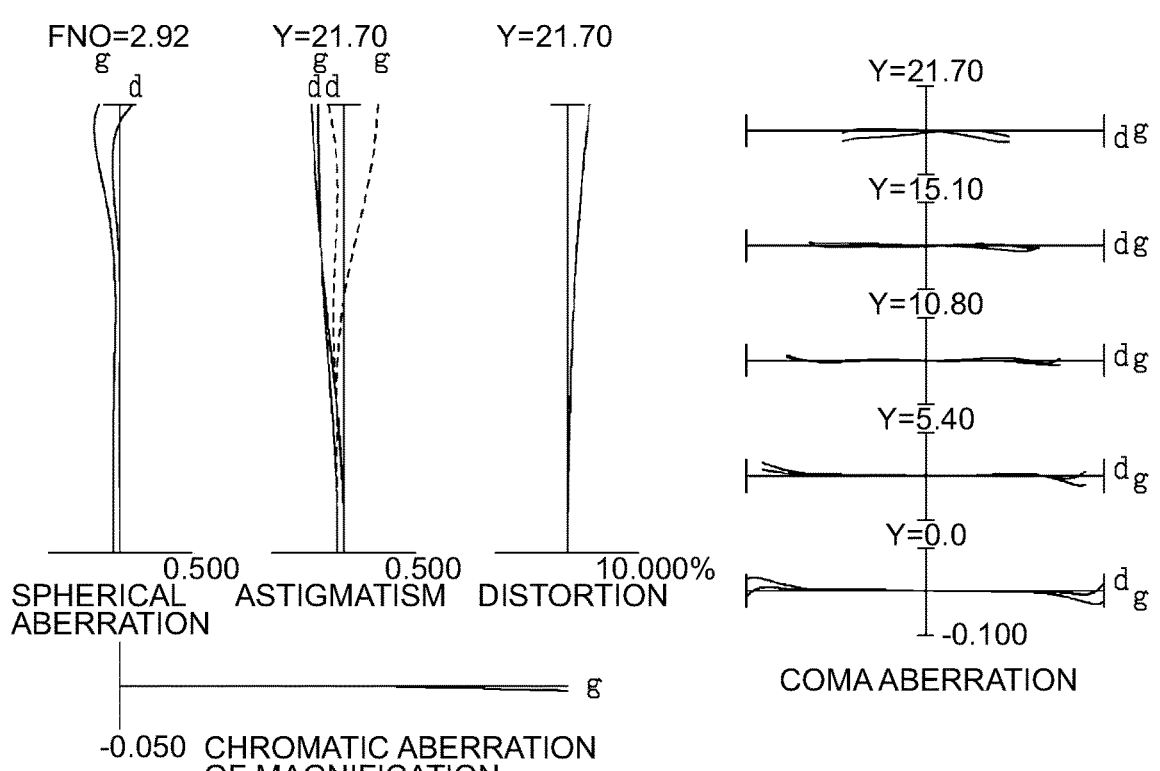
Figure 9A:
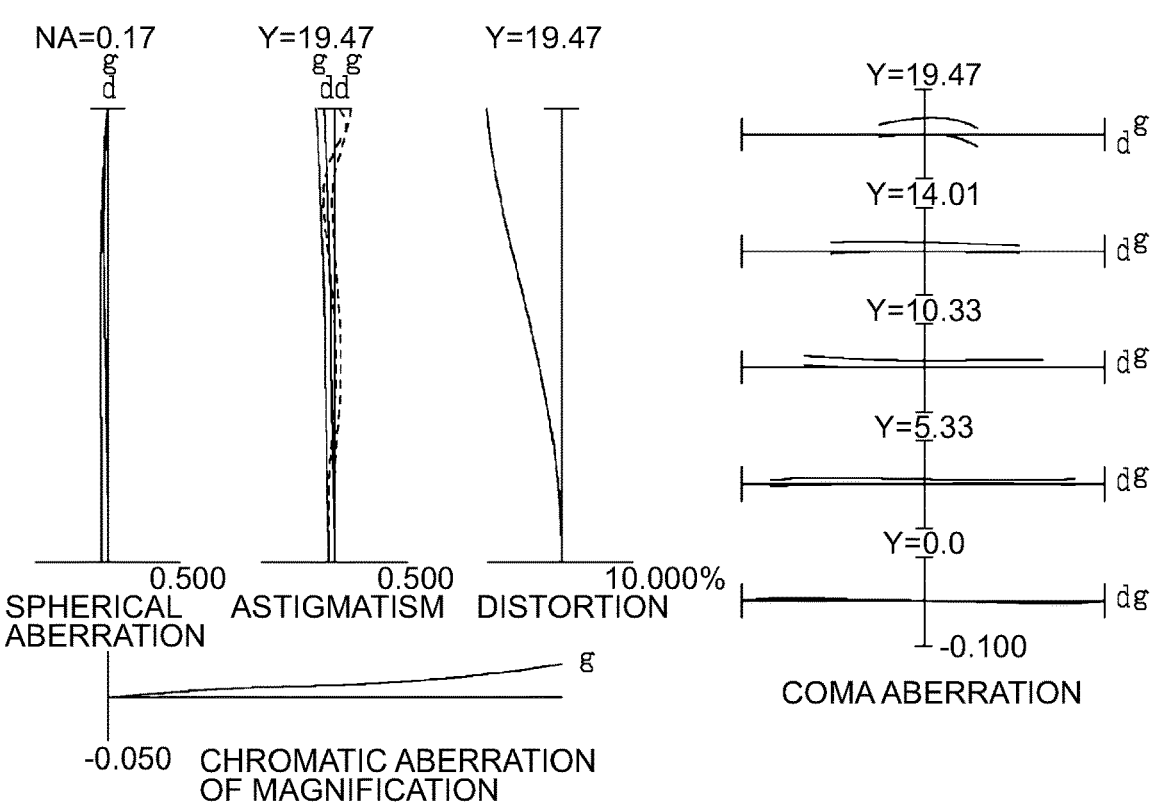
Figure 9B:
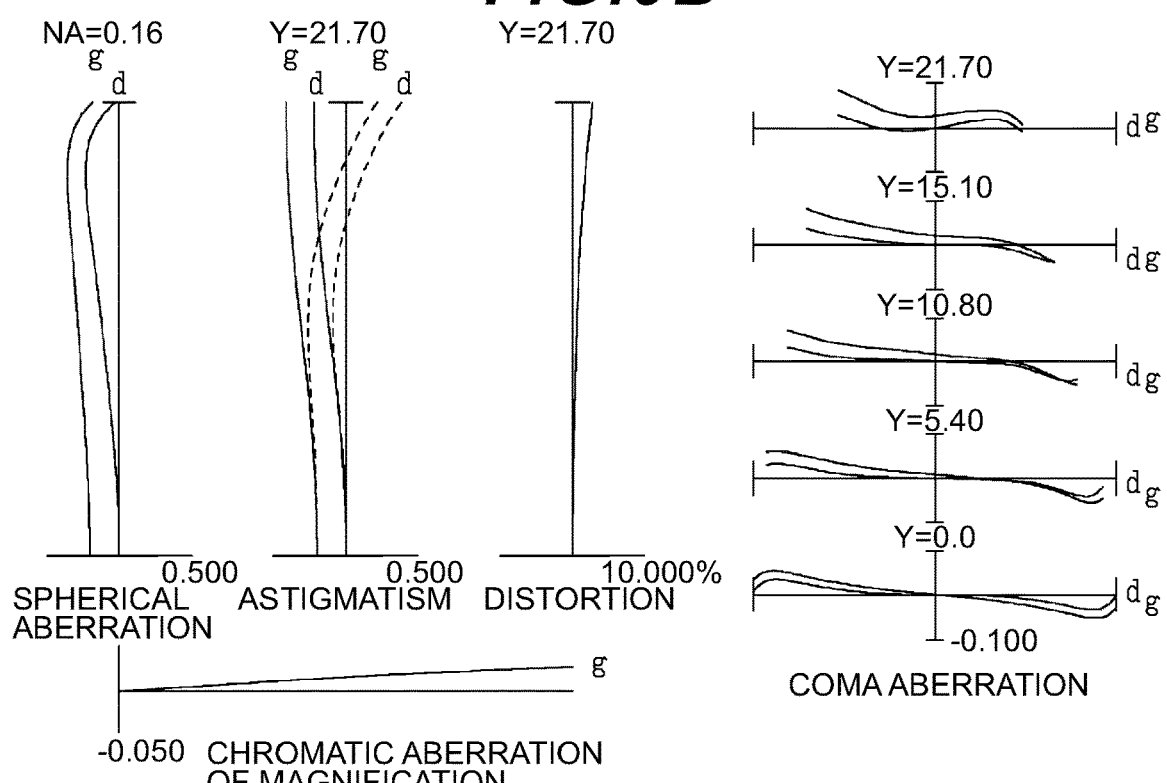

FIGS. 8A and 8B show various aberration values of the optical system according to Example 3 in a state of focusing on an infinity object, and FIGS. 9A and 9B show various aberration values of the optical system according to Example 3 in a state of focusing on a close distance object. In these figures, each figure with character A shows the various aberration values in a wide angle end state, and each figure with character B shows the various aberration values in a telephoto end state. The respective aberration graphs show that the optical system according to Example 3 can satisfactorily correct various aberrations over the entire range from a wide angle end state to a telephoto end state, and has excellent imaging performance also in a state of focusing on a close distance object.

Example 4

Figure 10:
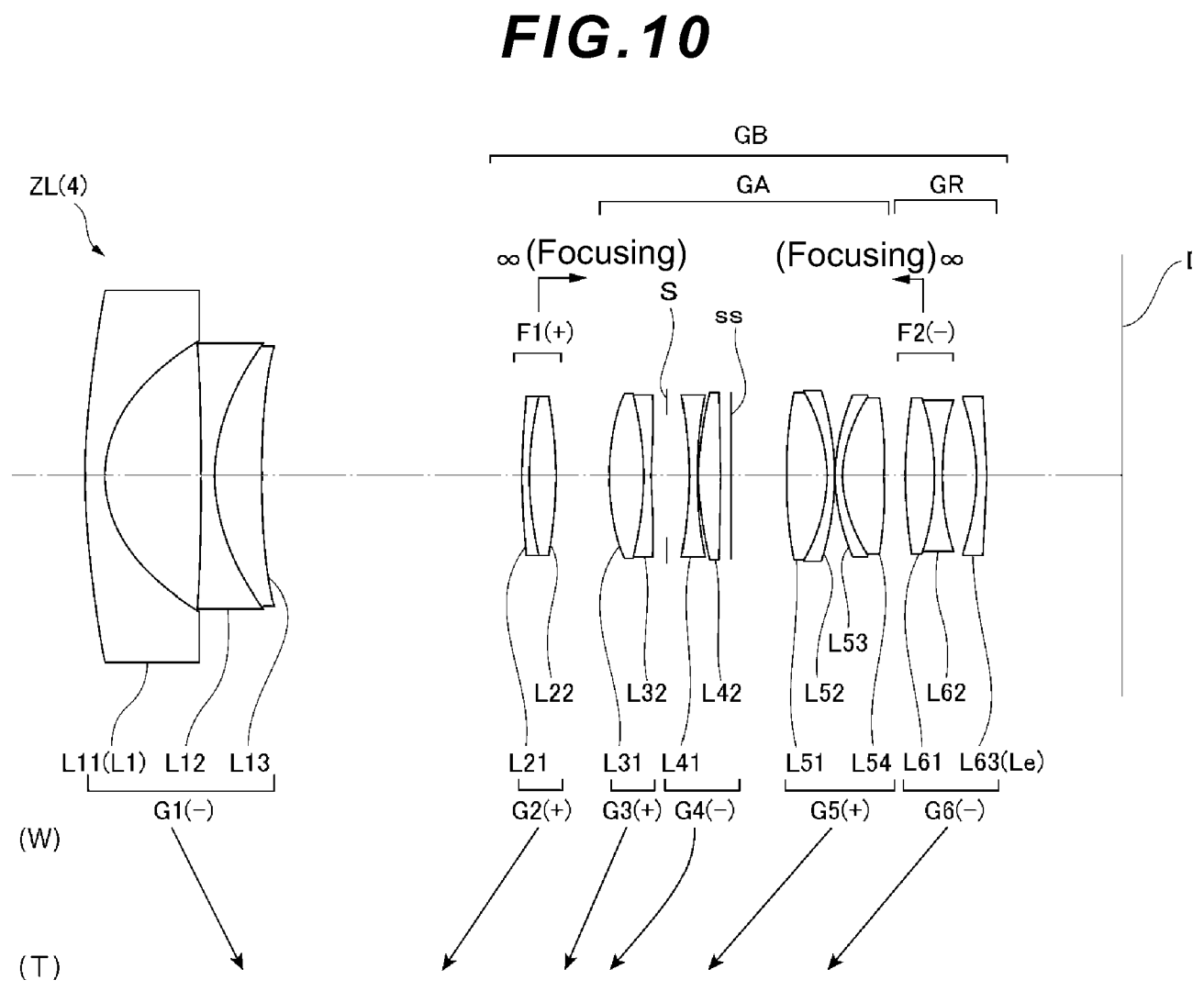

The following describes Example 4 with reference to FIGS. 10, 11, 12, and Table 4. FIG. 10 is a diagram showing a lens configuration of an optical system ZL(4) according to Example 4. The optical system ZL(4) comprises: a first lens group G1 having negative refractive power; a second lens group G2 having positive refractive power; a third lens group G3 having positive refractive power; fourth lens group G4 having negative refractive power; a fifth lens group G5 having positive refractive power; and a sixth lens group G6 having negative refractive power, which are placed in order from an object. The image surface I is located on the back side of the sixth lens group G6. An aperture stop S and a sub-aperture stop ss are arranged in the fourth lens group G4. The first focusing lens group F1 is configured of the second lens group G2, and the second focusing lens group F2 is configured of a part of the lens groups in the fifth lens group G5.

The respective lens groups move on trajectories indicated by arrows in the lower part of FIG. 10 when the optical system zooms from a wide angle end state (W) to a telephoto end state (T). The first lens group G1 moves toward an image surface, and the lens group (succeeding lens group GB) from the second lens group G2 to the sixth lens group G6 moves toward an object. Thus changing the distance between the first lens group G1 and the succeeding lens group changes the photographing magnification (performs zooming). Upon focusing from an infinity object to a short distance object, as shown by the arrows in the upper part of FIG. 10, the first focusing lens group F1 moves toward an image surface and the second focusing lens group F2 moves toward an object.

The first lens group G1 comprises: a negative meniscus lens L11 having a convex surface facing an object; a cemented negative lens of a biconcave negative lens L12 and a positive meniscus lens L13 having a convex surface facing an object. Note that both surfaces of the negative meniscus lens L11 are aspherical surfaces.

The second lens group G2 comprises a cemented positive lens of a negative meniscus lens L21 having a convex surface facing an object and a biconvex positive lens L22. The second lens group G2 functions as the first focusing lens group F1.

The third lens group G3 comprises a cemented positive lens of a biconvex positive lens L31 and a biconcave negative lens L32. The fourth lens group G4 comprises an aperture stop S, a biconcave negative lens L41, a biconvex positive lens L42, and a sub-aperture stop ss. The fifth lens group G5 comprises: a cemented positive lens of a biconvex positive lens L51 and a negative meniscus lens L52 having a concave surface facing an object; and a cemented positive lens of a negative meniscus lens L53 having a convex surface facing an object and a biconvex positive lens L54.

The sixth lens group G6 comprises a cemented negative lens of a biconvex positive lens L61 and a biconcave negative lens L62, and a negative meniscus lens L63 having a concave surface facing an object. Of these, the cemented negative lens of the positive lens L61 and the negative lens L62 functions as the second focusing lens group F2. Note that both surfaces of the negative meniscus lens L63 are aspherical surfaces.

In this example, the intermediate lens group GA is a lens group from the third lens group G3 to the fifth lens group G5, and the lens group GR including the second focusing lens group and the succeeding lens group is the sixth lens group G6.

Table 4 lists values of data of the optical system according to Example 4.

TABLE 4

| | | | | |
|---|---|---|---|---|
| | [General Data] Zooming ratio = 2.609 | | | |
| | | W | T | |
| f | | 18.549 | 48.400 | |
| F.NO | | 2.910 | 4.120 | |
| 2ω (°) | | 98.952 | | |
| Ymax | | 20.449 | 21.700 | |
| TL | | 156.976 | 145.902 | |
| BF | | 20.533 | 50.882 | |
| MF1 | | 5.923 | 8.270 | |
| MF2 | | −0.524 | −3.556 | |
| fAw | | 37.796 | | |
| fBw | | 36.341 | | |
| fRw | | −43.941 | | |

| | | [Lens Data] | | |
|---|---|---|---|---|
| Surface Number | R | D | nd | νd |
| Object Surface | ∞ | | | |
| 1* | 90.2223 | 2.800 | 1.74310 | 49.44 |
| 2* | 16.9651 | 14.785 | | |
| 3 | −282.3413 | 2.000 | 1.49782 | 82.57 |
| 4 | 30.2529 | 7.000 | 1.80000 | 29.84 |
| 5 | 103.7978 | (D5) | | |
| 6 | 80.1101 | 1.100 | 1.84666 | 23.80 |
| 7 | 46.9421 | 4.100 | 1.51680 | 64.13 |
| 8 | −63.4995 | (D8) | | |
| 9 | 34.7816 | 5.200 | 1.51680 | 64.13 |
| 10 | −51.2859 | 1.100 | 1.65844 | 50.83 |
| 11 | 267.1556 | (D11) | | |
| 12 | 0.0000 | 3.149 | | |
| 13 | −57.6080 | 1.200 | 1.83481 | 42.73 |
| 14 | 69.3506 | 0.200 | | |
| 15 | 45.2675 | 3.400 | 1.72825 | 28.38 |
| 16 | −184.9091 | 1.500 | | |
| 17 | 0.0000 | (D17) | | |
| 18 | 68.1932 | 6.100 | 1.49782 | 82.57 |
| 19 | −25.4228 | 1.100 | 1.95375 | 32.33 |
| 20 | −41.8924 | 0.200 | | |
| 21 | 30.1508 | 1.100 | 1.95375 | 32.33 |
| 22 | 20.4880 | 6.300 | 1.49782 | 82.57 |
| 23 | −82.9990 | (D23) | | |
| 24 | 60.5624 | 4.400 | 1.80809 | 22.74 |
| 25 | −35.8483 | 1.200 | 1.90366 | 31.27 |
| 26 | 40.1774 | (D26) | | |
| 27* | −38.1852 | 1.600 | 1.82098 | 42.50 |
| 28* | −86.3105 | (D28) | | |
| Image Surface | ∞ | | | |

| [Aspherical Surface Data] |
|---|
| 1st Surface |
| $\kappa = 1.0000$ |
| $A4 = -3.57211E-06$, $A6 = 4.48676E-10$, $A8 = 4.77136E-12$, $A10 = -6.03639E-15$ |
| 2nd Surface |
| $\kappa = 0.0000$ |
| $A4 = 8.11347E-06$, $A6 = -3.59862E-10$, $A8 = -1.58666E-11$, $A10 = 1.12811E-13$ |
| 27th Surface |
| $\kappa = 1.0000$ |
| $A4 = -2.23373E-05$, $A6 = 1.69704E-07$, $A8 = -1.19167E-09$, $A10 = 5.49616E-12$ |

TABLE 4-continued

| 28th Surface |
| --- |

$\kappa$ = 1.0000
A4 = −7.84265E−07, A6 = 1.80475E−07, A8 = −9.68995E−10, A10 = 3.96145E−12

[Lens Group Data]

| Group | First surface | Focal length | Magnification (∞ · W) | Magnification (∞ · T) |
| --- | --- | --- | --- | --- |
| 1 | 1 | −28.773 | 0.00000 | 0.00000 |
| 2(F1) | 6 | 86.248 | −36.18634 | 2.42339 |
| 3 | 9 | 100.824 | 0.03055 | −3.13269 |
| 4 | 12 | −160.249 | 2.24066 | −0.64541 |
| 5 | 18 | 37.131 | 0.17209 | −0.15582 |
| 6 | 24 | −43.941 | | |
| 6-1(F2) | 24 | −92.207 | 1.19914 | 1.36024 |
| 6-2 | 27 | −84.686 | 1.26135 | 1.61973 |

[the first lens group data]

| lens | Focal length |
| --- | --- |
| L11 | −28.583 |
| L12 | −54.773 |
| L13 | 51.206 |

[Variable Distance Data]

| | Infinity | | close-distance | |
| --- | --- | --- | --- | --- |
| | W | T | W | T |
| F | 18.54944 | 48.40000 | −0.12607 | −0.31101 |
| D0 | 0.00000 | 0.00000 | 115.7001 | 126.8366 |
| D5 | 39.47319 | 1.50000 | 45.51103 | 10.34524 |
| D8 | 8.04245 | 10.83893 | 2.00062 | 2.00000 |
| D11 | 2.62907 | 1.75020 | 2.62907 | 1.75020 |
| D17 | 8.43662 | 0.00000 | 8.43662 | 0.00000 |
| D2 | 33.18499 | 6.25349 | 2.77969 | 3.26672 |
| D2 | 65.14225 | 5.14225 | 5.55183 | 8.13586 |
| D28 | 20.53328 | 50.88248 | 20.64804 | 51.44497 |

Figure 11A:
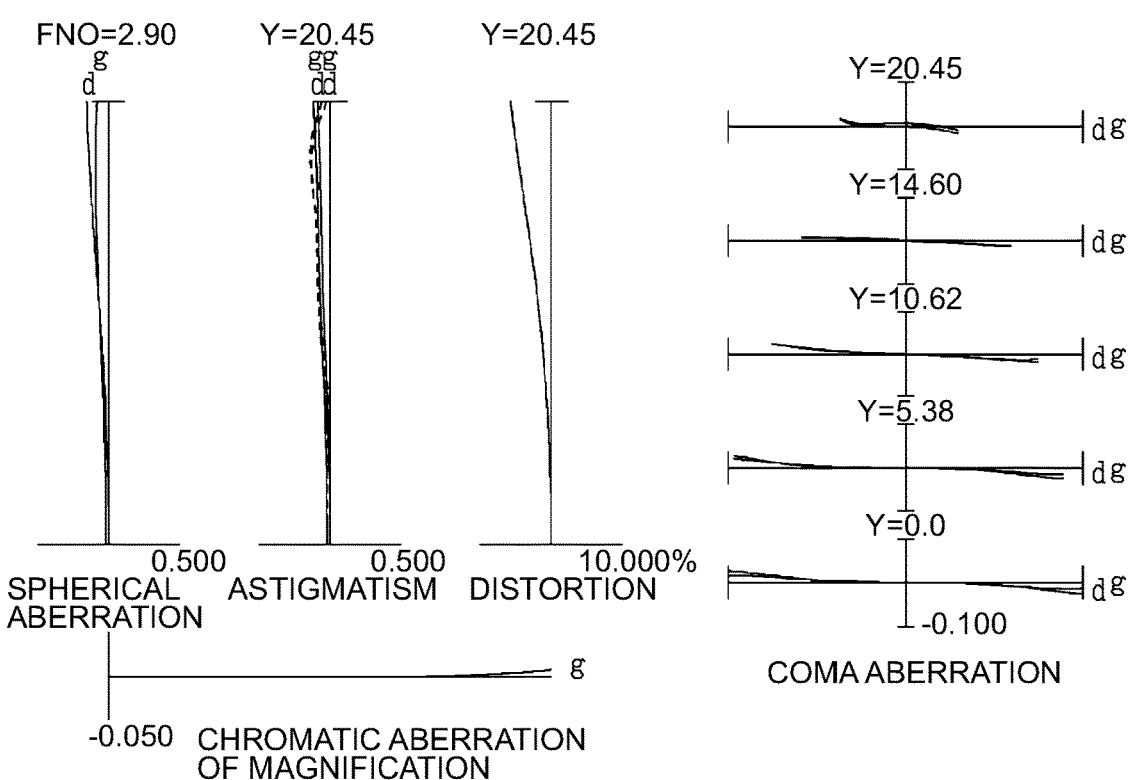
Figure 11B:
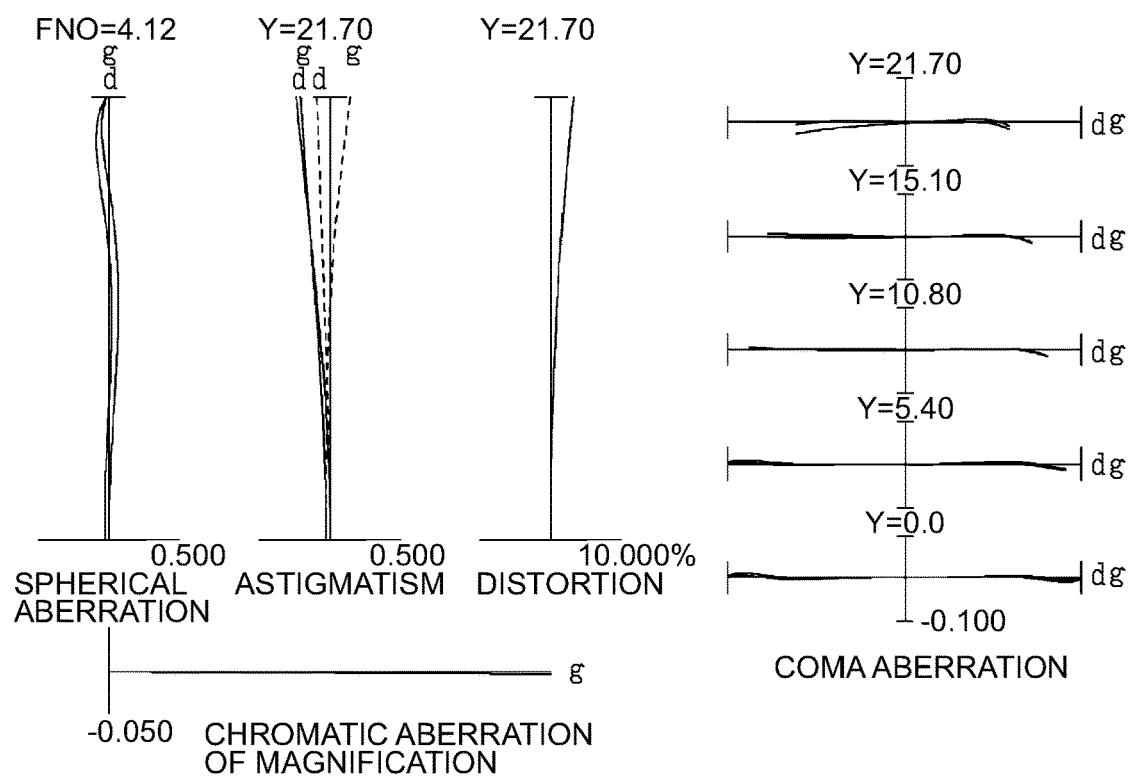
Figure 12A:
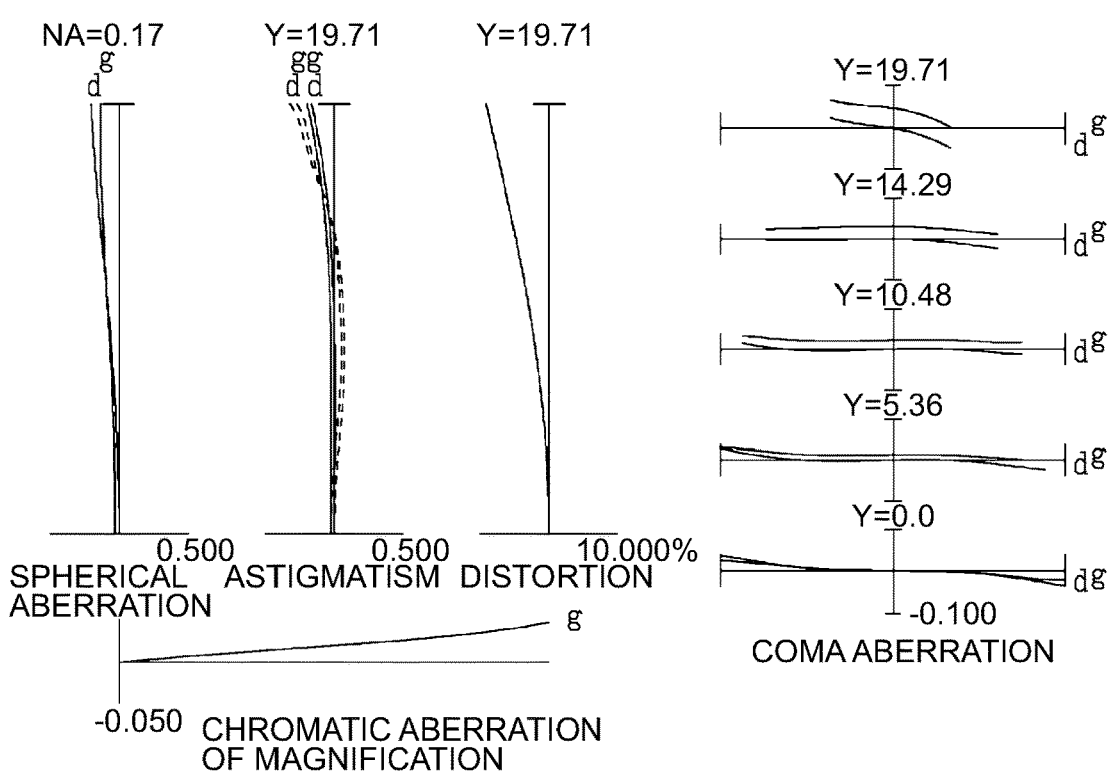
Figure 12B:
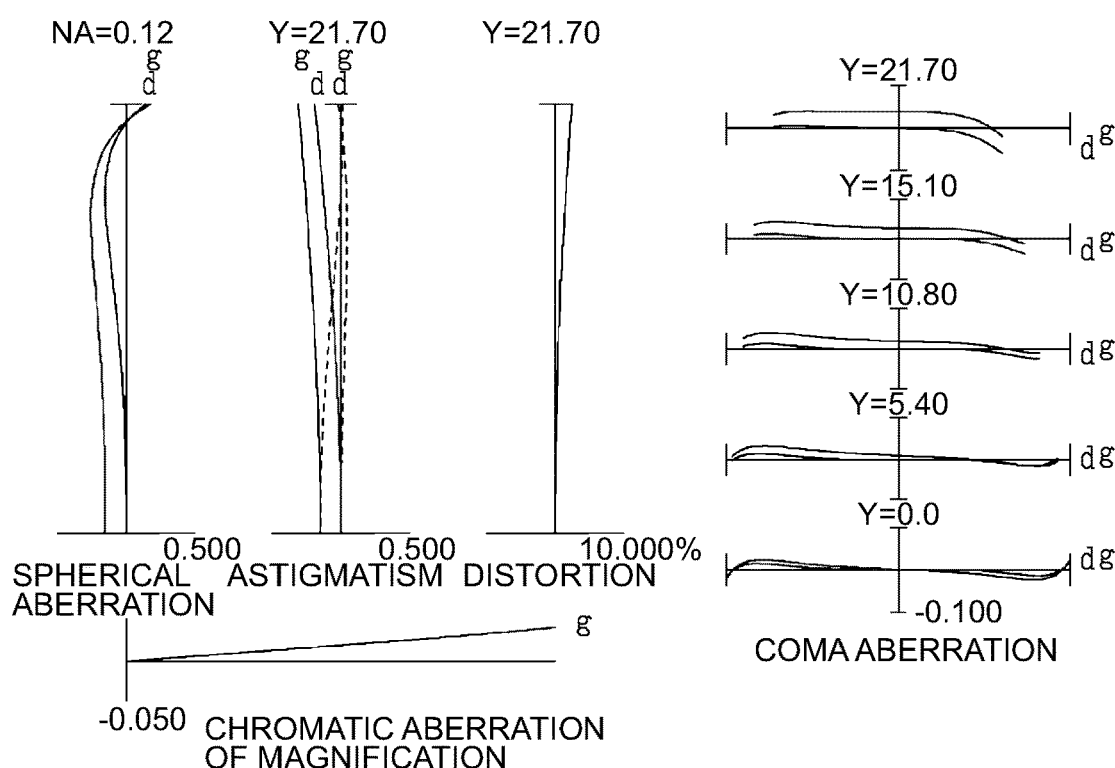

FIGS. 11A and 11B show various aberration values of the optical system according to Example 4 in a state of focusing on an infinity object, and FIGS. 12A and 12B show various aberration values of the optical system according to Example 4 in a state of focusing on a close distance object. In these figures, each figure with character A shows the various aberration values in a wide angle end state, and each figure with character B shows the various aberration values in a telephoto end state. The respective aberration graphs show that the optical system according to Example 4 can satisfactorily correct various aberrations over the entire range from a wide angle end state to a telephoto end state, and has excellent imaging performance also in a state of focusing on a close distance object.

Example 5

Figure 13:
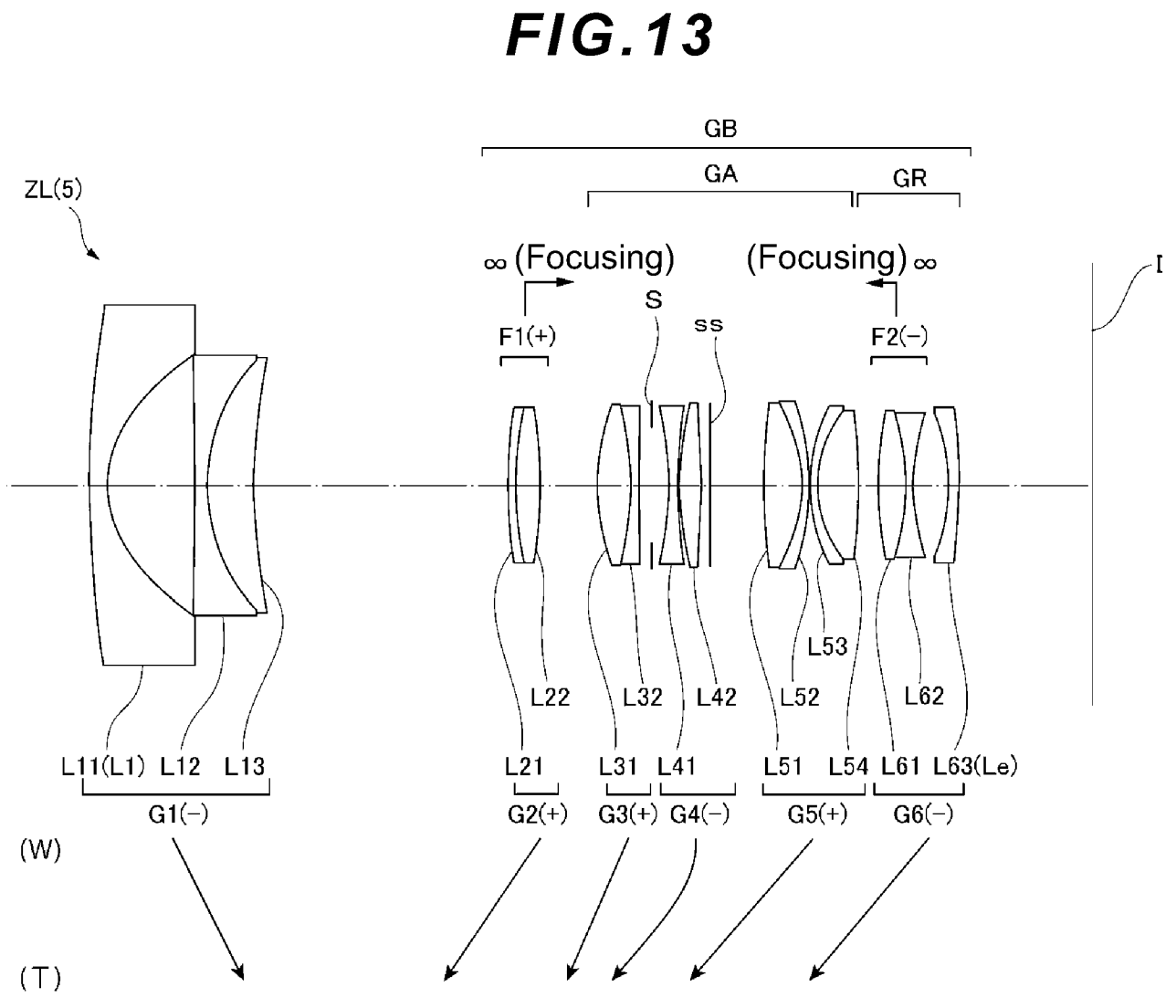

The following describes Example 5 with reference to FIGS. 13, 14, 15, and Table 5. FIG. 13 is a diagram showing a lens configuration of an optical system ZL(5) according to Example 5. The optical system ZL(5) comprises: a first lens group G1 having negative refractive power; a second lens group G2 having positive refractive power; a third lens group G3 having positive refractive power; a fourth lens group G4 having negative refractive power; a fifth lens group G5 having positive refractive power; and a sixth lens group G6 having negative refractive power, which are placed in order from an object. The image surface I is located on the back side of the sixth lens group G6. An aperture stop S and a sub-aperture stop ss are arranged in the fourth lens group G4. The first focusing lens group F1 is configured of the second lens group G2, and the second focusing lens group F2 is configured of a part of the lens groups in the sixth lens group G6.

The respective lens groups move on trajectories indicated by arrows in the lower part of FIG. 13 when the optical system zooms from a wide angle end state (W) to a telephoto end state (T). The first lens group G1 moves toward an image surface, and the lens group (succeeding lens group GB) from the second lens group G2 to the sixth lens group G6 moves toward an object. Thus changing the distance between the first lens group G1 and the succeeding lens group changes the photographing magnification (performs zooming). Upon focusing from an infinity object to a short distance object, as shown by the arrows in the upper part of FIG. 13, the first focusing lens group F1 moves toward an image surface and the second focusing lens group F2 moves toward an object.

The first lens group G1 comprises: a negative meniscus lens L11 having a convex surface facing an object; a cemented negative lens of a biconcave negative lens L12 and a positive meniscus lens L13 having a convex surface facing an object. Note that both surfaces of the negative meniscus lens L11 are aspherical surfaces.

The second lens group G2 comprises a cemented positive lens of a negative meniscus lens L21 having a convex surface facing an object and a biconvex positive lens L22. The second lens group G2 functions as the first focusing lens group F1.

The third lens group G3 comprises a cemented positive lens of a biconvex positive lens L31 and a biconcave negative lens L32. The fourth lens group G4 comprises an aperture stop S, a biconcave negative lens L41, a biconvex positive lens L42, and a sub-aperture stop ss. The fifth lens group G5 comprises: a cemented positive lens of a biconvex positive lens L51 and a negative meniscus lens L52 having a concave surface facing an object; and a cemented positive lens of a negative meniscus lens L53 having a convex surface facing an object and a biconvex positive lens L54.

The sixth lens group G6 comprises a cemented negative lens of a biconvex positive lens L61 and a biconcave negative lens L62, and a negative meniscus lens L63 having a concave surface facing an object. Of these, the cemented negative lens of the positive lens L61 and the negative lens L62 functions as the second focusing lens group F2. Note that both surfaces of the negative meniscus lens L63 are aspherical surfaces.

In this example, the intermediate lens group GA is a lens group from the third lens group G3 to the fifth lens group G5, and the lens group GR including the second focusing lens group and the succeeding lens group is the sixth lens group G6.

Table 5 lists values of data of the optical system according to Example 5.

TABLE 5

| [General Data] Zooming ratio = 2.609 | | |
|---|---|---|
| | W | T |
| f | 18.550 | 48.400 |
| F.NO | 2.910 | 4.120 |
| 2ω (°) | 98.950 | |
| Ymax | 19.991 | 21.700 |
| TL | 153.169 | 142.360 |
| BF | 20.351 | 49.945 |
| MF1 | 6.474 | 8.282 |
| MF2 | −0.810 | −3.419 |
| fAw | 36.915 | |
| fBw | 35.689 | |
| fRw | −43.947 | |

| [Lens Data] | | | | |
|---|---|---|---|---|
| Surface Number | R | D | nd | vd |
| Object Surface | ∞ | | | |
| 1* | 108.3788 | 2.800 | 1.74310 | 49.44 |
| 2* | 17.1763 | 13.362 | | |
| 3 | −452.0642 | 2.000 | 1.49782 | 82.57 |
| 4 | 29.1118 | 7.100 | 1.80000 | 29.84 |
| 5 | 99.4101 | (D5) | | |
| 6 | 91.9942 | 1.100 | 1.78472 | 25.64 |
| 7 | 50.8704 | 3.800 | 1.51680 | 64.13 |
| 8 | −60.5653 | (D8) | | |
| 9 | 32.8199 | 5.200 | 1.51680 | 64.13 |
| 10 | −48.6591 | 1.100 | 1.66755 | 41.87 |
| 11 | 265.9956 | (D11) | | |
| 12 | 0.0000 | 2.687 | | |
| 13 | −53.7450 | 1.200 | 1.83481 | 42.73 |
| 14 | 66.3134 | 0.200 | | |
| 15 | 43.7109 | 3.400 | 1.72825 | 28.38 |
| 16 | −154.9801 | 1.500 | | |
| 17 | 0.0000 | (D17) | | |
| 18 | 87.5765 | 5.900 | 1.49782 | 82.57 |
| 19 | −23.9396 | 1.100 | 1.95375 | 32.33 |
| 20 | −38.0021 | 0.200 | | |
| 21 | 28.0976 | 1.100 | 1.95375 | 32.33 |
| 22 | 19.4681 | 6.200 | 1.49782 | 82.57 |
| 23 | −95.1629 | (D23) | | |
| 24 | 50.2834 | 4.300 | 1.80809 | 22.74 |
| 25 | −35.1704 | 1.100 | 1.90366 | 31.27 |
| 26 | 34.1702 | (D26) | | |

TABLE 5-continued

| 27* | −34.1324 | 1.600 | 1.82098 | 42.50 |
| 28* | −64.9656 | (D28) | | |
| Image Surface | ∞ | | | |

[Aspherical Surface Data]

1st Surface

κ = 1.0000
A4 = −3.71101E−06, A6 = 1.26060E−09, A8 = 4.60876E−12, A10 = −6.89613E−15

2nd Surface

κ = 0.0000
A4 = 7.33565E−06, A6 = −7.30032E−10, A8 = −1.36898E−11, A10 = 1.28740E−13

27th Surface

κ = 1.0000
A4 = −2.56022E−05, A6 = 1.92542E−07, A8 = −1.42300E−09, A10 = 8.01684E−12

28th Surface

κ = 1.0000
A4 = −3.62729E−06, A6 = 1.98569E−07, A8 = −1.03741E−09, A10 = 4.87457E−12

[Lens Group Data]

| Group | First surface | Focal length | Magnification (∞ · W) | Magnification (∞ · T) |
|---|---|---|---|---|
| 1 | 1 | −28.822 | 0.00000 | 0.00000 |
| 2(F1) | 6 | 85.406 | −53.24407 | 2.39642 |
| 3 | 9 | 95.577 | 0.02025 | −2.83836 |
| 4 | 12 | −155.097 | 2.24310 | −0.75898 |
| 5 | 18 | 36.717 | 0.17538 | −0.14799 |
| 6 | 24 | −43.497 | | |
| 6-1(F2) | 24 | −84.946 | 1.21604 | 1.39295 |
| 6-2 | 27 | −89.697 | 1.24802 | 1.57795 |

[the first lens group data]

| lens | Focal length |
|---|---|
| L11 | −27.832 |
| L12 | −54.865 |
| L13 | 49.249 |

[Variable Distance Data]

| | Infinity | | close-distance | |
|---|---|---|---|---|
| | W | T | W | T |
| F | 18.55000 | 48.40001 | −0.12247 | −0.30440 |
| D0 | 0.00000 | 0.00000 | 119.5188 | 130.3147 |
| D5 | 38.74338 | 1.50036 | 45.31799 | 10.32723 |
| D8 | 8.57407 | 10.83209 | 1.99789 | 2.00708 |
| D11 | 2.01695 | 1.74095 | 2.01695 | 1.74095 |
| D17 | 8.14332 | 0.00000 | 8.14332 | 0.00000 |
| D23 | 2.96088 | 5.96253 | 2.25307 | 3.08659 |
| D26 | 5.42939 | 5.42939 | 6.14676 | 8.30793 |
| D28 | 20.35129 | 49.94512 | 20.44408 | 50.48584 |

Figure 14A:
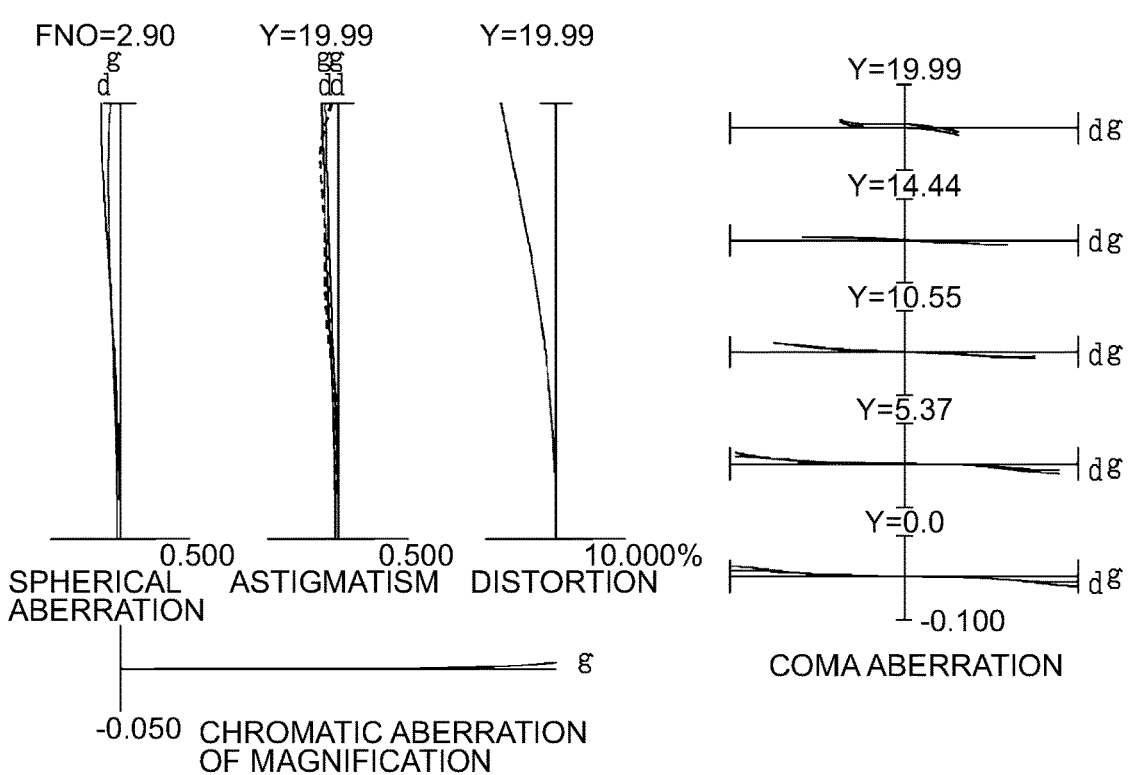
Figure 14B:
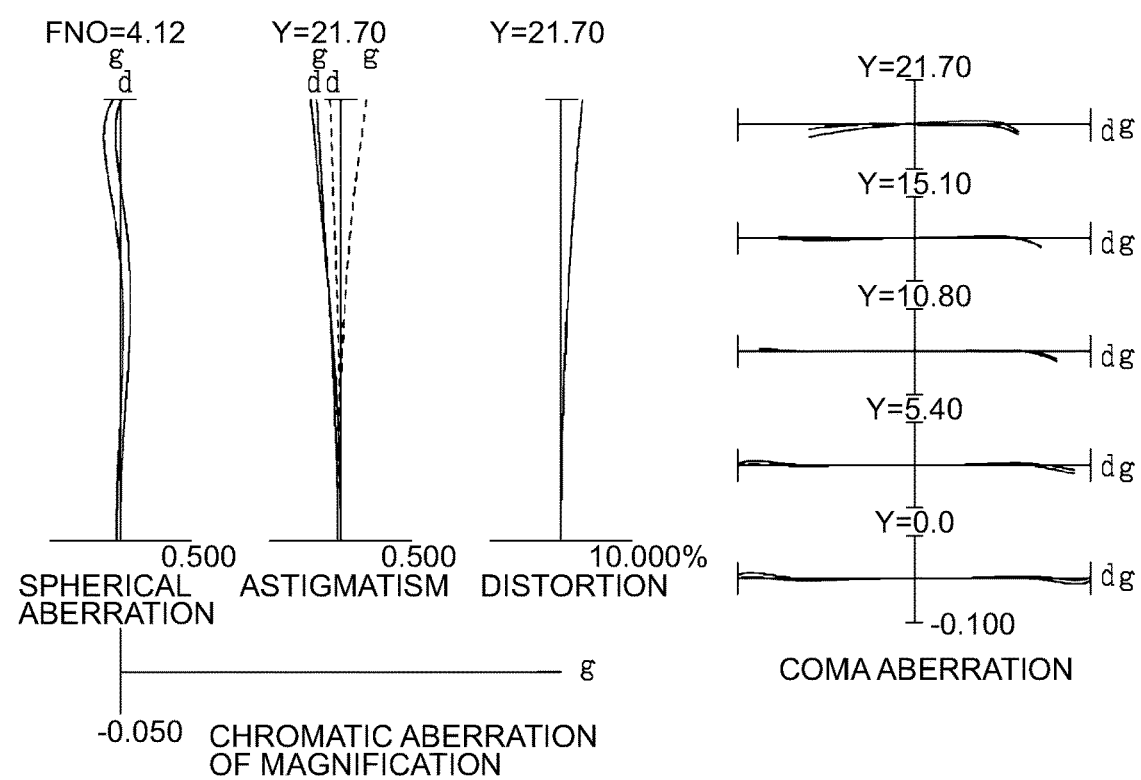
Figure 15A:
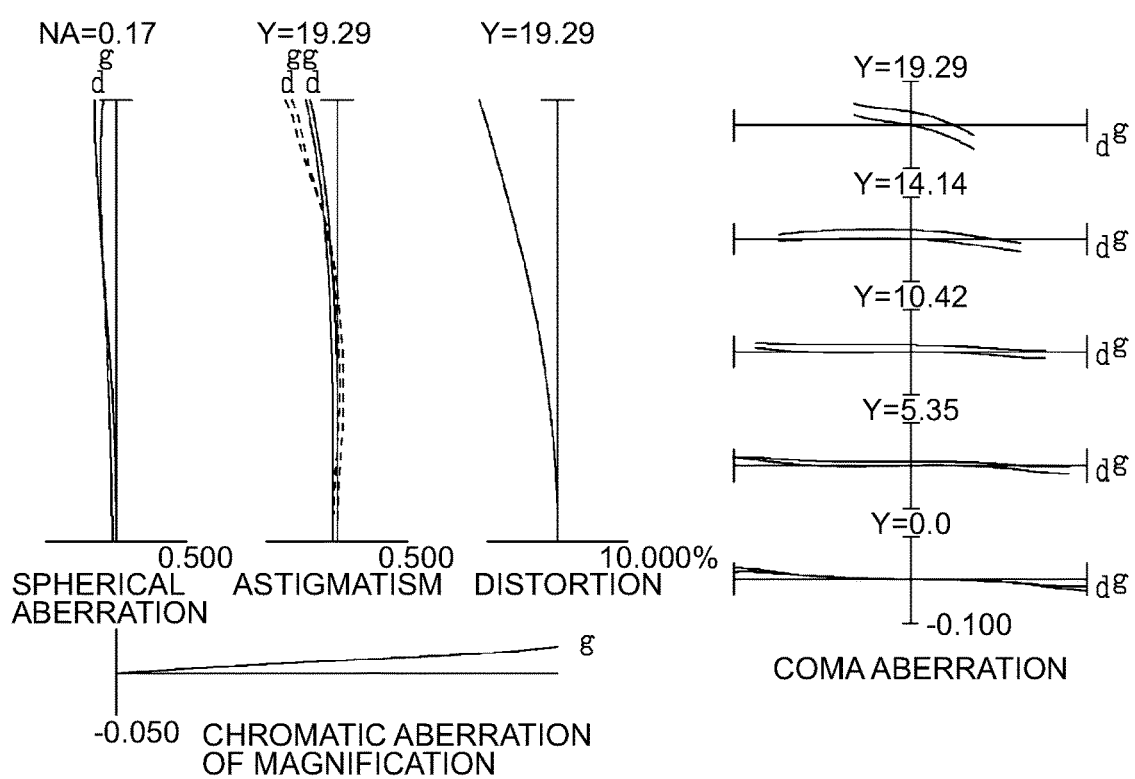
Figure 15B:
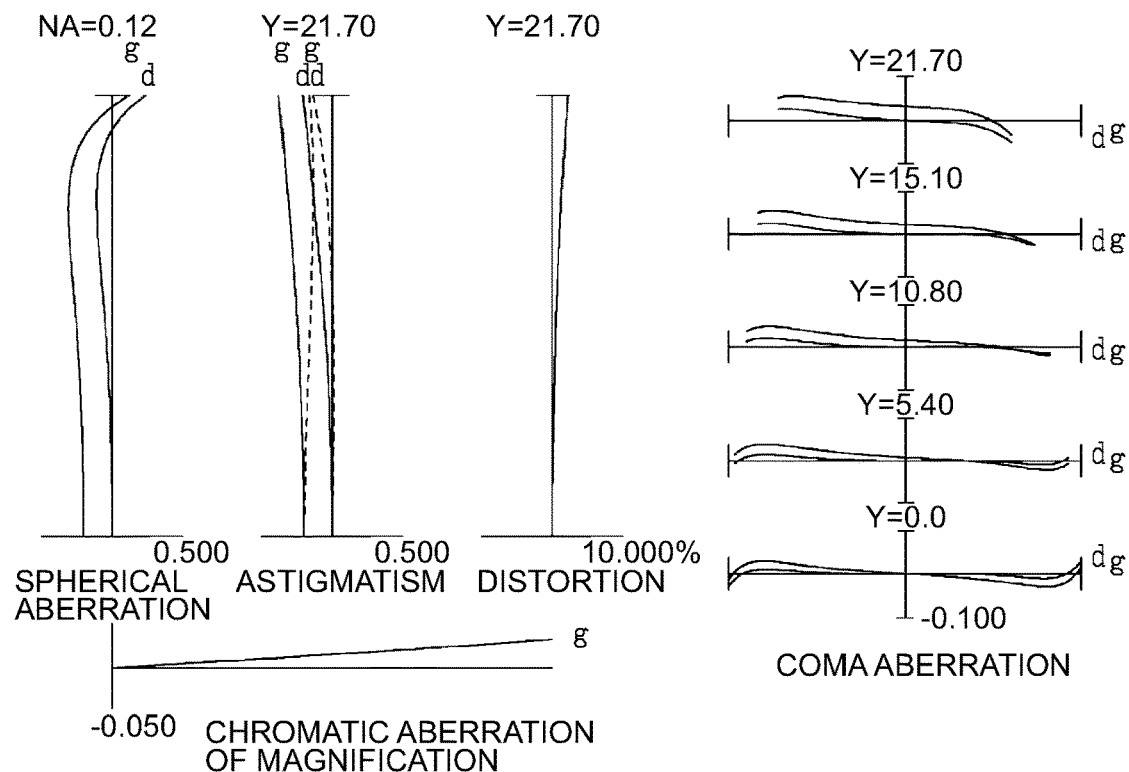

FIGS. 14A and 14B show various aberration values of the optical system according to Example 5 in a state of focusing on an infinity object, and FIGS. 15A and 15B show various aberration values of the optical system according to Example 5 in a state of focusing on a close distance object. In these figures, each figure with character A shows the various aberration values in a wide angle end state, and each figure with character B shows the various aberration values in a telephoto end state. The respective aberration graphs show that the optical system according to Example 5 can satisfactorily correct various aberrations over the entire range from a wide angle end state to a telephoto end state, and has excellent imaging performance also in a state of focusing on a close distance object.

Example 6

Figure 16:
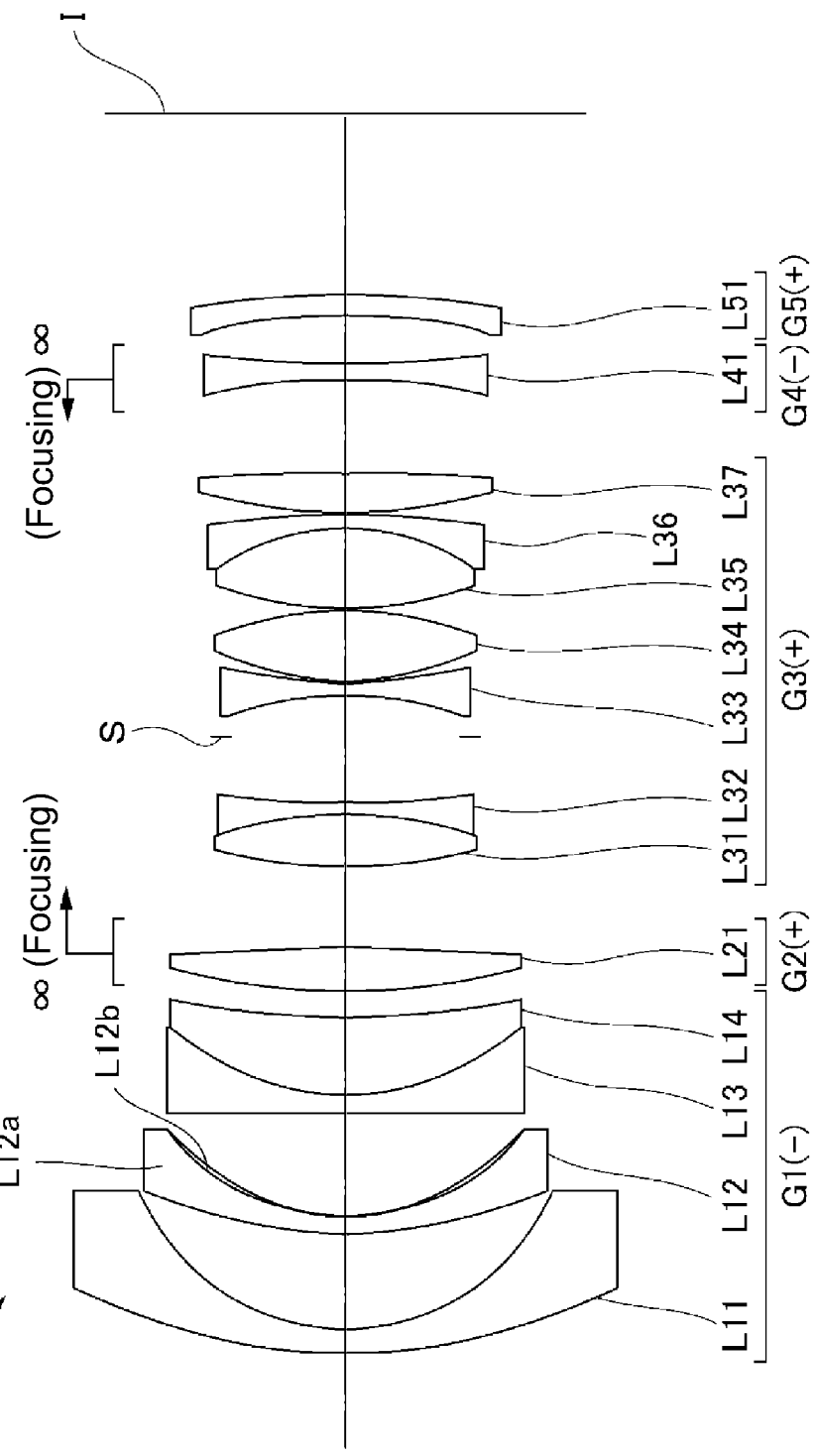
FIG. 16 is a diagram showing a lens configuration of an optical system according to Example 6.

The following describes Example 6 with reference to FIGS. 16, 17, and Table 6. FIG. 16 is a diagram showing a lens configuration of an optical system OL(1) according to Example 6. The optical system OL(1) comprises: a first lens group G1 having negative refractive power; a second lens group G2 having positive refractive power; a third lens group G3 having positive refractive power; an aperture stop S arranged in the third lens group G3; a fourth lens group G4 having negative refractive power; and a fifth lens group G5 having positive refractive power, which are placed in order from an object. In this example, the second lens group G2 is the first focusing lens group F1, the fourth lens group G4 is the second focusing lens group F2, and the third lens group G3 corresponds to the intermediate lens group GA.

The positions of the first lens group G1, the third lens group G3, and the fifth lens group G5 are substantially fixed, and the second lens group G2 and the fourth lens group G4 are arranged movably along the optical axis. Upon focusing from an infinity object to a short distance object, the second lens group G2 moves toward an image surface, and the fourth lens group G4 moves toward an object.

The first lens group G1 comprises: a negative meniscus lens L11 having a convex surface facing an object; a negative meniscus lens L12 having a convex surface facing an object; and a cemented negative lens of a biconcave negative lens L13 and a positive meniscus lens L14 having a convex surface facing an object, which are placed in order from an object.

The negative meniscus lens L12 is a hybrid lens configured such that a resin layer L12b is provided on the surface, facing an image, of a glass lens body L12a. The surface, facing an image, of the resin layer L12b is an aspherical surface, and the negative meniscus lens L12 is a composite type aspherical surface lens. In a [lens data] column to be described below, a surface number 3 represents the surface, facing an object, of the lens body L12a, a surface number 4 represents the surface, facing an image, of the lens body L12a and the surface, facing an object, of the resin layer 12b (the surface on which both are cemented), and a surface number 5 represents the surface, facing an image, of the resin layer 11b.

The second lens group G2 comprises a biconvex positive lens L21. The third lens group G3 comprises: a cemented positive lens of a biconvex positive lens L31 and a biconcave negative lens L32; an aperture stop S; a biconcave negative lens L33; a biconvex positive lens L34; a cemented positive lens of a biconvex positive lens L35 and a negative meniscus lens L36 having a concave surface facing an object; and a biconvex positive lens L37, which are placed in order from an object. The fourth lens group G4 comprises a biconcave negative lens L41. Note that both surfaces of this negative lens L41 are aspherical surfaces. The fifth lens group G5 comprises a positive meniscus lens L51 having a concave surface facing an object. Both surfaces of this positive meniscus lens L51 are also aspherical surfaces.

Table 6 lists values of data of the optical system according to Example 6.

TABLE 6

| [General Data] | | | |
| --- | --- | --- | --- | f = 19.688
FNO = 1.850
2ω = 97.191 (°)
Ymax = 21.7
TL = 116.459
BF = 16.917
MF1 = 5.386
MF2 = −1.953
fA = 29.990
fB = 30.235
fR = −81.810

| [Lens Data] | | | |
| --- | --- | --- | --- |
| Surface Number | R | D | nd | vd |
| --- | --- | --- | --- | --- |
| Object Surface | ∞ | | | |
| 1 | 57.3035 | 2.200 | 1.69680 | 55.53 |
| 2 | 21.3261 | 8.997 | | |
| 3 | 46.9767 | 1.550 | 1.77224 | 49.62 |
| 4 | 21.7904 | 0.050 | 1.51380 | 52.97 |
| 5* | 18.1460 | 9.740 | | |
| 6 | −1973.3753 | 1.600 | 1.49782 | 82.57 |
| 7 | 24.5592 | 7.299 | 1.73089 | 29.91 |
| 8 | 81.3879 | (D8) | | |
| 9 | 57.6676 | 4.100 | 1.80400 | 46.60 |
| 10 | −244.7040 | (D10) | | |
| 11 | 0.000 | 0.000 | | |
| 12 | 42.4491 | 5.200 | 1.86049 | 34.44 |
| 13 | −37.7699 | 1.100 | 1.84666 | 23.80 |
| 14 | 88.9609 | 6.289 | | |
| 15(S) | 0.0000 | 3.798 | | |
| 16 | −32.5274 | 1.100 | 1.65197 | 34.01 |
| 17 | 46.2591 | 0.200 | | |
| 18 | 28.9857 | 6.600 | 1.49782 | 82.57 |
| 19 | −33.4202 | 0.200 | | |
| 20 | 36.6199 | 7.600 | 1.49782 | 82.57 |
| 21 | −21.1000 | 1.200 | 1.95375 | 32.33 |
| 22 | −73.5382 | 0.200 | | |
| 23 | 48.2381 | 3.700 | 1.96300 | 24.11 |
| 24 | −163.7591 | (D24) | | |
| 25* | −147.2087 | 1.600 | 1.86100 | 37.10 |
| 26* | 98.5414 | (D26) | | |

TABLE 6-continued

| 27* | −63.8342 | 2.000 | 1.85439 | 39.00 |
| 28* | −56.2600 | 16.917 | | |
| Image Surface | ∞ | | | |

( the surface No. 11 is an imaginal surface)

[Aspherical Surface Data]

5th Surface

κ = 0.0000
A4 = 4.89868E−06 A6 = −2.38352E−09 A8 = −3.40682E−11 A10 = 7.58950E−14

25th Surface

κ = 1.0000
A4 = −1.45012E−05 A4 = −1.25259E−07 A8 = 1.68046E−09 A10 = −9.28778E−12

26th Surface

κ = 1.0000
A4 = 1.20678E−05 A6 = −2.98179E−07 A8 = 3.17958E−09 A10 = −1.58580E−11

27th Surface

κ = 1.0000
A4 = 3.93967E−05 A6 = −6.92338E−07 A8 = 3.73867E−09 A10 = −1.12121E−11

28th Surface

κ = 1.0000
A4 = 4.82102E−05 A6 = −5.00947E−07 A8 = 2.56327E−09 A10 = −6.40509E−12

[Lens Group Data]

| Group | First surface | Focal length | Magnification (Infinity) | Magnification (close-distance) |
|---|---|---|---|---|
| 1 | 1 | −20.641 | 0.00000 | 0.19310 |
| 2 | 9 | 58.399 | 3.22563 | 3.55642 |
| 3 | 12 | 29.990 | −0.22567 | −0.20460 |
| 4 | 25 | −68.352 | 1.33671 | 1.36542 |
| 5 | 27 | 494.766 | 0.98024 | 0.97977 |

[Variable Distance Data]

| | Infinity | Short-distance |
|---|---|---|
| f | 19.68812 | −0.18797 |
| D0 | 0.00000 | 78.79790 |
| D8 | 2.36119 | 8.03093 |
| D10 | 7.63173 | 2.00000 |
| D24 | 8.63128 | 6.92400 |
| D26 | 4.59486 | 6.31204 |

Figures 17A, 17B:
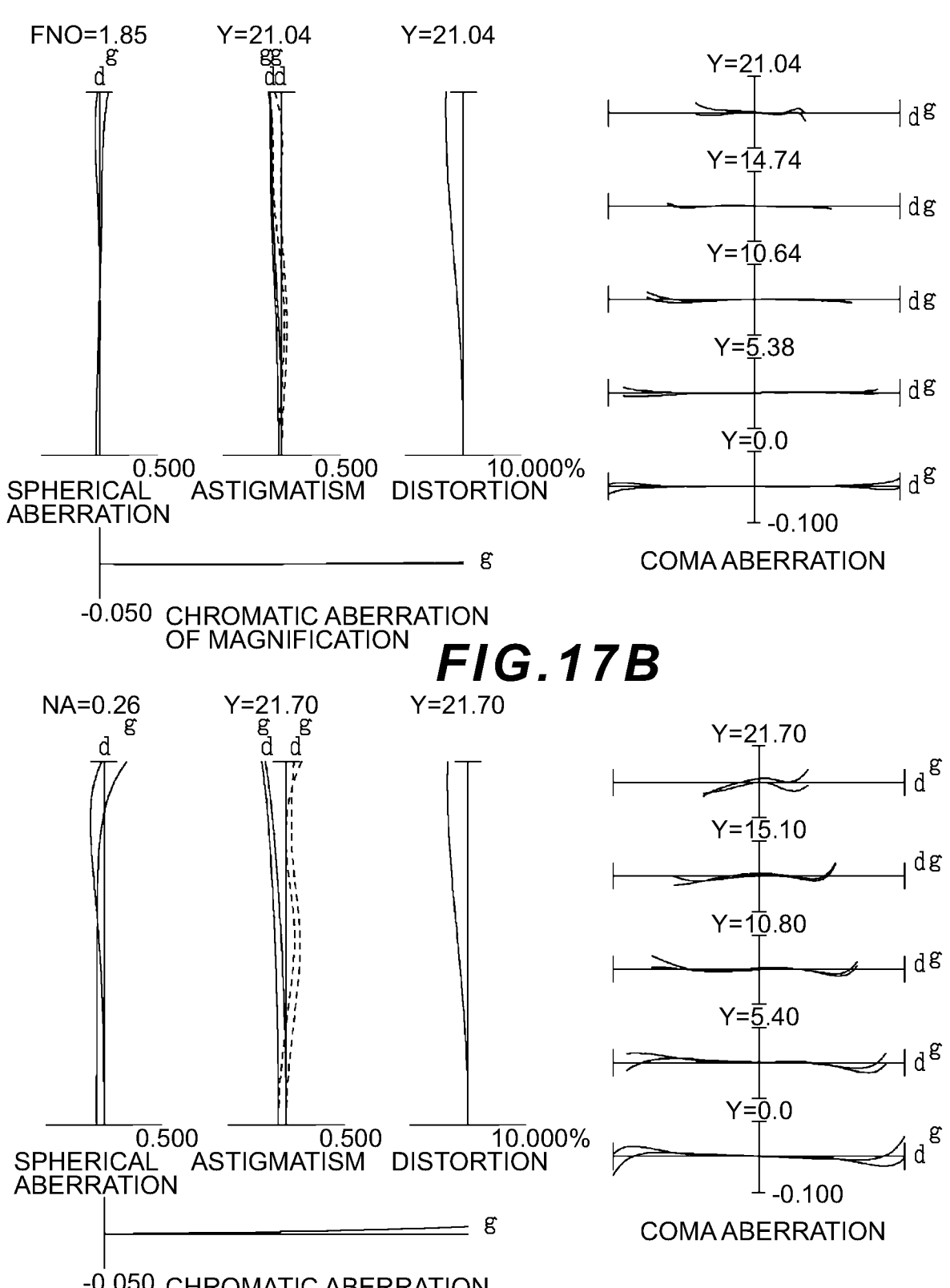

FIG. 17A shows various aberration values of the optical system according to Example 6 upon focusing on an infinity object and FIG. 17B shows those upon focusing on a close distance object. The respective aberration graphs show that the optical system according to Example 6 can satisfactorily correct various aberrations over the entire range from a state of focusing on an infinity object to a state of focusing on a close distance object, and also has excellent imaging performance for focusing on a short distance object.

Example 7

Figure 18:
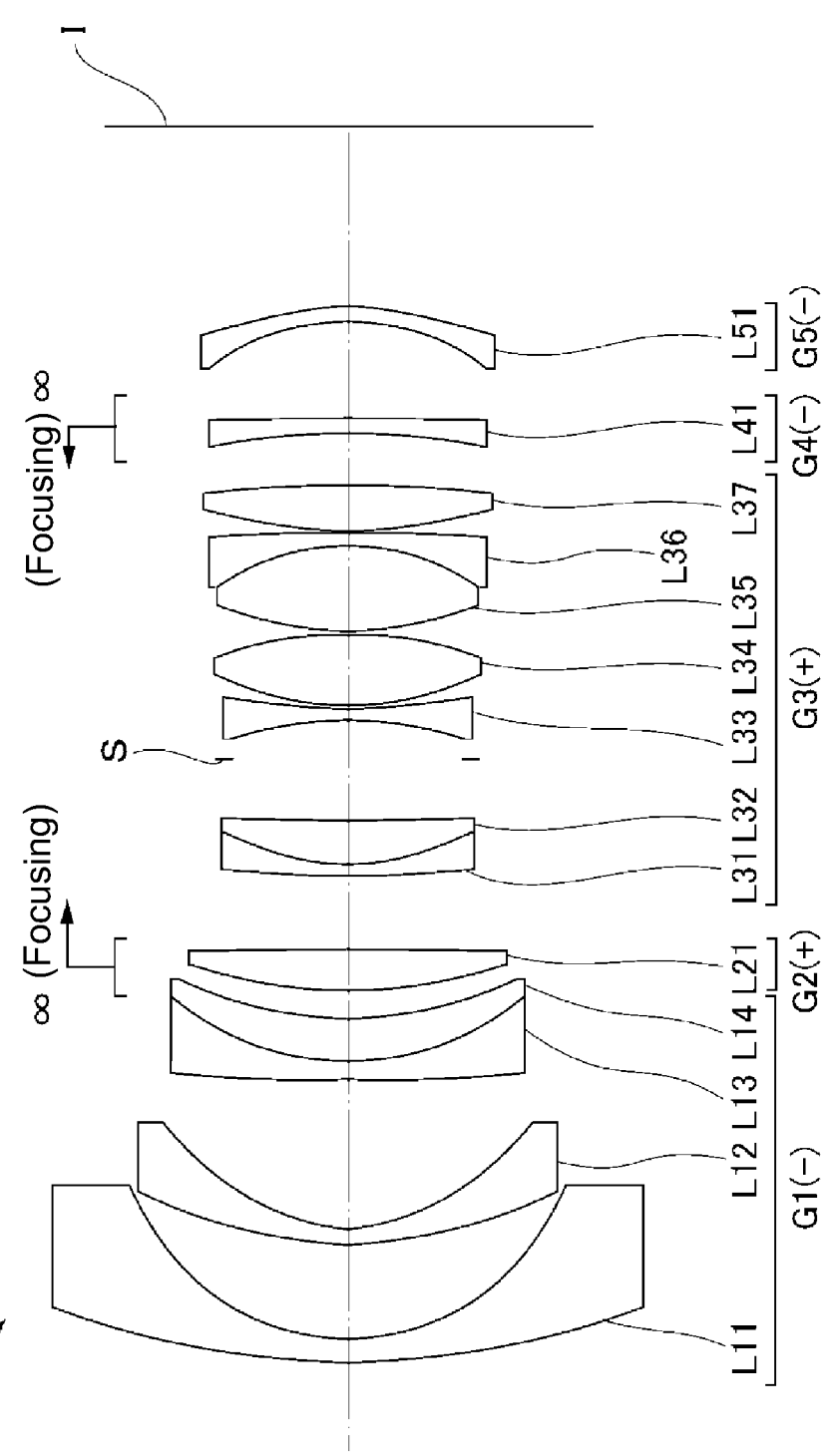
FIG. 18 is a diagram showing a lens configuration of an optical system according to Example 7.

The following describes Example 7 with reference to FIGS. 18, 19, and Table 7. FIG. 18 is a diagram showing a lens configuration of an optical system OL(2) according to Example 7. The optical system OL(2) comprises: a first lens group G1 having negative refractive power; a second lens group G2 having positive refractive power; a third lens group G3 having positive refractive power; an aperture stop S arranged in the third lens group G3; a fourth lens group G4 having negative refractive power; and a fifth lens group G5 having negative refractive power, which are placed in order from an object. In this example, the second lens group G2 is the first focusing lens group F1, the fourth lens group G4 is the second focusing lens group F2, and the third lens group G3 corresponds to the intermediate lens group GA.

The positions of the first lens group G1, the third lens group G3, and the fifth lens group G5 are substantially fixed, and the second lens group G2 and the fourth lens group G4 are arranged movably along the optical axis. Upon focusing from an infinity object to a short distance object, the second lens group G2 moves toward an image surface, and the fourth lens group G4 moves toward an object.

The first lens group G1 comprises: a negative meniscus lens L11 having a convex surface facing an object; a negative meniscus lens L12 having a convex surface facing an object; and a cemented negative lens of a negative meniscus lens L13 having a convex surface facing an object and a positive meniscus lens L14 having a convex surface facing an object, which are placed in order from an object. Note that the surface, facing an image, of the negative meniscus lens L12 is an aspherical surface. The second lens group G2 comprises a biconvex positive lens L21. The third lens group G3 comprises: a cemented positive lens of a negative meniscus lens L31 having a convex surface facing an object and a positive meniscus lens L32 having a convex surface facing an object; an aperture stop S; a biconcave negative lens L33; a biconvex positive lens L34; a cemented positive lens of a biconvex positive lens L35 and a negative meniscus lens L36 having a concave surface facing an object; and a biconvex positive lens L37, which are placed in order from an object. The fourth lens group G4 comprises a negative meniscus lens L41 having a concave surface facing an object. Note that the surface, facing an image, of the negative meniscus lens L41 is an aspherical surface. The fifth lens group G5 comprises a negative meniscus lens L51 having a concave surface facing an object. Note that the surface, facing an image, of the negative meniscus lens L51 is an aspherical surface.

Table 7 lists values of data of the optical system according to Example 7.

TABLE 7

[General Data]

| f = 19.400 |
| FNO = 1.850 |
| 2ω (°) = 96.302 (°) |
| Ymax = 21.7 |
| TL = 115.432 |
| BF = 16.779 |
| MF1 = 4.512 |
| MF2 = −1.940 |
| fA = 28.254 |
| fB = 29.172 |
| fR = −79.268 |

[Lens Data]

| Surface Number | R | D | nd | νd |
| --- | --- | --- | --- | --- |
| Object Surface | ∞ | | | |
| 1 | 76.2605 | 2.200 | 1.58144 | 40.98 |
| 2 | 21.5000 | 8.863 | | |
| 3 | 40.0000 | 1.600 | 1.51680 | 64.13 |
| 4* | 16.3297 | 13.845 | | |
| 5 | 226.3860 | 1.600 | 1.49782 | 82.57 |
| 6 | 25.1535 | 4.115 | 1.96300 | 24.11 |
| 7 | 37.0353 | (D7) | | |
| 8 | 44.7152 | 3.900 | 1.80100 | 34.92 |
| 9 | −507.7065 | (D9) | | |
| 10 | 97.7677 | 1.100 | 1.84666 | 23.80 |
| 11 | 23.9065 | 4.000 | 1.95375 | 32.33 |
| 12 | 255.9480 | 5.900 | | |
| 13(S) | 0.0000 | 3.637 | | |
| 14 | −35.4276 | 1.100 | 1.75520 | 27.57 |
| 15 | 62.9864 | 0.200 | | |
| 16 | 27.4558 | 6.800 | 1.49782 | 82.57 |
| 17 | −34.3996 | 0.200 | | |
| 18 | 29.8420 | 8.100 | 1.49782 | 82.57 |
| 19 | −20.5482 | 1.200 | 1.95375 | 32.33 |
| 20 | −144.8437 | 0.200 | | |
| 21 | 46.4167 | 4.300 | 1.96300 | 24.11 |
| 22 | −94.0236 | (D22) | | |
| 23 | −66.0204 | 1.400 | 1.86100 | 37.10 |
| 24* | −222.4288 | (D24) | | |
| 25 | −21.6485 | 1.400 | 1.86100 | 37.10 |
| 26* | −24.3902 | 16.779 | | |
| Image Surface | ∞ | | | |

[Aspherical Surface Data]

4th Surface $\kappa = 0.0000$
A4 = 5.46124E−06 A6 = 3.96542E−09 A8 = −5.72094E−11
A10 = 1.49065E−13

TABLE 7-continued

24th Surface $\kappa = 0.0000$
A4 = 1.34226E−05 A6 = −4.35028E−08 A8 = −3.12005E−12
A10 = 3.60919E−13

26th Surface $\kappa = 0.0000$
A4 = 2.69940E−05 A6 = 5.44918E−08 A8 = 3.79479E−10
A10 = −1.01631E−12

[Lens Group Data]

| Group | First surface | Focal length | Magnification (Infinity) | Magnification (close-distance) |
| --- | --- | --- | --- | --- |
| 1 | 1 | −19.722 | 0.00000 | 0.17848 |
| 2 | 8 | 51.467 | 3.78307 | 4.16168 |
| 3 | 10 | 28.254 | −0.19373 | −0.17591 |
| 4 | 23 | −109.499 | 1.23451 | 1.25191 |
| 5 | 25 | −292.852 | 1.08721 | 1.08799 |

[Variable Distance Data]

| | Infinity | Short-distance |
| --- | --- | --- |
| f | 19.39989 | −0.17797 |
| D0 | 0.00000 | 81.61080 |
| D7 | 2.58845 | 7.34608 |
| D9 | 6.71651 | 2.00000 |
| D22 | 4.79891 | 3.06288 |
| D24 | 8.88903 | 10.60081 |

Figures 19A, 19B:
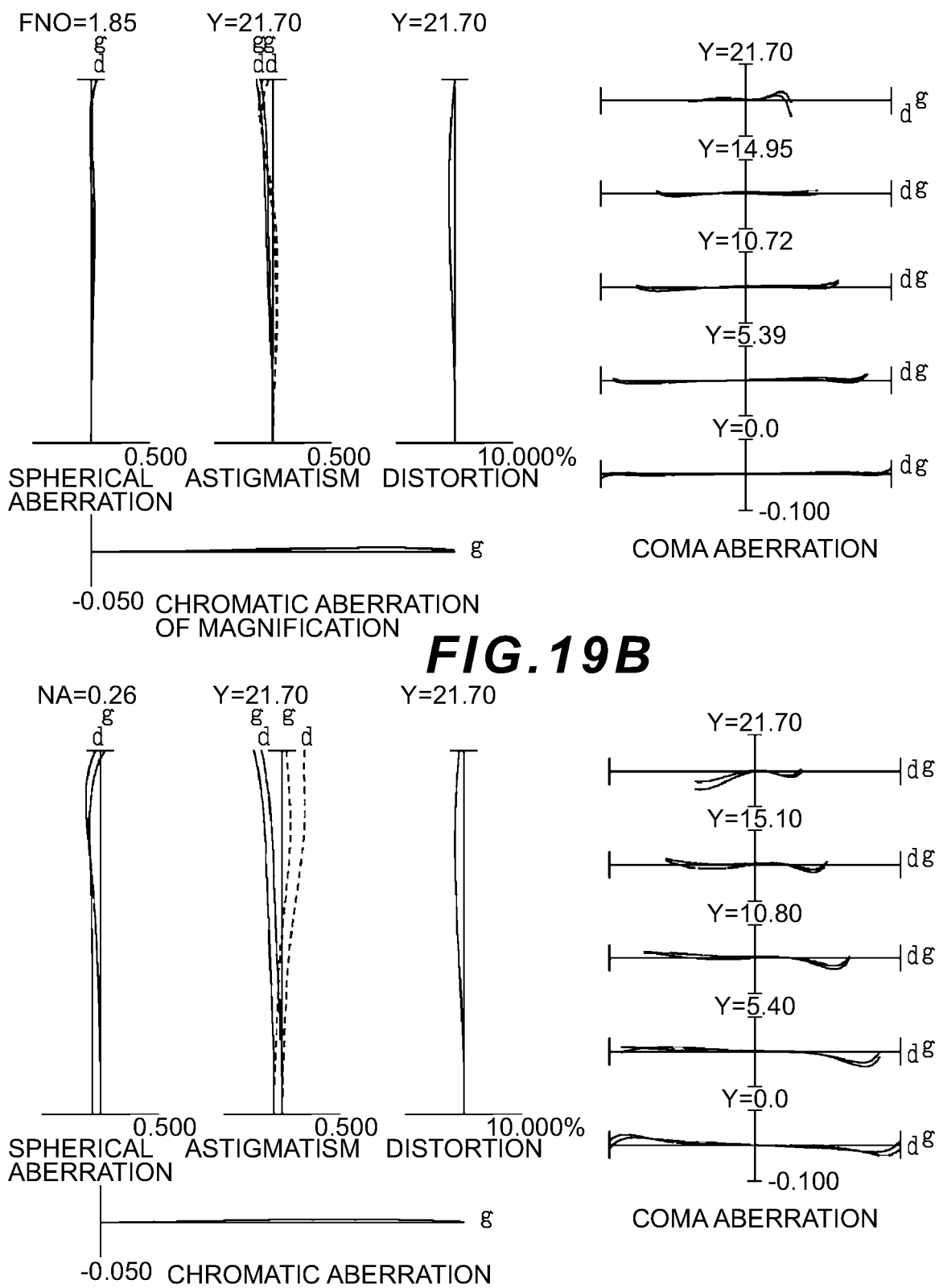

FIG. 19A shows various aberration values of the optical system according to Example 7 upon focusing on an infinity object and FIG. 19B shows those upon focusing on a close distance object. The respective aberration graphs show that the optical system according to Example 7 can satisfactorily correct various aberrations over the entire range from a state of focusing on an infinity object to a state of focusing on a close distance object, and also has excellent imaging performance for focusing on a short distance object.

Example 8

Figure 20:
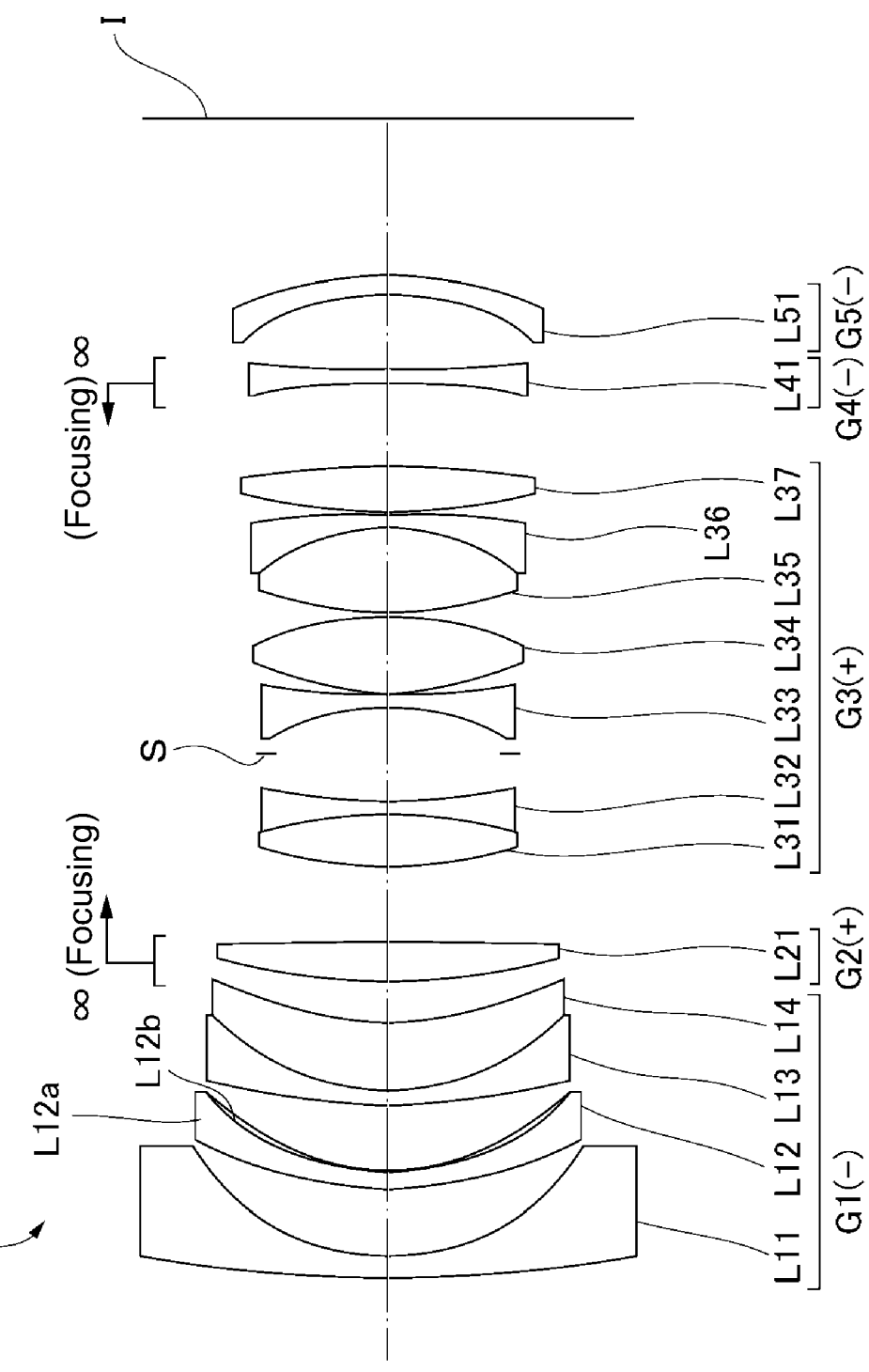
FIG. 20 is a diagram showing a lens configuration of an optical system according to Example 8.

The following describes Example 8 with reference to FIGS. 20, 21, and Table 8. FIG. 20 is a diagram showing a lens configuration of an optical system OL(3) according to Example 8. The optical system OL(3) comprises: a first lens group G1 having negative refractive power; a second lens group G2 having positive refractive power; a third lens group G3 having positive refractive power; an aperture stop S arranged in the third lens group G3; a fourth lens group G4 having negative refractive power; and a fifth lens group G5 having negative refractive power, which are placed in order from an object. In this example, the second lens group G2 is the first focusing lens group F1, the fourth lens group G4 is the second focusing lens group F2, and the third lens group G3 corresponds to the intermediate lens group GA.

The positions of the first lens group G1, the third lens group G3, and the fifth lens group G5 are substantially fixed, and the second lens group G2 and the fourth lens group G4 are arranged movably along the optical axis. Upon focusing from an infinity object to a short distance object, the second lens group G2 moves toward an image surface, and the fourth lens group G4 moves toward an object.

The first lens group G1 comprises: a negative meniscus lens L11 having a convex surface facing an object; a negative meniscus lens L12 having a convex surface facing an object; and a cemented positive lens of a negative meniscus lens L13 having a convex surface facing an object and a positive meniscus lens L14 having a convex surface facing an object, which are placed in order from an object.

The negative meniscus lens L12 is a hybrid lens configured such that a resin layer L12b is provided on the surface, facing an image, of a glass lens body L12a. The surface, facing an image, of the resin layer L12b is an aspherical surface, and the negative meniscus lens L12 is a composite type aspherical surface lens. In a [lens data] column to be described below, a surface number 3 represents the surface, facing an object, of the lens body L12a, a surface number 4 represents the surface, facing an image, of the lens body L12a and the surface, facing an object, of the resin layer 12b (the surface on which both are cemented), and a surface number 5 represents the surface, facing an image, of the resin layer 11b.

The second lens group G2 comprises a biconvex positive lens L21. The third lens group G3 comprises: a cemented positive lens of a biconvex positive lens L31 and a biconcave negative lens L32; an aperture stop S; a biconcave negative lens L33; a biconvex positive lens L34; a cemented positive lens of a biconvex positive lens L35 and a negative meniscus lens L36 having a concave surface facing an object; and a biconvex positive lens L37, which are placed in order from an object. The fourth lens group G4 comprises a biconcave negative lens L41. Note that both surfaces of the negative lens L41 are aspherical surfaces. The fifth lens group G5 comprises a negative meniscus lens L51 having a concave surface facing an object. Note that both surfaces of the negative meniscus lens L51 are aspherical surfaces.

Table 8 lists values of data of the optical system according to Example 8.

TABLE 8

[General Data]

| f = 23.400 |
| FNO = 1.850 |
| 2ω = 84.444 (°) |
| Ymax = 21.7 |
| TL = 108.428 |
| BF = 14.958 |
| MF1 = 4.786 |
| MF2 = −1.731 |
| fA = 29.756 |
| fB = 28.542 |
| fR = −75.502 |

[Lens Data]

| Surface Number | R | D | nd | vd |
|---|---|---|---|---|
| Object Surface | ∞ | | | |
| 1 | 142.4574 | 1.800 | 1.65844 | 50.83 |
| 2 | 21.6000 | 6.396 | | |
| 3 | 38.1000 | 1.550 | 1.51680 | 64.13 |
| 4 | 23.6120 | 0.050 | 1.51380 | 52.97 |
| 5* | 19.2059 | 6.142 | | |
| 6 | 63.1783 | 1.600 | 1.49782 | 82.57 |
| 7 | 23.3698 | 6.266 | 1.95000 | 29.37 |
| 8 | 36.0387 | (D8) | | |
| 9 | 54.5725 | 3.900 | 1.80400 | 46.60 |
| 10 | −466.6331 | (D10) | | |
| 11 | 39.5691 | 5.000 | 1.95375 | 32.33 |
| 12 | −40.6795 | 1.100 | 1.84666 | 23.80 |
| 13 | 54.0179 | 4.380 | | |
| 14(S) | 0.0000 | 4.408 | | |
| 15 | −24.1356 | 1.100 | 1.62004 | 36.40 |
| 16 | 75.2494 | 0.200 | | |
| 17 | 28.7803 | 7.300 | 1.49782 | 82.57 |
| 18 | −30.0589 | 0.200 | | |
| 19 | 35.1599 | 8.100 | 1.49782 | 82.57 |

TABLE 8-continued

| 20 | −19.4891 | 1.200 | 1.95375 | 32.33 |
|---|---|---|---|---|
| 21 | −97.0841 | 0.200 | | |
| 22 | 53.3925 | 4.200 | 1.96300 | 24.11 |
| 23 | −93.6556 | (D23) | | |
| 24* | −501.9657 | 1.400 | 1.86100 | 37.10 |
| 25* | 126.9062 | (D25) | | |
| 26* | −29.3391 | 1.600 | 1.86100 | 37.10 |
| 27* | −35.7143 | 14.960 | | |
| Image Surface | ∞ | | | |

[Aspherical Surface Data]

5th Surface $\kappa = 0.0000$
A4 = 4.66669E−07 A6 = −6.88717E−09 A8 = −2.30899E−11
A10 = 5.43815E−14

24th Surface $\kappa = 0.0000$
A4 = −1.88541E−05 A6 = −8.03342E−08 A8 = 2.03164E−10
A10 = 1.24201E−12

25th Surface $\kappa = 0.0000$
A4 = 6.60646E−06 A6 = −1.50187E−07 A8 = 7.59419E−10
A10 = −1.80547E−12

26th Surface
$\kappa = 0.0000$
A4 = 2.96788E−05 A6 = −5.54230E−07 A8 = 1.09418E−09
A10 = 8.51720E−13

27th Surface $\kappa = 0.0000$
A4 = 4.49265E−05 A6 = −4.55643E−07 A8 = 1.16960E−09
A10 = 1.42886E−12

[Lens Group Data]

| Group | First surface | Focal length | Magnification (Infinity) | Magnification (close-distance) |
|---|---|---|---|---|
| 1 | 1 | −24.637 | 0.00000 | 0.15381 |
| 2 | 9 | 60.973 | 2.90215 | 3.07546 |
| 3 | 11 | 29.756 | −0.25308 | −0.24158 |
| 4 | 24 | −117.529 | 1.18152 | 1.19600 |
| 5 | 26 | −215.972 | 1.09449 | 1.09532 |

[Variable Distance Data]

| | Infinity | Short-distance |
|---|---|---|
| f | 23.40000 | −0.14970 |
| D0 | 0.0000 | 130.21720 |
| D8 | 3.68884 | 8.66216 |
| D10 | 6.97027 | 2.00000 |
| D23 | 7.70512 | 6.15913 |
| D25 | 7.01357 | 8.56537 |

Figure 21A:
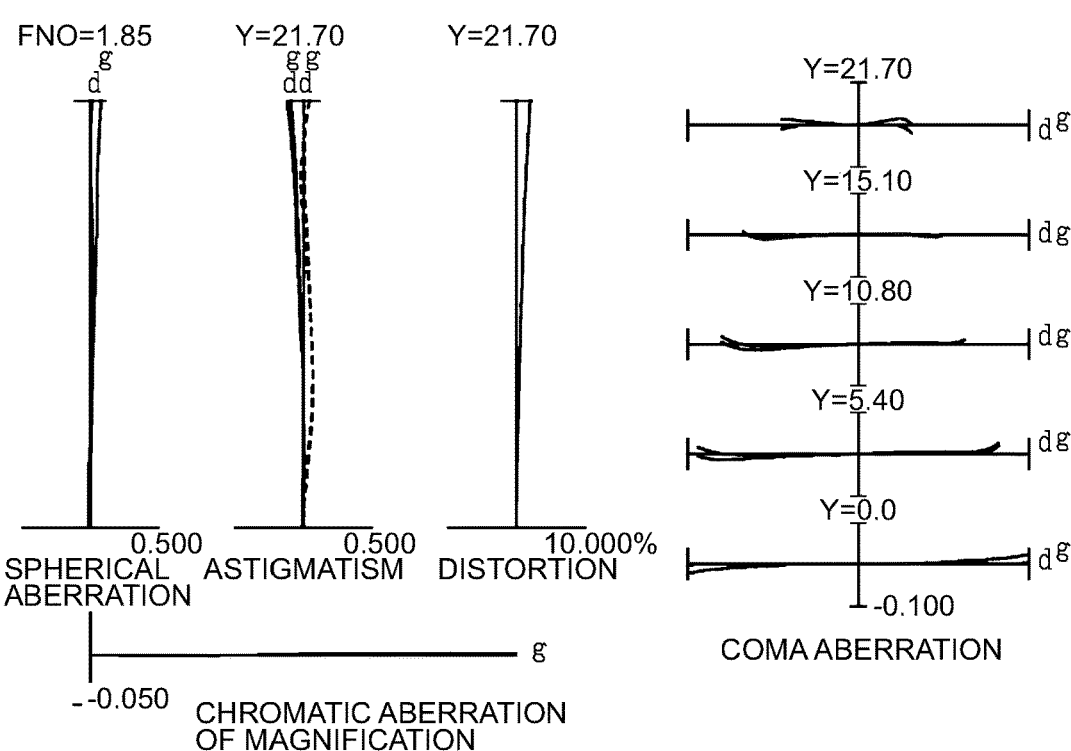
Figure 21B:
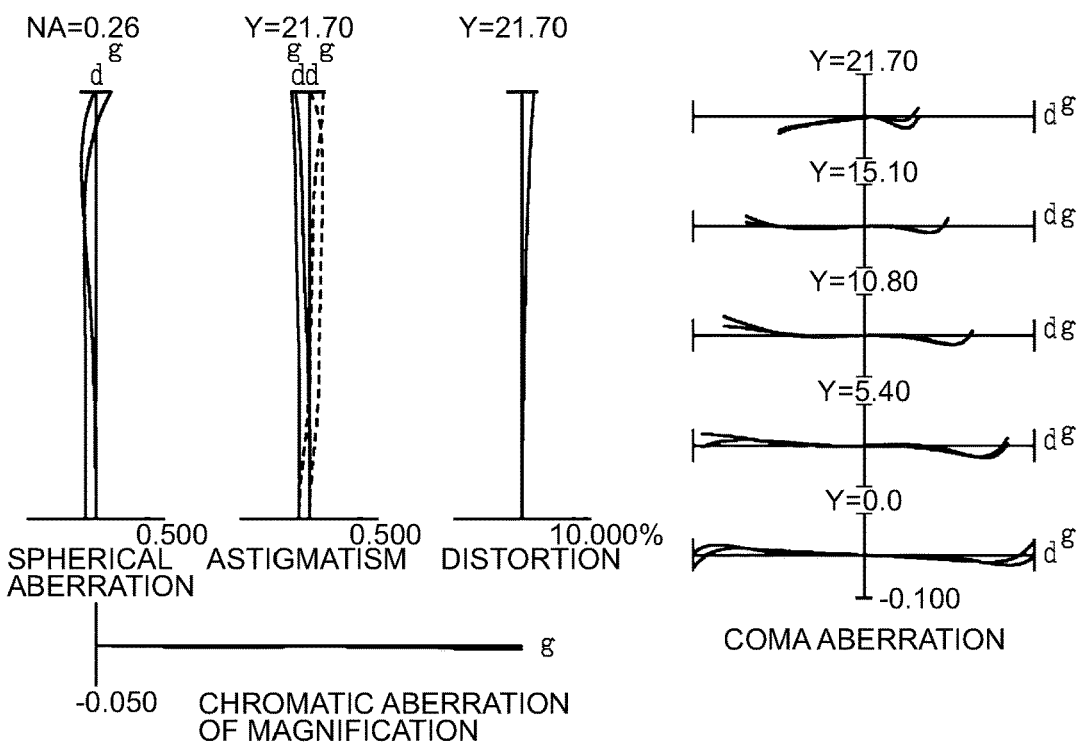

FIG. 21A shows various aberration values of the optical system according to Example 8 upon focusing on an infinity object and FIG. 21B shows those upon focusing on a close distance object. The respective aberration graphs show that the optical system according to Example 8 can satisfactorily correct various aberrations over the entire range from a state of focusing on an infinity object to a state of focusing on a close distance object, and also has excellent imaging performance for focusing on a short distance object.

The following shows a list of conditional expressions and the conditional expression corresponding values of respective examples.

[A List of Conditional Expressions]

$$dFF/TL \tag{1}$$

$$BF/TL \tag{2}$$

$2\omega(°)$    (3)

$f1/fL1$    (4)

$(-f1)/fB$    (5)

$f1/fR$    (6)

$f1\times\Sigma\{1/(fLk\times vdLk)\}$    (7)

$(L1R2-L1R1)/(L1R1+L1R2)$    (8)

$(LeR2-LeR1)/(LeR2+LeR1)$    (9)

$fF1/(-fF2)$    (10)

$1/\beta F1$    (11)

$1/\beta F2$    (12)

$\{(\beta F1+(1/(\beta F1)\}^{-2}$    (13)

$\{(\beta F2+(1/(\beta F2)\}^{-2}$    (14)

$\beta F1/\beta F2$    (15)

$MF1/MF2$    (16)

$(-f1)/fF1$    (17)

$f1/fF2$    (18)

$fA/fF1$    (19)

$(1-\beta F2^2)\times\beta R^2\times MF2$    (20)

$dF1/TL$    (21)

$dF2/TL$    (22)

[Conditional Expression Corresponding Value]

|  | Example 1 | Example 2 | Example 3 | Example 4 | Example 5 |
|---|---|---|---|---|---|
| (1) | 0.385 | 0.370 | 0.362 | 0.337 | 0.336 |
| (2) | 0.095 | 0.087 | 0.093 | 0.131 | 0.133 |
| (3) | 105.504 | 109.100 | 109.100 | 98.952 | 98.950 |
| (4) | 0.925 | 0.887 | 0.912 | 1.007 | 1.036 |
| (5) | 0.621 | 0.653 | 0.647 | 0.792 | 0.808 |
| (6) | 0.348 | 0.330 | 0.297 | 0.655 | 0.663 |
| (7) | 0.013 | 0.011 | 0.011 | 0.008 | 0.008 |
| (8) | −0.719 | −0.785 | −0.825 | −0.683 | −0.726 |
| (9) | 0.184 | 0.185 | 0.173 | 0.387 | 0.311 |
| (10) | 0.407 | 0.401 | 0.324 | 0.935 | 1.005 |
| (11) | 0.2281 | 0.0169 | −0.0227 | −0.0276 | −0.0188 |
| (12) | 0.9343 | 0.9685 | 0.9818 | 0.8339 | 0.8223 |
| (13) | 0.04703 | 0.00028 | 0.00052 | 0.00076 | 0.00035 |
| (14) | 0.24885 | 0.24974 | 0.24992 | 0.24193 | 0.24067 |
| (15) | 0.244 | 0.017 | −0.023 | −0.033 | −0.023 |
| (16) | −0.255 | −0.308 | −0.239 | −0.089 | −0.125 |
| (17) | 0.227 | 0.282 | 0.294 | 0.334 | 0.337 |
| (18) | 0.092 | 0.113 | 0.095 | 0.312 | 0.339 |
| (19) | 0.425 | 0.541 | 0.575 | 0.438 | 0.432 |
| (20) | 0.208 | 0.104 | 0.043 | 0.365 | 0.604 |
| (21) | 0.390 | 0.407 | 0.409 | 0.421 | 0.418 |
| (22) | 0.817 | 0.821 | 0.816 | 0.791 | 0.786 |

|  | Example 6 | Example 7 | Example 8 |
|---|---|---|---|
| (1) | 0.459 | 0.418 | 0.480 |
| (2) | 0.145 | 0.145 | 0.138 |
| (3) | 97.191 | 96.302 | 84.444 |
| (4) | 0.413 | 0.377 | 0.633 |
| (5) | 0.683 | 0.676 | 0.863 |
| (6) | 0.252 | 0.250 | 0.326 |
| (7) | 0.007 | 0.007 | 0.007 |
| (8) | −0.458 | −0.560 | −0.737 |
| (9) | −0.063 | 0.060 | 0.098 |
| (10) | 0.854 | 0.470 | 0.519 |
| (11) | 0.3100 | 0.2643 | 0.3446 |
| (12) | 0.7481 | 0.8100 | 0.8464 |
| (13) | 0.00098 | 0.06105 | 0.09487 |
| (14) | 0.23007 | 0.23922 | 0.24317 |
| (15) | 0.414 | 0.326 | 0.407 |
| (16) | −0.363 | −0.430 | −0.362 |
| (17) | 0.353 | 0.383 | 0.404 |
| (18) | 0.302 | 0.180 | 0.210 |
| (19) | 0.514 | 0.549 | 0.488 |
| (20) | 1.476 | 1.202 | 0.821 |
| (21) | 0.290 | 0.302 | 0.254 |
| (22) | 0.784 | 0.753 | 0.770 |

Note that the invention of the present application is not limited to the above embodiment, and can be appropriately modified as long as the optical performance specified by the description of each claim is not impaired.

For example, the above embodiments show optical systems comprising five groups, six groups, and seven groups, but there may be an optical system comprising another group (for example, an optical system additionally comprising a lens or a lens group on a side closest to an object or closest to an image surface). Here, the lens group represents a portion, including at least one lens, separated by an air distance that changes upon zooming or focusing.

Further, in the above examples, the aperture stop is arranged in the third lens group or the fourth lens group. However, there may be a configuration such that no member is provided as an aperture stop and the frame of a lens serves for the same purpose. Further, in the above examples, one or two sub-aperture stops are arranged, but the sub-aperture stop may be absent.

In addition, the lens surface may be any of a spherical surface, a flat surface, and an aspherical surface. A lens surface with a spherical surface or a flat surface advantageously facilitates lens processing, and assembly and adjustment to: prevent deterioration of optical performance due to errors in lens processing, and assembly and adjustment; and reduce deterioration in depiction performance if the image surface is displaced. The lens surface of the aspherical surface may be any of the following: an aspherical surface by grinding; a glass mold aspherical surface in which glass is formed into an aspherical surface shape by molding; or a composite type aspherical surface in which resin provided on a glass surface is formed into an aspherical surface shape. Further, the lens surface may be a diffractive surface, or the lens may be a gradient index lens (GRIN lens) or a plastic lens. The respective lens surfaces may be provided with an antireflection film having high transmittance in a wide wavelength range in order to reduce flare and ghosting, and achieve high contrast optical performance.

EXPLANATION OF NUMERALS AND CHARACTERS

G1 leading lens group
G2 second lens group
G3 third lens group
G4 fourth lens group
G5 fifth lens group
G6 sixth lens group
I image surface
S aperture stop

The invention claimed is:

1. An optical system consisting of a plurality of lens groups, which comprises a leading lens group, a first focusing lens group, and a second focusing lens group, the lens groups being arranged in line on an optical axis, wherein: the leading lens group is arranged closer to an object side than the first focusing lens group;

the second focusing lens group is arranged closer to an image surface than the first focusing lens group;

the first focusing lens group has positive refractive power and moves toward the image surface along the optical axis upon focusing from an infinity object to a short distance object;

the second focusing lens group has negative refractive power and moves toward the object side along the optical axis upon focusing from an infinity object to a short distance object;

between the first focusing lens group and the second focusing lens group, there is an intermediate lens group including at least one lens; and at least one of the following two conditional expressions is satisfied:

$$0.20 < f1/fL1 < 1.50$$

$$0.10 < f1/fR < 0.80$$

where fL1: a focal length of the first lens from the object side, among the lenses configuring the leading lens group, f1: a focal length of the leading lens group, and fR: a focal length of a lens group including the second focusing lens group and a succeeding lens group, upon focusing on an infinity object.

2. The optical system according to claim 1, wherein the following conditional expression is satisfied:

$$0.00 < BF/TL < 0.24$$

where

BF: a back focus of the optical system upon focusing on an infinity object, and

TL: an entire length of the optical system upon focusing on an infinity object.

3. The optical system according to claim 1, wherein the following conditional expression is satisfied:

$$60.00° < 2\omega < 130.00°$$

where

2ω: a full angle of view of the optical system upon focusing on an infinity object.

4. The optical system according to claim 1, wherein the following conditional expression is satisfied:

$$0.40 < (-f1)/fB < 1.20$$

where fB: a combined focal length of a lens group including the first focusing lens group and a succeeding lens group.

5. The optical system according to claim 1, wherein the following conditional expression is satisfied:

$$0.000 < f1 \times \Sigma\{1/(fLk \times vdLk)\} < 0.020$$

where fLk: a focal length of the k-th lens from the object side, among the lenses configuring the leading lens group, and vdLk: the Abbe number of the k-th lens.

6. The optical system according to claim 1, wherein the following conditional expression is satisfied:

$$-1.00 < (L1R2 - L1R1)/(L1R1 + L1R2) < 0.00$$

where

L1R1: the radius of curvature of an object-facing surface of a lens arranged closest to the object side in the optical system, and L1R2: the radius of curvature of an image-facing surface of the lens arranged closest to the object side.

7. The optical system according to claim 1, wherein the following conditional expression is satisfied:

$$-0.50 < (LeR2 - LeR1)/(LeR2 + LeR1) < 1.00$$

where

LeR1: the radius of curvature of an object-facing surface of a lens arranged closest to the image surface in the optical system, and LeR2: the radius of curvature of an image-facing surface of the lens arranged closest to the image surface.

8. The optical system according to claim 1, wherein the following conditional expression is satisfied:

$$0.10 < fF1/(-fF2) < 1.50$$

where fF1: a focal length of the first focusing lens group, and fF2: a focal length of the second focusing lens group.

9. The optical system according to claim 1, wherein the following conditional expression is satisfied:

$$-0.30 < 1/\beta F1 < 0.95$$

where

βF1: a lateral magnification of the first focusing lens group upon focusing on an infinity object.

10. The optical system according to claim 1, wherein the following conditional expression is satisfied:

$$0.100 < 1/\beta F2 < 1.000$$

where

βF2: a lateral magnification of the second focusing lens group upon focusing on an infinity object.

11. The optical system according to claim 1, wherein the following conditional expression is satisfied:

$$\{\beta F1 + (1/\beta F1)\}^{-2} < 0.250$$

where

βF1: a lateral magnification of the first focusing lens group upon focusing on an infinity object.

12. The optical system according to claim 1, wherein the following conditional expression is satisfied:

$$\{\beta F2 + (1/\beta F2)\}^{-2} < 0.250$$

where

βF2: a lateral magnification of the second focusing lens group upon focusing on an infinity object.

13. The optical system according to claim 1, wherein the following conditional expression is satisfied:

$$-0.20 < \beta F1/\beta F2 < 0.80$$

where

βF1: a lateral magnification of the first focusing lens group upon focusing on an infinity object, and βF2: a lateral magnification of the second focusing lens group upon focusing on an infinity object.

14. The optical system according to claim 1, wherein: the following conditional expression is satisfied:

$$-1.00 < MF1/MF2 < -0.01$$

where
    MF1: a movement amount of the first focusing lens group upon focusing from an infinity object to a close distance object and
    MF2: a movement amount of the second focusing lens group upon focusing from an infinity object to a close distance object; and
a movement amount toward an image surface is represented as a positive value.

15. The optical system according to claim 1, wherein the following conditional expression is satisfied:

$$0.10<(-f1)/fF1<0.60$$

where
    fF1: a focal length of the first focusing lens group.

16. The optical system according to claim 1, wherein the following conditional expression is satisfied:

$$0.02<f1/fF2<0.60$$

where
    fF2: a focal length of the second focusing lens group.

17. The optical system according to claim 1, wherein the following conditional expression is satisfied:

$$0.20<fA/fF1<0.80$$

where
    fA: a combined focal length of a lens group between the first focusing lens group and the second focusing lens group, and
    fF1: a focal length of the first focusing lens group.

18. The optical system according to claim 1, wherein the following conditional expression is satisfied:

$$0.00<(1-\beta F2^2)\times\beta R^2\times MF2<2.00$$

where
    βF2: a lateral magnification of the second focusing lens group upon focusing on an infinity object,
    βR: a total magnification of a lens group including the second focusing lens group and a succeeding lens group, and
    MF2: a movement amount of the second focusing lens group upon focusing from an infinity object to a close distance object.

19. The optical system according to claim 1, wherein the following conditional expression is satisfied:

$$0.10<dF1/TL<0.50$$

where
    dF1: a distance on the optical axis, upon focusing on an infinity object, from an object-facing surface of a lens arranged closest to the object side in the optical system to an object-facing surface of a lens arranged closest to the object side in the first focusing lens group, and
    TL: an entire length of the optical system upon focusing on an infinity object.

20. The optical system according to claim 1, wherein the following conditional expression is satisfied:

$$0.50<dF2/TL<0.90$$

where
    dF2: a distance on the optical axis, upon focusing on an infinity object, from the an object-facing surface of a lens arranged closest to the object side in the optical system to an object-facing surface of a lens arranged closest to the object side in the second focusing lens group, and TL: an entire length of the optical system upon focusing on an infinity object.

21. An optical apparatus comprising an optical system according to claim 1.

22. An optical system consisting of a plurality of lens groups, which comprises a leading lens group, a first focusing lens group, and a second focusing lens group, the lens groups being arranged in line on an optical axis,
    wherein: the leading lens group is arranged closer to an object side than the first focusing lens group;
    the second focusing lens group is arranged closer to an image surface than the first focusing lens group;
    the leading lens group is fixed with respect to the image surface upon focusing,
    the first focusing lens group has positive refractive power and moves toward the image surface along the optical axis upon focusing from an infinity object to a short distance object;
    the second focusing lens group has negative refractive power and moves toward the object side along the optical axis upon focusing from an infinity object to a short distance object; and
    the following conditional expression is satisfied:

$$0.20<dFF/TL<0.65 \text{ and}$$

at least one of the following two conditional expressions is satisfied:

$$0.20<f1/fL1<1.50$$

$$0.10<f1/fR<0.80$$

where
    dFF: a distance on the optical axis, upon focusing on an infinity object, from an image-facing surface of a lens arranged closest to the image surface in the first focusing lens group to an object-facing surface of a lens arranged closest to the object side in the second focusing lens group,
    TL: an entire length of the optical system upon focusing on an infinity object,
    fL1: a focal length of the first lens from the object side, among the lenses configuring the leading lens group,
    f1: a focal length of the leading lens group, and
    fR: a focal length of a lens group including the second focusing lens group and a succeeding lens group, upon focusing on an infinity object.

23. A method for manufacturing an optical system consisting of a plurality of lens groups, which comprises a leading lens group, a first focusing lens group, and a second focusing lens group, the lens groups being arranged in line on an optical axis,
    the method comprising a step of disposing the lens groups in a lens barrel so that:
    the leading lens group is arranged closer to an object side than the first focusing lens group;
    the second focusing lens group is arranged closer to an image surface than the first focusing lens group;
    the first focusing lens group has positive refractive power and moves toward the image surface along the optical axis upon focusing from an infinity object to a short distance object;
    the second focusing lens group has negative refractive power and moves toward the object side along the optical axis upon focusing from an infinity object to a short distance object; and the method further comprising at least one of the following features A or B:

the feature A including:

disposing an intermediate lens group between the first focusing lens group and the second focusing lens group, the intermediate lens group comprising at least one lens, and satisfying at least one of the following two conditional expressions:

$$0.20 < f1/fL1 < 1.50$$

$$0.10 < f1/fR < 0.80$$

where fL1: a focal length of the first lens from the object side, among the lenses configuring the leading lens group, f1: a focal length of the leading lens group, and fR: a focal length of a lens group including the second focusing lens group and a succeeding lens group, upon focusing on an infinity object, and the feature B including:

arranging the leading lens group to be fixed with respect to the image surface upon focusing, and satisfying the following conditional expression:

$$0.20 < dFF/TL < 0.65 \text{ and}$$

satisfying at least one of the following two conditional expressions:

$$0.20 < f1/fL1 < 1.50$$

$$0.10 < f1/fR < 0.80$$

where dFF: a distance on the optical axis, upon focusing on an infinity object, from an image-facing surface, of a lens arranged closest to the image surface in the first focusing lens group to an object-facing surface of a lens arranged closest to the object side in the second focusing lens group, TL: an entire length of the optical system upon focusing on an infinity object, fL1: a focal length of the first lens from the object side, among the lenses configuring the leading lens group, f1: a focal length of the leading lens group, and fR: a focal length of a lens group including the second focusing lens group and a succeeding lens group, upon focusing on an infinity object.

\* \* \* \* \*